United States Patent
Sakurai et al.

(10) Patent No.: US 9,317,394 B2
(45) Date of Patent: Apr. 19, 2016

(54) STORAGE MEDIUM AND INFORMATION PROCESSING APPARATUS AND METHOD WITH FAILURE PREDICTION

(71) Applicant: FUJITSU LIMITED, Kawasaki-shi, Kanagawa (JP)

(72) Inventors: Kazuto Sakurai, Yokohama (JP); Hitoshi Sawada, Yamato (JP); Naohiro Tamura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 14/305,055

(22) Filed: Jun. 16, 2014

(65) Prior Publication Data
US 2014/0298113 A1 Oct. 2, 2014

Related U.S. Application Data

(63) Continuation of application No. PCT/JP2011/079424, filed on Dec. 19, 2011.

(51) Int. Cl.
G06F 11/00 (2006.01)
G06F 11/34 (2006.01)
G06F 11/20 (2006.01)

(52) U.S. Cl.
CPC ........ G06F 11/3452 (2013.01); G06F 11/2025 (2013.01); G06F 11/2028 (2013.01); G06F 11/2041 (2013.01)

(58) Field of Classification Search
CPC ............ G06F 11/2025; G06F 11/2028; G06F 11/2041; G06F 11/3452
See application file for complete search history.

(56) References Cited

U.S. PATENT DOCUMENTS 7,934,131 B1 * 4/2011 Pinheiro ............. G06F 11/0709 709/224
2004/0003319 A1 1/2004 Ukai et al.
(Continued)

FOREIGN PATENT DOCUMENTS

JP 62-049446 3/1987
JP 2001-043105 2/2001
(Continued)

OTHER PUBLICATIONS

Notification of Transmittal of Translation of The International Preliminary Report on Patentability (Form PCT/IB/338, Form PCT/IB/373 & Form PCT/ISA/237), PCT/JP2011/079424, 6 pages, dated Jul. 3, 2014.
(Continued)

Primary Examiner — Joshua P Lottich
(74) Attorney, Agent, or Firm — Fujitsu Patent Center

(57) ABSTRACT

A management computer performs a process comprising: a first step and a second step. The first step collects failure-predictive information including information on a plurality of kinds of phenomena related to occurrence of a failure from each of a plurality of computers including an active first computer in a redundant system that are managed by said management computer. The second step calculates, for each individual second computer of one or more second computers of a plurality of second computers associated with said first computer in said redundant system, an evaluation value that indicates the probability of occurrence of a future failure in the individual second computer using said failure-predictive information collected from the individual second computer and said failure-predictive information collected from one or more predetermined computers other than the individual second computer of said plurality of computers.

11 Claims, 26 Drawing Sheets

(56) References Cited

U.S. PATENT DOCUMENTS

| | | | |
|---|---|---|---|
| 2008/0126881 A1* | 5/2008 | Bruckhaus | G06F 11/008 714/47.2 |
| 2008/0148015 A1 | 6/2008 | Takamoto et al. | |
| 2009/0172168 A1 | 7/2009 | Sonoda et al. | |
| 2010/0180161 A1* | 7/2010 | Kern | G06F 11/2028 714/47.2 |
| 2010/0325634 A1 | 12/2010 | Ichikawa et al. | |
| 2011/0145631 A1* | 6/2011 | Shankar | G06F 11/0709 714/4.11 |
| 2013/0138998 A1 | 5/2013 | Ichikawa et al. | |
| 2015/0193325 A1* | 7/2015 | Harsan-Farr | G05B 23/0283 702/186 |

FOREIGN PATENT DOCUMENTS

| | | |
|---|---|---|
| JP | 2004-30363 | 1/2004 |
| JP | 2004-334713 | 11/2004 |
| JP | 2007-257645 | 10/2007 |
| JP | 2008-152594 | 7/2008 |
| JP | 2010-244524 | 10/2010 |
| JP | 2011-248735 | 12/2011 |
| WO | 2008/041302 | 4/2008 |
| WO | 2011/148524 | 12/2011 |

OTHER PUBLICATIONS

International Search Report of PCT/JP2011/079424 mailed on Apr. 10, 2012.

* cited by examiner

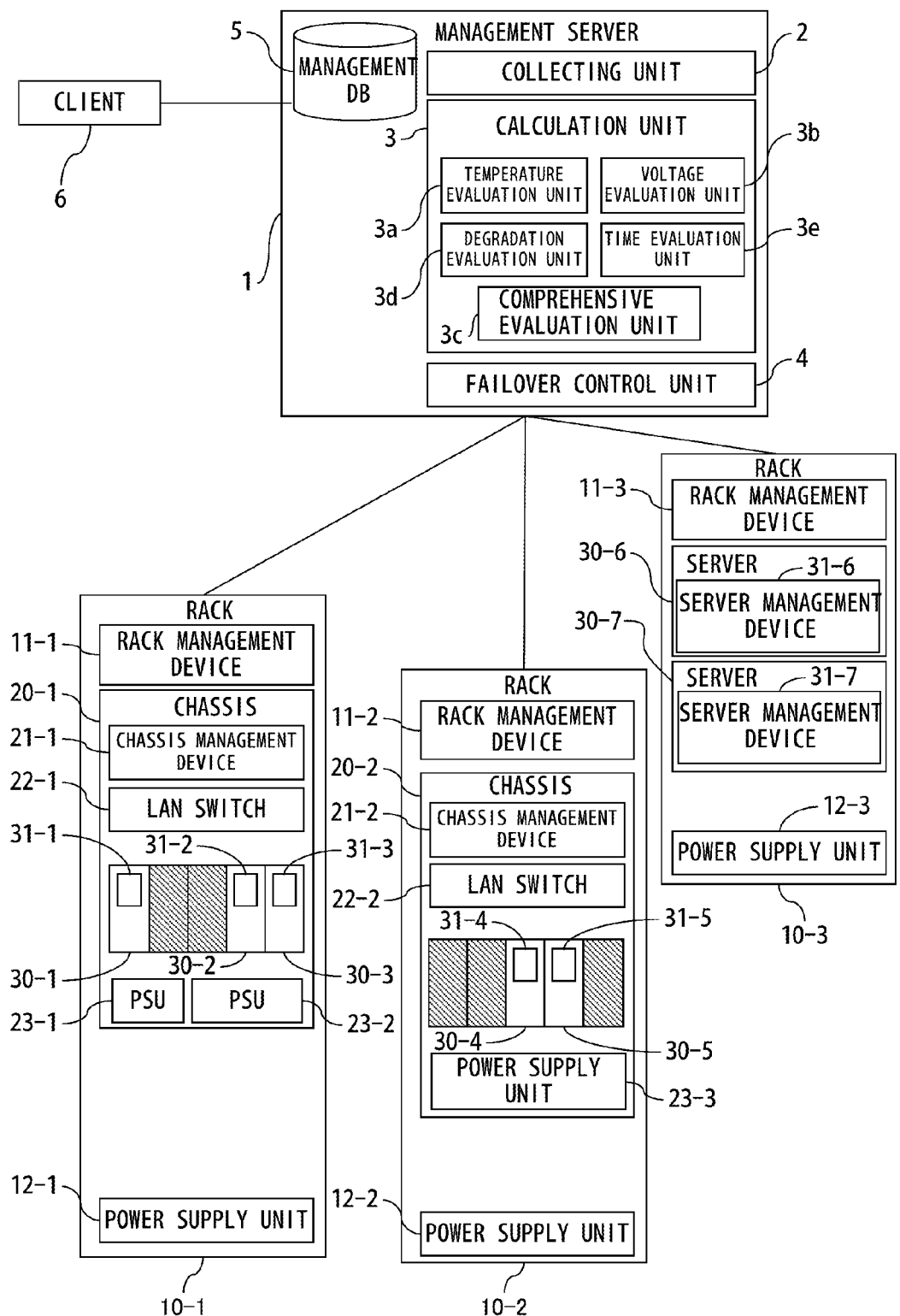
F I G. 2

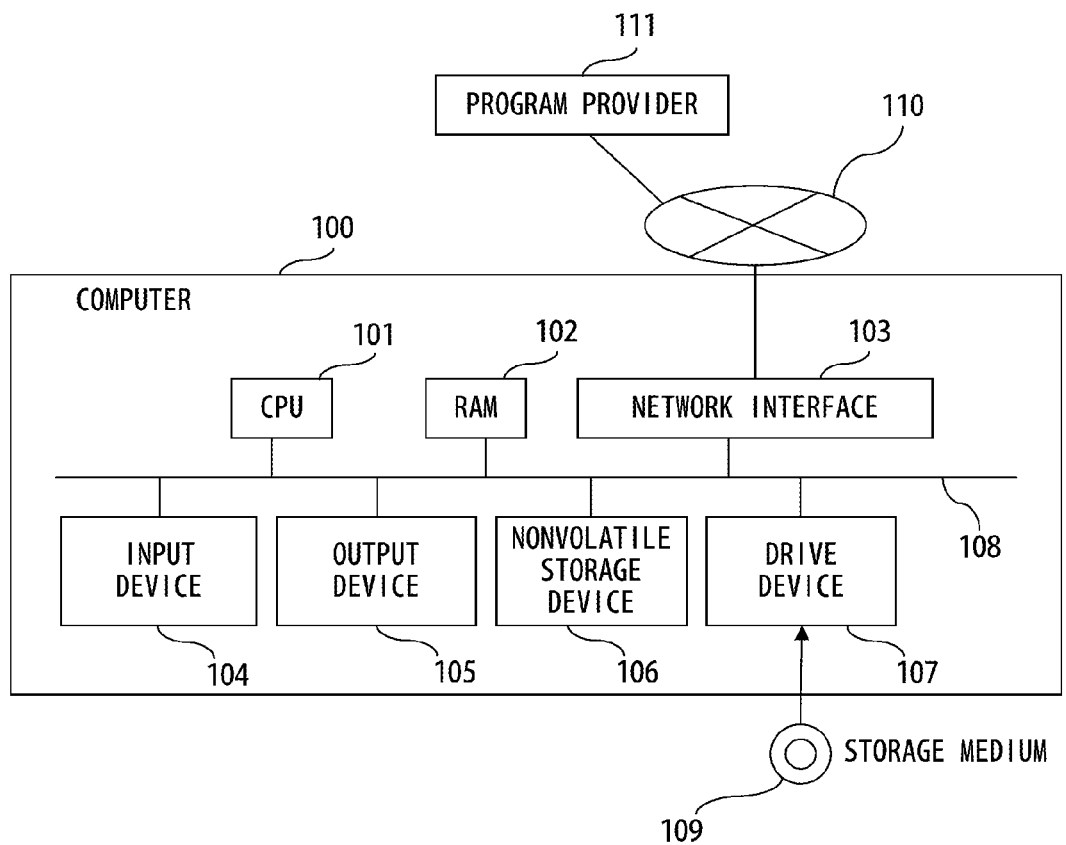
F I G. 3

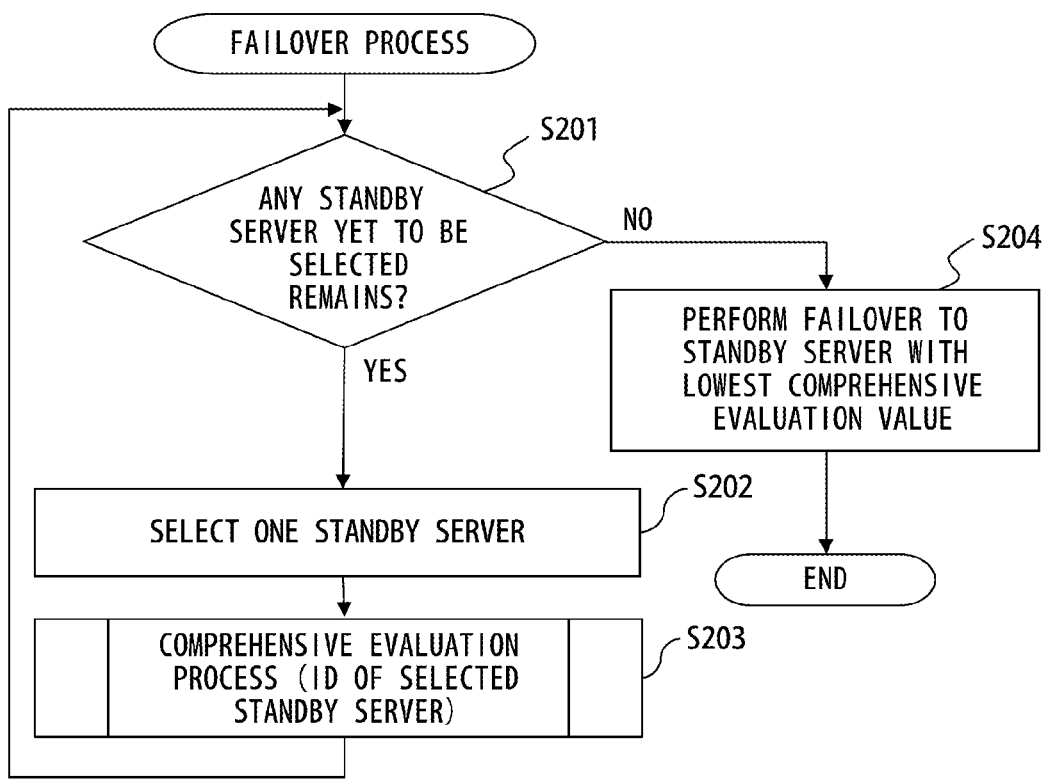
F I G. 4

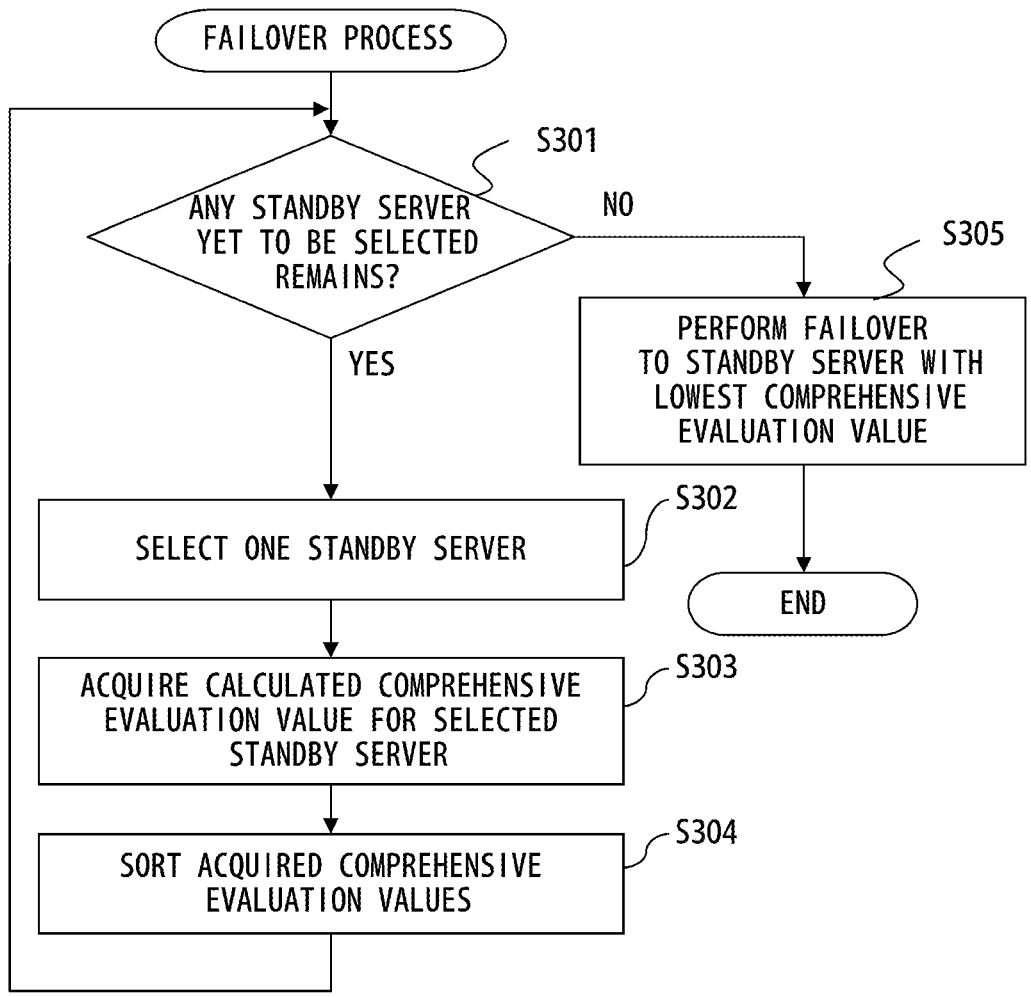
F I G. 5

201

| DESCRIPTION | | VALUE |
|---|---|---|
| SELF-COEFFICIENT | $C_{self}$ | 100 |
| ADJACENCY COEFFICIENT | $C_{adj}$ | 6 |
| CHASSIS COEFFICIENT | $C_{chassis}$ | 2 |
| RACK COEFFICIENT | $C_{rack}$ | 1 |
| SAME-POWER-SUPPLY COEFFICIENT | $C_{power}$ | 10 |
| POWER-ON COEFFICIENT | $C_{on}$ | 1/360 |
| DEGRADATION-OVER-TIME COEFFICIENT | $C_{off}$ | 1/720 |
| TEMPERATURE-DEPENDENT DEGRADATION COEFFICIENT | $C_{dgrTmpr}$ | 1/360 |
| VOLTAGE-DEPENDENT DEGRADATION COEFFICIENT | $C_{dgrOvervol}$ | 1/360 |
| ONE-MONTH COEFFICIENT | $C_{one}$ | 4 |
| TWO-MONTH COEFFICIENT | $C_{two}$ | 2 |
| THREE-MONTH COEFFICIENT | $C_{three}$ | 1 |
| CORRECTION CONSTANT | $\varepsilon$ | 1/10000 |

202

| DESCRIPTION | | LEVEL | VALUE |
|---|---|---|---|
| WEIGHT INDICATING NORMAL | $W_0$ | 0 | 0 |
| WEIGHT FOR MINOR ABNORMALITY | $W_1$ | 1 | 1 |
| WEIGHT FOR SIGNIFICANT ABNORMALITY | $W_2$ | 2 | 2 |
| WEIGHT FOR CRITICAL ABNORMALITY | $W_3$ | 3 | 6 |

| SERVER ID | CHASSIS ID | SLOT ID | RACK ID | IN-RACK POSITION | SERIAL NUMBER | NUMBER OF CPUS | MEMORY SIZE | NUMBER OF NICS | NUMBER OF CARDS | IN-CHASSIS POWER SUPPLY ID | IN-RACK POWER SUPPLY ID |
|---|---|---|---|---|---|---|---|---|---|---|---|
| 1 | 1 | 1 | - | - | A1 | 2 | 2048 | 4 | 1 | 1 | - |
| 2 | 1 | 4 | - | - | B1 | 2 | 2048 | 4 | 1 | 2 | - |
| 3 | 1 | 5 | - | - | C1 | 2 | 2048 | 4 | 1 | 2 | - |
| 4 | 2 | 3 | - | - | D1 | 4 | 4096 | 2 | 2 | 3 | - |
| 5 | 2 | 4 | - | - | E1 | 4 | 4096 | 2 | 2 | 3 | - |
| 6 | - | - | 1 | 3 | F1 | 2 | 1024 | 6 | 2 | - | 3 |
| 7 | - | - | 1 | 3 | G1 | 2 | 1024 | 6 | 2 | - | 3 |

204

| CHASSIS ID | RACK ID | IN-RACK POSITION | IN-RACK POWER SUPPLY ID |
|---|---|---|---|
| 1 | 1 | 1-6 | 1 |
| 2 | 2 | 1-10 | 2 |

205a

| ENTRY ID | SERVER ID | START TIME | END TIME | EVENT LEVEL | EVENT TYPE |
|---|---|---|---|---|---|
| 1 | 1 | 2010/12/23 10:00 | − | Information | POWER ON |
| 2 | 2 | 2010/12/23 10:00 | 2010/12/28 10:00 | Information | POWER OFF |
| 3 | 4 | 2010/12/23 10:00 | 2010/12/27 10:00 | Information | POWER OFF |
| 4 | 5 | 2010/12/23 10:00 | − | Information | POWER OFF |
| 5 | 6 | 2010/12/23 10:00 | 2010/12/28 10:00 | Information | POWER OFF |
| 6 | 7 | 2010/12/23 10:00 | 2010/12/31 10:00 | Information | POWER OFF |
| 7 | 4 | 2010/12/27 10:00 | − | Information | POWER ON |
| 8 | 2 | 2010/12/28 10:00 | − | Information | POWER ON |
| 9 | 3 | 2010/12/28 10:00 | − | Information | POWER OFF |
| 10 | 6 | 2010/12/28 10:00 | − | Information | POWER ON |
| 11 | 7 | 2010/12/31 10:00 | − | Information | POWER ON |
| 12 | 2 | 2011/1/1 10:00 | − | Major | TEMPERATURE ABNORMALITY |

205b

| ENTRY ID | SERVER ID | START TIME | END TIME | EVENT LEVEL | EVENT TYPE |
|---|---|---|---|---|---|
| 1 | 1 | 2010/12/23 10:00 | − | Information | POWER ON |
| 2 | 2 | 2010/12/23 10:00 | 2010/12/28 10:00 | Information | POWER OFF |
| 3 | 4 | 2010/12/23 10:00 | 2010/12/27 10:00 | Information | POWER OFF |
| 4 | 5 | 2010/12/23 10:00 | − | Information | POWER OFF |
| 5 | 6 | 2010/12/23 10:00 | 2010/12/28 10:00 | Information | POWER OFF |
| 6 | 7 | 2010/12/23 10:00 | 2010/12/31 10:00 | Information | POWER OFF |
| 7 | 4 | 2010/12/27 10:00 | − | Information | POWER ON |
| 8 | 2 | 2010/12/28 10:00 | − | Information | POWER ON |
| 9 | 3 | 2010/12/28 10:00 | − | Information | POWER OFF |
| 10 | 6 | 2010/12/28 10:00 | − | Information | POWER ON |
| 11 | 7 | 2010/12/31 10:00 | − | Information | POWER ON |
| 12 | 2 | 2011/1/1 10:00 | − | Major | TEMPERATURE ABNORMALITY |
| 13 | 6 | 2011/1/1 11:00 | 2011/1/1 12:00 | Minor | UNDERVOLTAGE |
| 14 | 4 | 2011/1/2 10:00 | − | Critical | UNDERVOLTAGE |
| 15 | 6 | 2011/1/2 11:00 | − | Minor | UNDERVOLTAGE |

FIG. 8

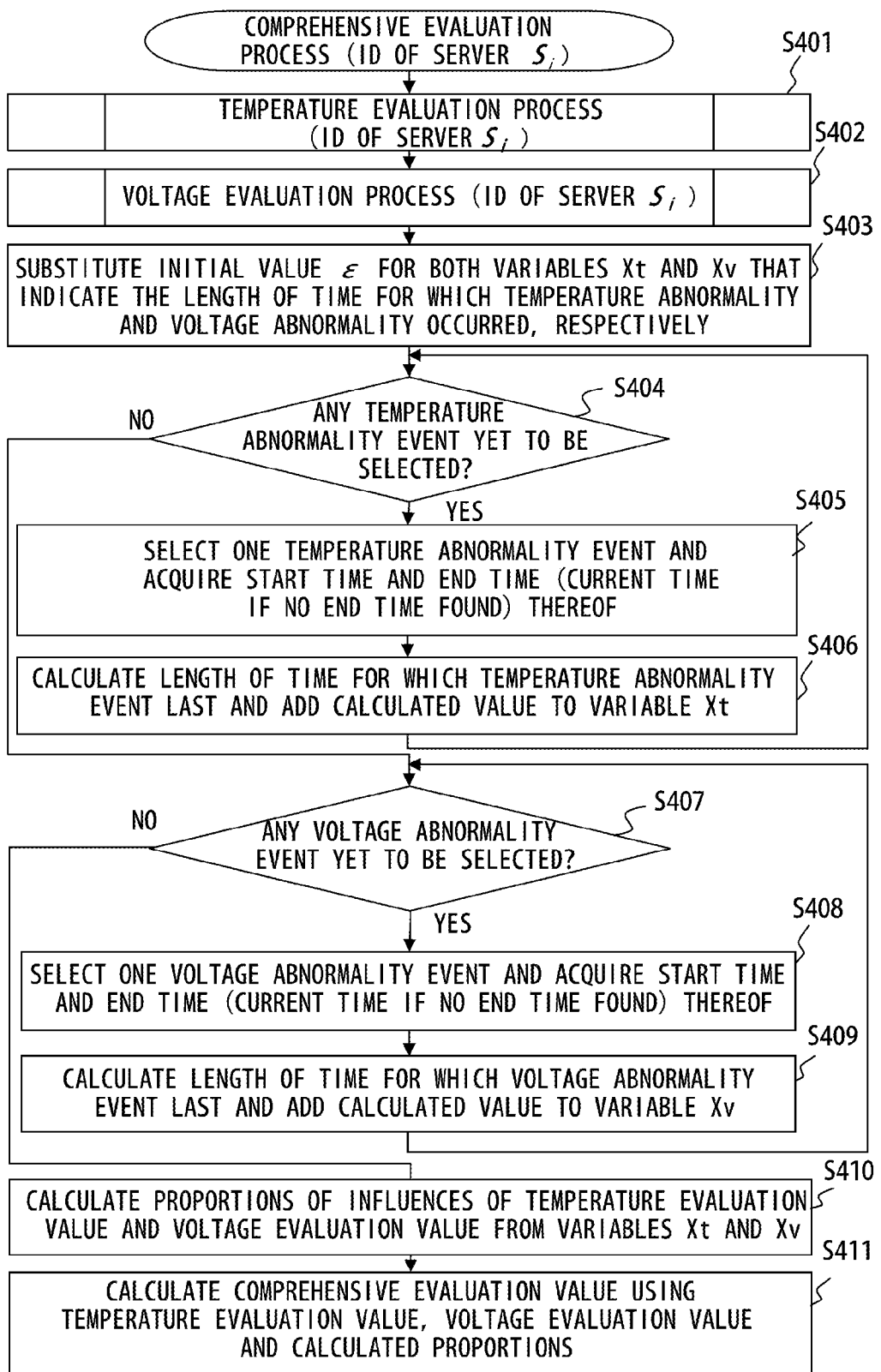
F I G. 9

| SERVER ID | TEMPERATURE EVALUATION VALUE | VOLTAGE EVALUATION VALUE | COMPREHENSIVE EVALUATION VALUE |
|---|---|---|---|
| 2 | 200 | 0 | 200 |
| 3 | 12 | 0 | 6 |
| 4 | 0 | 0 | 0 |
| 5 | 0 | 0 | 0 |
| 6 | 0 | 0 | 0 |
| 7 | 0 | 0 | 0 |

206a

| SERVER ID | TEMPERATURE EVALUATION VALUE | VOLTAGE EVALUATION VALUE | COMPREHENSIVE EVALUATION VALUE |
|---|---|---|---|
| 2 | 200 | 0 | 200 |
| 3 | 12 | 0 | 6 |
| 4 | 0 | 600 | 600 |
| 5 | 0 | 60 | 30 |
| 6 | 0 | 100 | 100 |
| 7 | 0 | 10 | 5 |

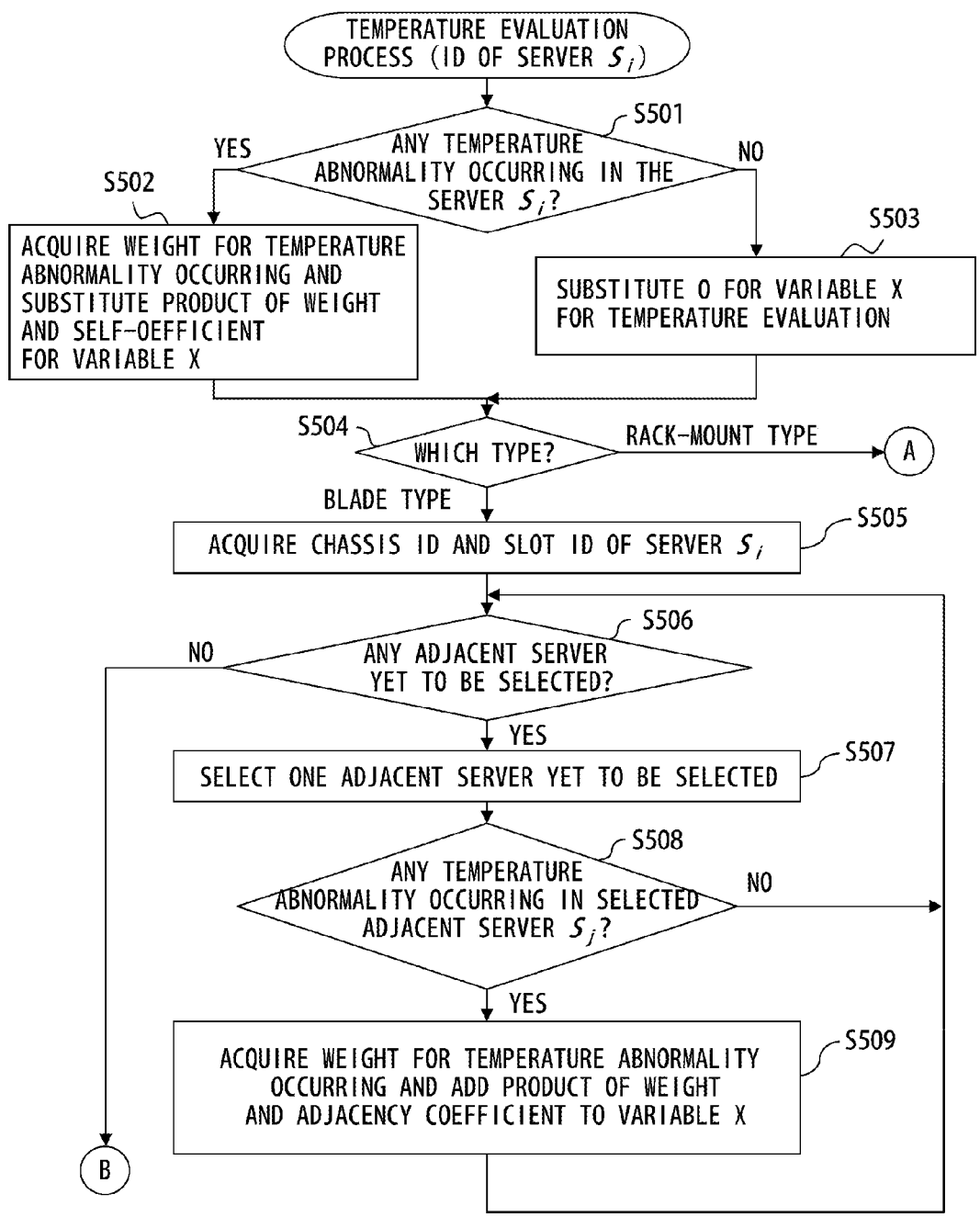
F I G. 1 1 A

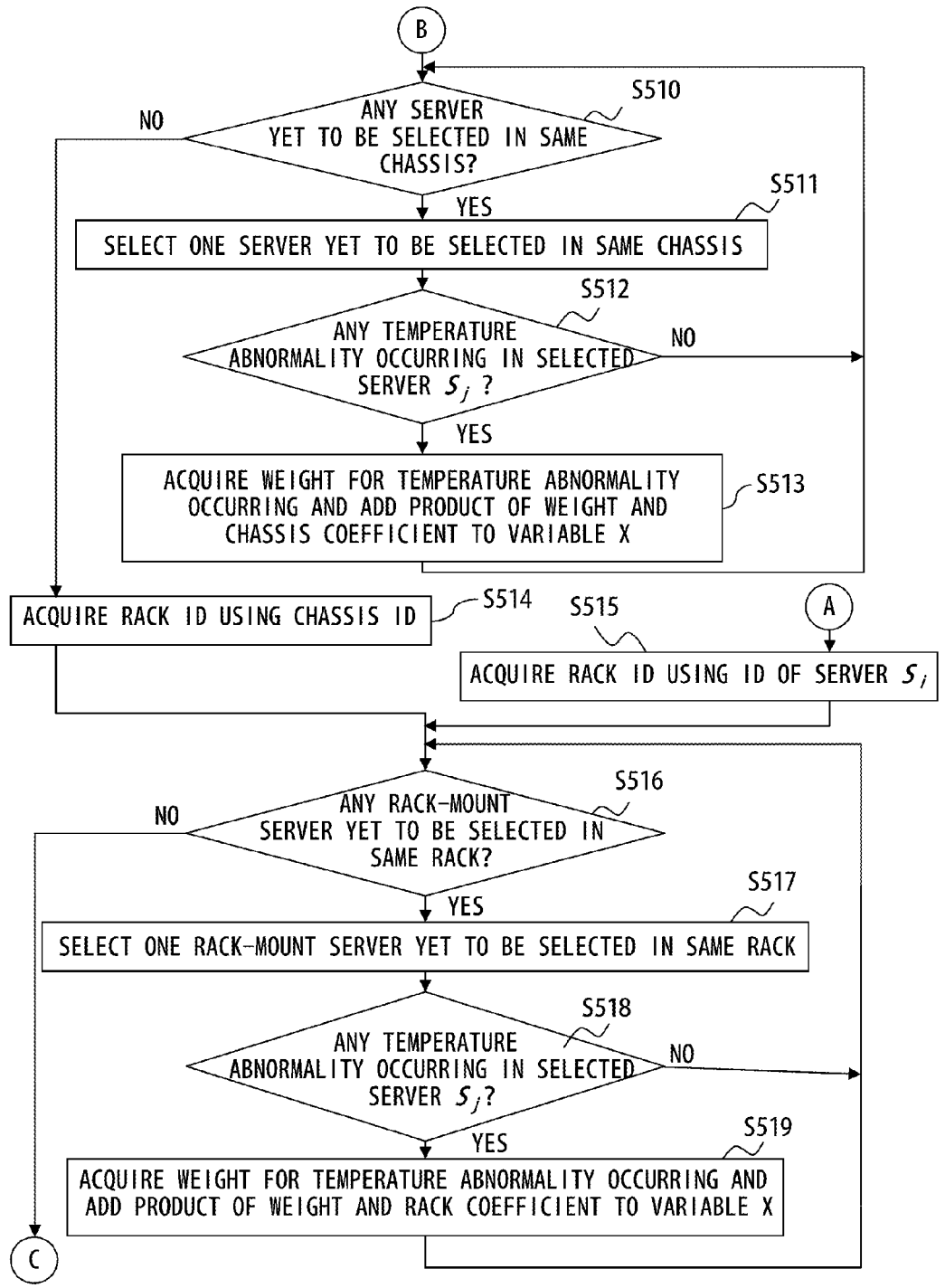
F I G. 1 1 B

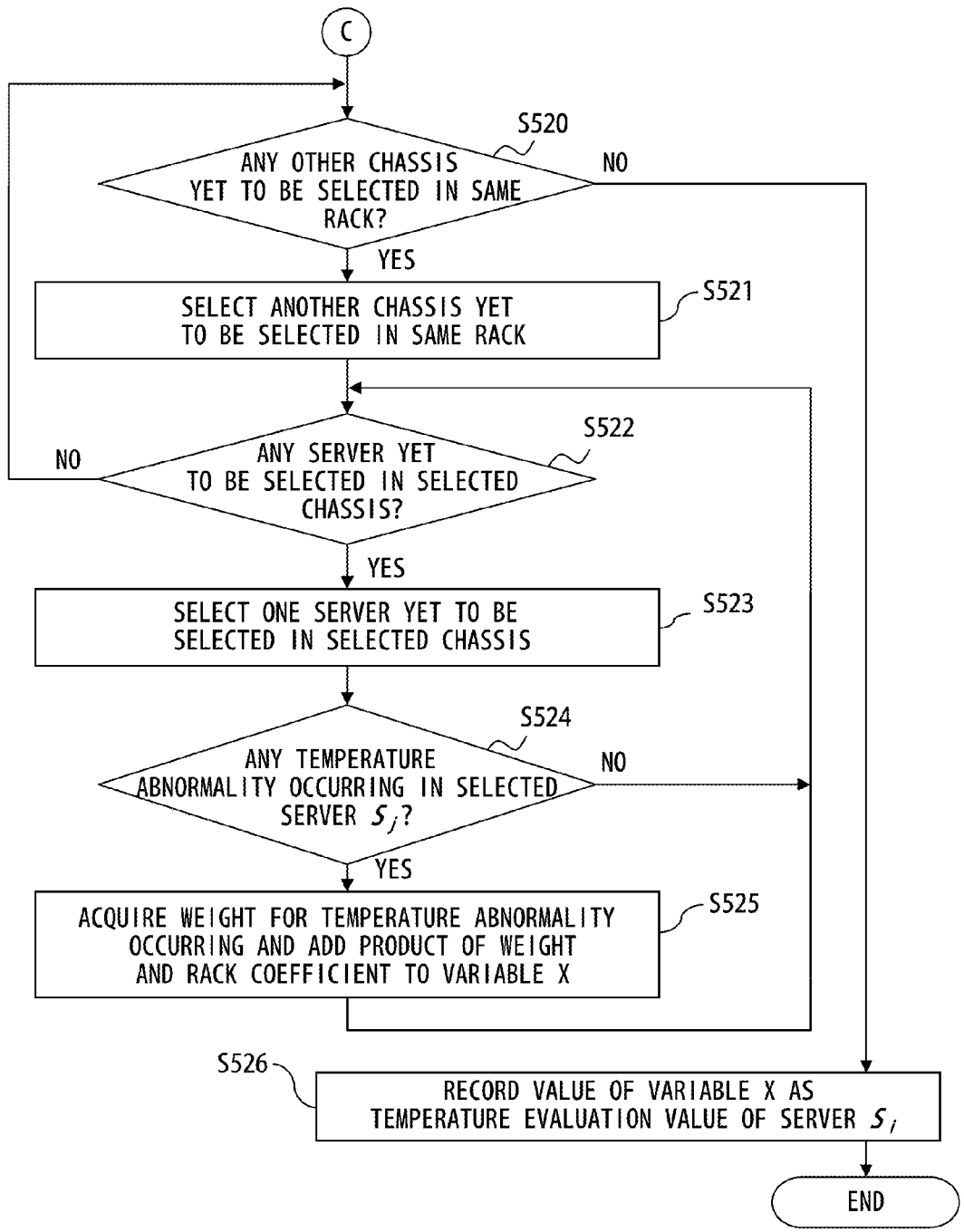
F I G. 1 1 C

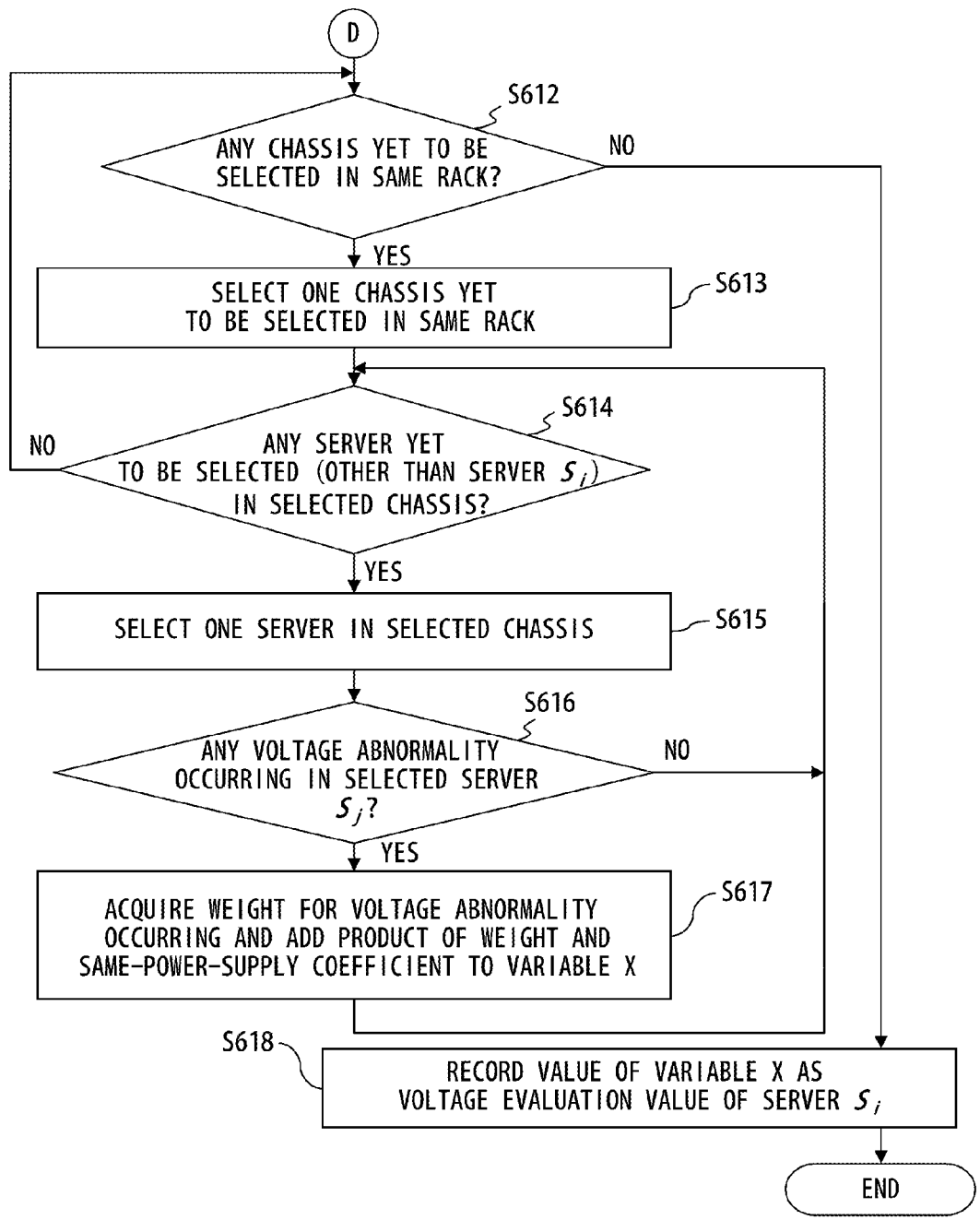
F I G. 1 2 B

205c

| ENTRY ID | SERVER ID | START TIME | END TIME | EVENT LEVEL | EVENT TYPE |
|---|---|---|---|---|---|
| 1 | 1 | 2010/12/23 10:00 | - | Information | POWER ON |
| 2 | 2 | 2010/12/23 10:00 | 2010/12/28 10:00 | Information | POWER OFF |
| 3 | 4 | 2010/12/23 10:00 | 2010/12/27 10:00 | Information | POWER OFF |
| 4 | 5 | 2010/12/23 10:00 | - | Information | POWER OFF |
| 5 | 6 | 2010/12/23 10:00 | 2010/12/28 10:00 | Information | POWER OFF |
| 6 | 7 | 2010/12/23 10:00 | 2010/12/31 10:00 | Information | POWER OFF |
| 7 | 4 | 2010/12/27 10:00 | - | Information | POWER ON |
| 8 | 2 | 2010/12/28 10:00 | - | Information | POWER ON |
| 9 | 3 | 2010/12/28 10:00 | - | Information | POWER OFF |
| 10 | 6 | 2010/12/28 10:00 | - | Information | POWER ON |
| 11 | 7 | 2010/12/31 10:00 | - | Information | POWER ON |
| 12 | 2 | 2011/1/1 10:00 | 2011/1/3 10:00 | Major | TEMPERATURE ABNORMALITY |
| 13 | 6 | 2011/1/1 11:00 | 2011/1/1 12:00 | Minor | UNDERVOLTAGE |
| 14 | 4 | 2011/1/2 10:00 | 2011/1/3 10:00 | Critical | UNDERVOLTAGE |
| 15 | 6 | 2011/1/2 11:00 | 2011/1/2 12:00 | Minor | UNDERVOLTAGE |
| 16 | 2 | 2011/1/3 11:00 | - | Minor | TEMPERATURE ABNORMALITY |
| 17 | 4 | 2011/1/3 11:00 | - | Major | OVERVOLTAGE |

FIG. 15

| SERVER ID | TEMPERATURE EVALUATION VALUE | VOLTAGE EVALUATION VALUE | DEGRADATION EVALUATION VALUE | COMPREHENSIVE EVALUATION VALUE |
|---|---|---|---|---|
| 2 | 0 | 0 | 0.83 | 0.83 |
| 3 | 0 | 0 | 0.20 | 0.20 |
| 4 | 0 | 0 | 0.60 | 0.60 |
| 5 | 0 | 0 | 0.37 | 0.37 |
| 6 | 0 | 0 | 0.57 | 0.57 |
| 7 | 0 | 0 | 0.47 | 0.47 |

206c

F I G. 16

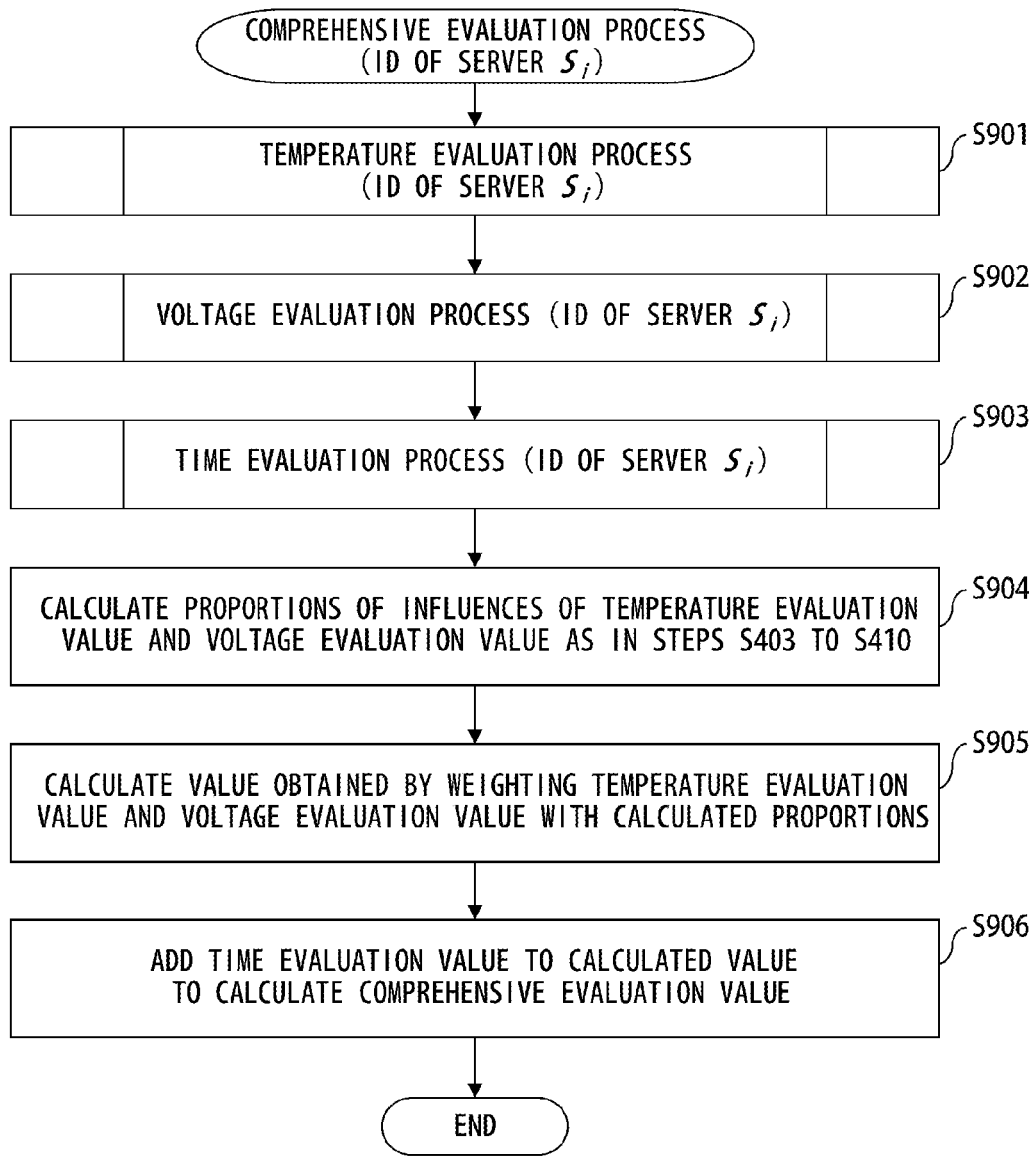
F I G. 1 7

| SERVER ID | TEMPERATURE EVALUATION VALUE | VOLTAGE EVALUATION VALUE | TIME EVALUATION VALUE | COMPREHENSIVE EVALUATION VALUE |
|---|---|---|---|---|
| 2 | 100 | 0 | 12 | 112 |
| 3 | 6 | 0 | 0 | 3 |
| 4 | 0 | 200 | 32 | 232 |
| 5 | 0 | 20 | 0 | 10 |
| 6 | 0 | 0 | 8 | 8 |
| 7 | 0 | 0 | 0 | 0 |

206d

F I G. 19

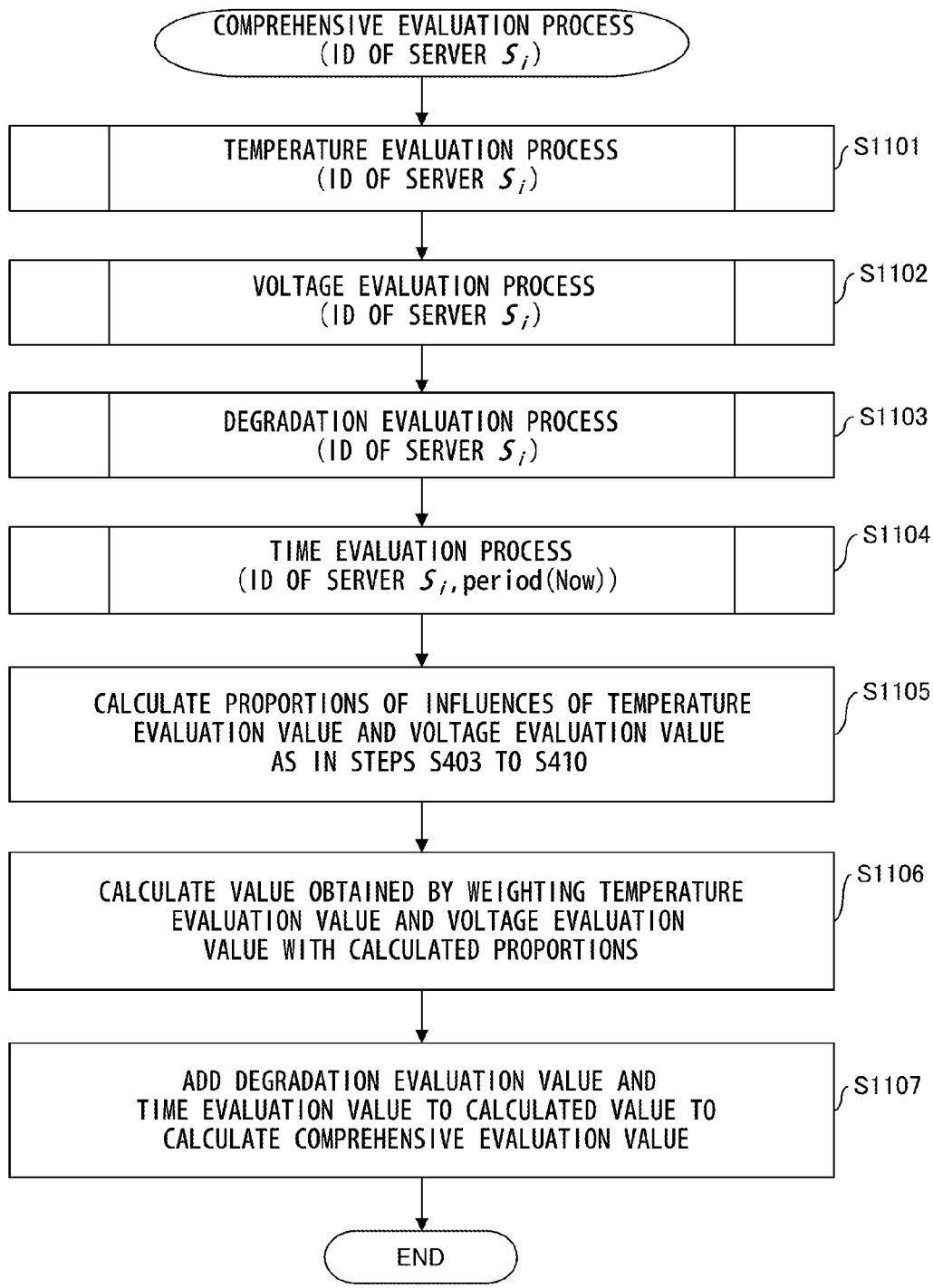
F I G. 20

| SERVER ID | TEMPERATURE EVALUATION VALUE | VOLTAGE EVALUATION VALUE | DEGRADATION EVALUATION VALUE | TIME EVALUATION VALUE | COMPREHENSIVE EVALUATION VALUE |
|---|---|---|---|---|---|
| 2 | 100 | 0 | 0.84 | 12 | 112.84 |
| 3 | 6 | 0 | 0.20 | 0 | 3.20 |
| 4 | 0 | 200 | 0.61 | 32 | 232.61 |
| 5 | 0 | 20 | 0.37 | 0 | 10.37 |
| 6 | 0 | 0 | 0.57 | 8 | 8.57 |
| 7 | 0 | 0 | 0.47 | 0 | 0.47 |

| STANDBY SERVER | ACTIVE SERVER | PRIORITY | EVALUATION VALUE | | | | |
|---|---|---|---|---|---|---|---|
| | | | COMPREHENSIVE | DETAILS | | | |
| | | | | TEMPERATURE | VOLTAGE | DEGRADATION | TIME |
| #2 | #1 | 6 | 33 | 12 | 0 | 21 | 0 |
| #3 | #1 | 4 | 23 | 12 | 0 | 11 | 0 |
| #4 | #1 | 3 | 18 | 0 | 0 | 18 | 0 |
| #5 | #1 | 1 | 11 | 0 | 0 | 11 | 0 |
| #6 | #1 | 5 | 25 | 0 | 0 | 17 | 8 |
| #7 | #1 | 2 | 13 | 0 | 0 | 13 | 0 |

302

SERVER SWITCHOVER

SWITCH TO STANDBY SERVERS BELOW

SERVER #5  EVALUATION VALUE (11)
SERVER #7  EVALUATION VALUE (13)
SERVER #4  EVALUATION VALUE (18)
SERVER #3  EVALUATION VALUE (23)
SERVER #6  EVALUATION VALUE (25)
SERVER #2  EVALUATION VALUE (33)

[OK]   [CANCEL]   [HELP]

STORAGE MEDIUM AND INFORMATION PROCESSING APPARATUS AND METHOD WITH FAILURE PREDICTION

CROSS-REFERENCE TO RELATED APPLICATION

This application is a continuation application of International Application PCT/JP2011/079424 filed on Dec. 19, 2011 and designated the U.S., the entire contents of which are incorporated herein by reference.

FIELD

The embodiments discussed herein relate to a highly available computer system.

BACKGROUND

To improve availability, some computer systems have a redundant configuration including an active system and a standby system. A wide variety of redundant systems have been proposed and are being studied in a variety of ways.

For example, an information processing system monitoring apparatus has been proposed that monitors normality of the active system according to a watchdog timer scheme. The information processing system monitoring apparatus has measure of monitoring normality of the standby system according to the watchdog timer scheme. The information processing system monitoring apparatus further has measure of monitoring whether the standby system is activated within a predetermined time after an instruction is issued to activate the standby system in response to a failure of the active system.

Furthermore, a highly available computer system has been proposed that includes a plurality of backup servers and effectively copies data into the backup servers to improve fault tolerance as described below.

The highly available computer system includes three or more servers (first to fourth servers, for example) interconnected via a network. Of the three or more servers, a first server that is given the highest priority and serves as a master communicates with slave servers (that is, the second to fourth servers) and regularly performs a search operation to discriminate between servers in which a failure has occurred and servers in which no failure has occurred. If a client modifies data in a file in the master server, the master server copies the modified data into a server in which no failure has occurred (the third and fourth servers, for example) found in the search operation.

On the other hand, the third server regularly performs an operation to search for a possible master in descending order of priority from the first server, to which the highest priority is given at that time. If no master is found, and the priority given to the third server itself is the highest among the servers in which no failure has occurred, the third server becomes a new master. The fourth server operates the same as the third server.

Besides, a server deployment method has been proposed for dynamically deploying servers by taking not only the performance requirements but also the reliability into consideration, for example.

More specifically, the operational state of a group of reserve servers is monitored by a server management unit and stored in a server management information storage unit as server management information. Once demand prediction data for each system to be managed is acquired, a deployment period grasping unit grasps, from the demand prediction data, the dynamic deployment period in which deployment of a reserve server is required in each system.

A deployment-candidate server selecting unit selects a deployment-candidate server from among the reserve servers excluding those that are likely to fail in the dynamic deployment period based on the dynamic deployment period and the server management information. In addition, a deployment server determining unit selects a deployment-candidate server that may meet deployment requirements required in the dynamic deployment period and determines the selected deployment-candidate server as a deployment server.

Furthermore, a highly reliable method has been also proposed that is intended to achieve high reliability and high availability in a multi-core processor environment.

More specifically, in a system comprising a plurality of multi-core processors, a table for managing the processors and the cores of the processors is provided. In generation of a virtual server, cores from different processors are used to form a virtual server. The number of processors may be changed depending on the number of cores of the processors. If a failure sign is detected in a processor, an execution schedule of the virtual mechanism is not passed to the processor in which the failure sign is detected.

In a system comprising a plurality of multi-core processors, operating cores from a plurality of different processors are allocated to processing of a process or a thread of the operating system. In a system comprising a plurality of multi-core processors, operating cores from a plurality of different processors are allocated to the operating system.

Known literatures include Japanese Patent Laid-Open No. 62-49446, Japanese Patent Laid-Open No. 2001-43105, International Publication No. WO2008/041302 and Japanese Patent Laid-Open No. 2008-152594, for example.

SUMMARY

According to an aspect of the embodiments, a management computer performs a process comprising: a first step and a second step. The first step collects failure-predictive information including information on a plurality of kinds of phenomena related to occurrence of a failure from each of a plurality of computers including an active first computer in a redundant system that are managed by said management computer. The second step calculates, for each individual second computer of one or more second computers of a plurality of second computers associated with said first computer in said redundant system, an evaluation value that indicates the probability of occurrence of a future failure in the individual second computer using said failure-predictive information collected from the individual second computer and said failure-predictive information collected from one or more predetermined computers other than the individual second computer of said plurality of computers.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a management server and a plurality of computers managed by the management server.

FIG. 3 is a hardware configuration diagram of a computer.

FIG. 4 is a flowchart illustrating a failover control process.

FIG. 5 is a flowchart illustrating another failover control process.

FIG. 6 is a diagram illustrating examples of various constants.

FIG. 7 illustrates an example of a server table and a chassis table contained in a management DB.

FIG. 8 is a diagram (1) illustrating an example of an event management table contained in the management DB.

FIG. 9 is a flowchart for illustrating a comprehensive evaluation process according to the first embodiment.

FIG. 10 is a diagram illustrating a result table in the management DB in which various evaluation values according to the first embodiment are recorded.

FIGS. 11A to 11C are flowcharts illustrating a temperature evaluation process.

FIGS. 12A to 12B are flowcharts illustrating a voltage evaluation process.

FIG. 15 is a diagram (2) illustrating the example of the event management table contained in the management DB.

FIG. 16 is a diagram illustrating a result table in the management DB in which various evaluation values according to the second embodiment are recorded.

FIG. 17 is a flowchart illustrating a comprehensive evaluation process according to the third embodiment.

FIG. 19 is a diagram illustrating a result table in the management DB in which various evaluation values according to the third embodiment are recorded.

FIG. 20 is a flowchart illustrating a comprehensive evaluation process according to the fourth embodiment.

FIG. 21 is a diagram illustrating a result table in the management DB in which various evaluation values according to the fourth embodiment are recorded.

FIG. 22 is a diagram illustrating an example of a graphical user interface (GUI) used in the fifth embodiment.

DESCRIPTION OF EMBODIMENTS

A certain redundant system has a plurality of second computers in preparation for a failure of an active first computer. If the first computer fails, failover or switchover from the first computer to one of the second computers occurs.

The plurality of second computers may have different probabilities of a future failure. If failover or switchover occurs from the first computer to a second computer having a high probability of occurrence of a future failure, another failure may occur within a short time after the failover or switchover, and another failover or switchover may be needed. Frequent failover or switchover is undesirable because it may lead to reduction of the availability of the redundant system.

Therefore, it is preferred to select one of the plurality of second computers that has a low probability of occurrence of a future failure. It is difficult to accurately evaluate the probability of occurrence of a future failure in a second computer based only on the current state of the second computer, because the cause of a failure of the second computer is not always in the second computer but may be in the environment surrounding the second computer.

According to an aspect, the embodiments described below aim at providing a technique of improving the accuracy of evaluation of the probability of occurrence of a future failure in a second computer. According to the embodiments described below, the accuracy of evaluation of the probability of occurrence of a future failure in a second computer may be improved.

In the following, a number of embodiments will be described in detail with reference to the drawings. Specifically, a summary of first to fifth embodiments will be described with reference to FIGS. 1 to 7. The first embodiment will then be described with reference to FIGS. 8 to 12B, and the second embodiment will be described with reference to FIGS. 13 to 16. The third embodiment will be described with reference to FIGS. 17 to 19, and the fourth embodiment will be described with reference to FIGS. 20 and 21. The fifth embodiment will be described with reference to FIG. 22. Finally, modifications will be described.

Figure 1:
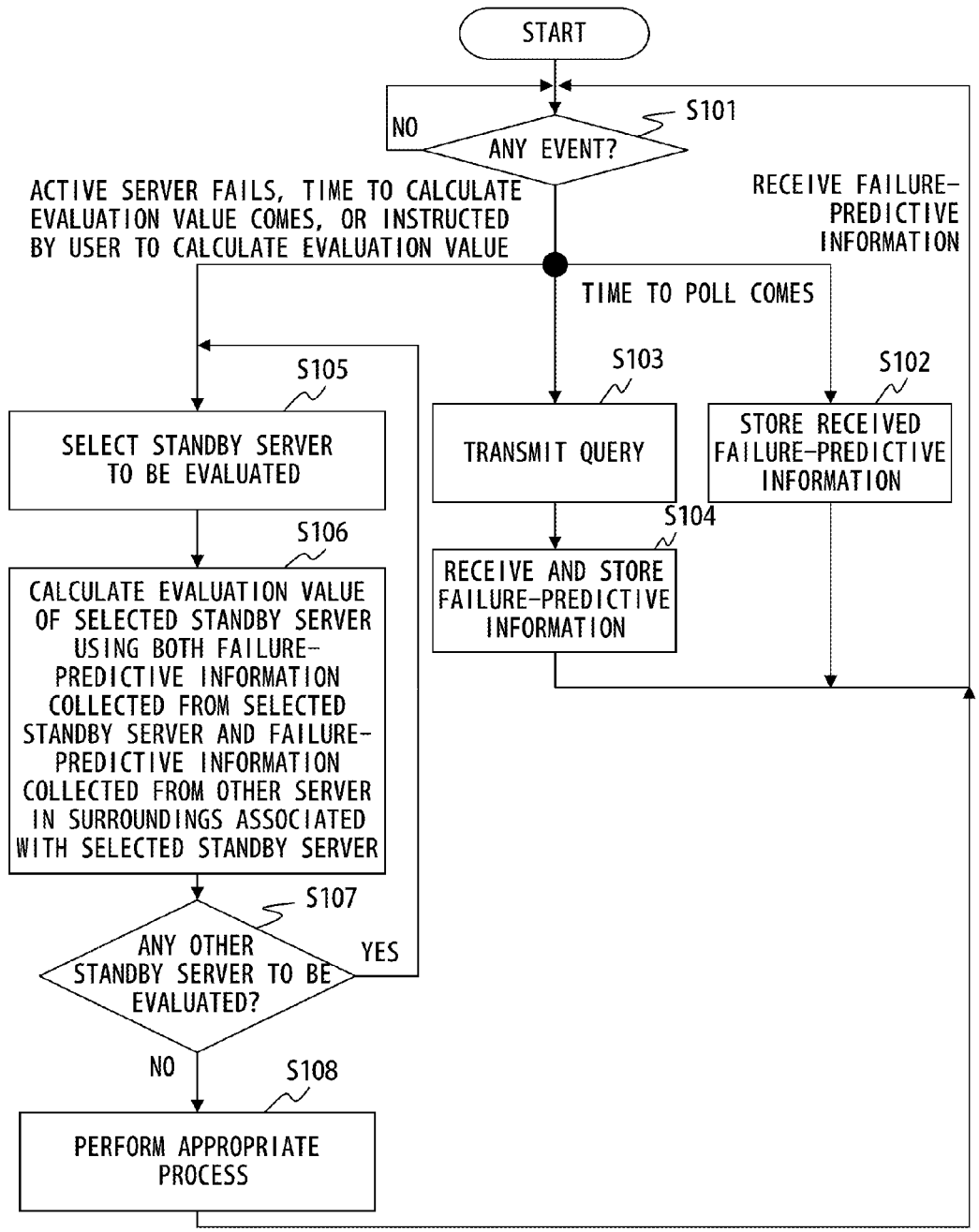
FIG. 1 is a flowchart for illustrating a summary of first to fifth embodiment.

FIG. 1 is a flowchart for illustrating a summary of the first to fifth embodiments. The process illustrated in FIG. 1 is performed by a management computer. The management computer manages a plurality of computers in a redundant system including an active first computer (referred to as an active server, hereinafter). In the following, the management computer will be referred to also as a management server.

In the redundant system, a plurality of second computers (referred to also as standby servers, hereinafter) are associated with the first computer. If a failure occurs in the first computer, failover or switchover from the first computer to one of the second computers occurs according to the association.

Depending on the architecture of the redundant system, either of a hot standby scheme and a cold standby scheme may be adopted. In the case where the cold standby scheme is adopted, the standby servers may perform tasks irrelevant to the processing performed by the active server while the active server is normally operating.

The plurality of computers managed by the management server may include a computer that is not included in the redundant system. For example, a plurality of computers used in a plurality of systems including the redundant system and one or more other systems may be installed in the same data center. Alternatively, a plurality of computers used in a plurality of systems may be geographically distributed among a plurality of data centers. The management server may manage all the computers in one or more data centers.

For example, the management server may manage all the computers in first to third systems described below.

A plurality of computers for the first system are distributed between a first data center and a second data center. For example, an active server of the first system may reside in the first data center, some of standby servers of the first system may reside in the first data center, and the other standby servers may reside in the second data center.

A plurality of computers for the second system are all installed in the second data center.

A plurality of computers for the third system are distributed between the first data center and a third data center.

Specifically, the process illustrated in FIG. 1 includes a processing of collecting information from the plurality of computers managed by the management server and a processing of calculating an evaluation value for each of one or more of the plurality of second computers.

In the following, for the convenience of explanation, the information collected by the management server will be referred to also as failure-predictive information. The failure-predictive information includes information on a plurality of kinds of phenomena related to occurrence of a failure. Specifically, the plurality of kinds of phenomena preferably include a temperature-related phenomenon and a voltage-related phenomenon.

Specifically, the evaluation value calculated for a second computer by the management server indicates the probability of future failure of the second computer. The management server calculates the evaluation value from the two pieces of failure-predictive information described below.

Failure-predictive information collected from the second computer to be evaluated.

Failure-predictive information collected from one or more predetermined computers other than the second computer to be evaluated selected from among the plurality of computers managed by the management server.

As an example of the processing of collecting the failure-predictive information, FIG. 1 illustrates steps S102 to S104. As an example of the processing of calculating the evaluation value, FIG. 1 illustrates step S107. In the following, each step illustrated in FIG. 1 will be more specifically described.

As illustrated in step S101, the management server waits for any of predetermined kinds of event to occur.

If the management server receives the failure-predictive information from any of the computers managed by the management server, the process in FIG. 1 proceeds to step S102.

Alternatively, the management server may poll the plurality of computers managed by the management server to collect the failure-predictive information. The management server may poll the computers at different times. Alternatively, the management server may poll all the computers at the same time. In any case, when the time (a scheduled time) comes for the management server to perform polling, the process in FIG. 1 proceeds to step S103.

The management server calculates the evaluation value for each of the one or more second computers as described above. As examples of an event that may trigger calculation of the evaluation value, FIG. 1 illustrates the following three events.

An event in which a failure occurs in the active server.

An event in which the time comes to calculate the evaluation value.

An event in which a user instructs to calculate the evaluation value.

If any of these three events occurs, the process in FIG. 1 proceeds to step S105.

The management server may collect the failure-predictive information from the plurality of computers in any method in each embodiment. Although FIG. 1 illustrates the two methods described below, only one of these two methods may be adopted.

An active method in which the management server performs polling.

A passive method in which the management server receives failure-predictive information from the computers to be managed.

The management server may calculate the evaluation value at any time in each embodiment. Although FIG. 1 illustrates the three types of events that may trigger calculation of the evaluation value, only some of these three types of events may be adopted as events that may trigger calculation of the evaluation.

In step S102, the management server stores the received failure-predictive information in an appropriate storage device. The process in FIG. 1 then returns to step S101.

In step S103, the management server transmits a query to each of the one or more computers to be polled.

In the subsequent step S104, the management server receives the failure-predictive information as a response to each query. The management server stores the received failure-predictive information in an appropriate storage device as in step S102. The process in FIG. 1 then returns to step S101.

In step S105, the management server selects one standby server to be evaluated. For example, all of the plurality of standby servers associated with the active server may be to be evaluated. In that case, the management server may select, one after another, the plurality of standby servers associated with the active server.

Alternatively, the user may specify one or more standby servers to be evaluated. In that case, the management server may select the specified one or more standby servers one after another.

In the subsequent step S106, the management server calculates the evaluation value for the standby server selected in step S105. As described above, in calculation of the evaluation value, the management server uses not only the failure-predictive information collected from the selected standby server but also the failure-predictive information collected from one or more predetermined computers other than the selected standby server. The "one or more predetermined computers" described above refer to one or more other servers surrounding and associated with the standby server selected to be evaluated.

For example, a temperature abnormality is related to occurrence of a failure. If a computer has an abnormally high temperature from some cause, a computer installed at a location physically close to the computer may be exposed to the high temperature. In other words, other computers installed at locations physically close to the standby server to be evaluated may have an influence on the occurrence of a failure in the standby server to be evaluated.

Therefore, the "one or more predetermined computers" described above preferably include one or more computers installed at locations physically close to the standby server to be evaluated. Concerning the phrase "locations physically close to", whether two computers are installed at locations physically close to each other may be appropriately defined in each embodiment. As described in detail later, a plurality of levels of proximity may be defined.

A voltage abnormality is also related to occurrence of a failure. If a voltage failure occurs in a computer, the cause of the failure may be in the computer itself or may be a failure occurring in an external power supply unit that supplies electric power to the computer.

If the cause of the failure is a failure occurring in the external power supply unit, other computers directly or indirectly connected to the power supply unit may also have a voltage abnormality and fail. Therefore, the "one or more predetermined computers" preferably include one or more computers that share the power supply unit with the standby server to be evaluated.

The "one or more predetermined computers" are appropriately defined by considering the physical proximity to the location of the standby server to be evaluated or the power supply unit to which the standby server to be evaluated is connected as described above, for example. Therefore, in step S106, the management server calculates the evaluation value based on the failure-predictive information collected from the standby server to be evaluated and the "one or more predetermined computers". In the following description, for the convenience of explanation, it is assumed that the lower the evaluation value, the lower probability of future failure the evaluation value indicates.

In the subsequent step S107, the management server determines whether or not there is any other standby server to be evaluated. If there is any other standby server to be evaluated, the process in FIG. 1 returns to step S105. If there is no other standby server to be evaluated, the process in FIG. 1 proceeds to step S108.

The determination in step S107 may depend on the evaluation value calculated in step S106. For example, the management server may repeatedly perform the procedure from step S105 to S107 until an evaluation value equal to or lower than a predetermined threshold is obtained.

Alternatively, the following method is possible. Supposing that the number of standby servers associated with the active server is N (N>1), the management server may repeatedly perform the procedure from step S105 to S107 until an evaluation value equal to or lower than the M-th lowest evaluation value of the N evaluation values (1≤M<N) is found. For example, in the case where N=5 and M=2, the management server may find an evaluation value equal to or lower than the second lowest evaluation value if the management server calculates the evaluation value for each of four (=N−M+1) or more standby servers.

Of course, the determination in step S107 would not depend on the evaluation value calculated in step S106. For example, it may be determined in advance to calculate the evaluation value for all of the N standby servers.

In step S108, the management server performs an appropriate processing. After the appropriate processing is performed, the process returns to step S101.

The management server may calculate the evaluation value for each of the N standby servers in response to an occurrence of a failure in the active server, for example. In that case, in step S108, the management server may perform failover from the active server to the standby server with the lowest evaluation value.

The server that is to become a new active server as a result of failover may be a standby server other than the standby server with the lowest evaluation value. A failover control unit 4 may select one standby server whose evaluation value indicates a probability equal to or lower than a certain probability indicated by a predetermined criterion as the standby server to replace the current active server.

The criterion described above may be determined by a predetermined threshold related to the evaluation value. For example, the failover control unit 4 may select one standby server the calculated evaluation value of which is equal to or lower than a predetermined threshold as a new active server.

Alternatively, the criterion described above may be determined based on the relative order of magnitude of the evaluation values of the plurality of standby servers. For example, the failover control unit 4 may select a standby server the calculated evaluation value of which is equal to or lower than the M-th lowest of the N evaluation values (1≤M<N) as a new active server.

Alternatively, the management server may calculate the evaluation value for each of the N standby servers at a predetermined time. In that case, in step S108, the management server may simply store the calculated N evaluation values in an appropriate storage device.

Alternatively, the management server may calculate the evaluation value for each of one or more standby servers in response to an instruction from a user. In that case, in step S108, the management server may output the evaluation values to an output device, such as a display.

As described above with reference to FIG. 1, the management server collects the failure-predictive information from each of a plurality of computers and calculates the evaluation value for each of one or more standby servers at an appropriate time. For the calculation of the evaluation value, not only the failure-predictive information collected from the standby server to be evaluated but also failure-predictive information collected from other computers that surround the standby server to be evaluated and may be related to occurrence of a future failure in the standby server to be evaluated is used. Therefore, the management server may more accurately evaluate the probability of occurrence of a future failure in the standby server by taking into consideration the environment surrounding the standby server to be evaluated.

FIG. 2 is a diagram illustrating an example of a management server and a plurality of computers managed by the management server. The management server that operates as illustrated in FIG. 1 may be configured like a management server 1 specifically illustrated in FIG. 2.

As described above, the plurality of computers managed by the management server 1 may include other computers than the active server of a redundant system and a plurality of standby servers associated with the active server. In the following, however, for the sake of simplicity, a case where the management server 1 manages seven servers 30-1 to 30-7 will be described as an example.

The management server 1 has a collecting unit 2 that collects the failure-predictive information and other information, a calculation unit 3 that calculates the evaluation value and the failover control unit 4 that controls failover. The management server 1 further has a management database (DB) 5 that stores the information collected by the collecting unit 2 and the calculation result from the calculation unit 3. A specific example of a table contained in the management DB 5 will be described later.

According to the first to fifth embodiments, the calculation unit 3 has a temperature evaluation unit 3a, a voltage evaluation unit 3b and a comprehensive evaluation unit 3c. In FIG. 2, the calculation unit 3 further has a degradation evaluation unit 3d and a time evaluation unit 3e. Depending on the embodiment, however, the degradation evaluation unit 3d or the time evaluation unit 3e may be omitted. Specifically, the calculation unit 3 includes the degradation evaluation unit 3d according to the second, fourth and fifth embodiments described below, and includes the time evaluation unit 3e according to the third to fifth embodiments described below.

The temperature evaluation unit 3a evaluates the influence of temperature on the occurrence of a failure based on the failure-predictive information on a temperature-related phenomenon. The voltage evaluation unit 3b evaluates the influence of voltage on the occurrence of a failure based on the failure-predictive information on a voltage-related phenomenon. The degradation evaluation unit 3d evaluates the influence of a degradation over time on the occurrence of a failure based on several kinds of failure-predictive information. The time evaluation unit 3e evaluates the tendency of occurrence of a failure in a particular time zone based on several kinds of failure-predictive information.

The comprehensive evaluation unit 3c preferably calculates a comprehensive evaluation value based on at least the evaluation results from the temperature evaluation unit 3a and the voltage evaluation unit 3b. To be specific, the evaluation value calculated in step S106 in FIG. 1 is the value eventually calculated by the comprehensive evaluation unit 3c. Depending on the embodiment, the comprehensive evaluation unit 3c may use one or both of the evaluation results from the degradation evaluation unit 3d and the time evaluation unit 3e to calculate the evaluation value.

A user interface to the user, such as a system administrator, may be provided by an input/output device (not illustrated) of the management server 1. Alternatively, as illustrated in FIG. 2, the management server 1 may be connected to a client 6 via an appropriate network (a local area network (LAN), a wide area network (WAN), the Internet or any combination thereof, for example). And the user interface may be provided by the client 6. The client 6 may be a personal computer (PC) that has an input/output device.

FIG. 2 illustrates three racks 10-1 to 10-3, as an example. On the rack 10-1, a rack management device 11-1 and a power supply unit 12-1 are mounted. On the rack 10-2, a rack management device 11-2 and a power supply unit 12-2 are mounted. On the rack 10-3, a rack management device 11-3 and a power supply unit 12-3 are mounted. The rack 10-1 to 10-3 may each further include another device, not illustrated (a fan or a LAN switch, for example).

On the rack 10-1, a chassis 20-1 that houses a plurality of blade servers is also mounted. On the rack 10-2, a similar chassis 20-2 is mounted.

The chassis 20-1 includes a chassis management device 21-1 and a LAN switch 22-1 and further includes two power supply units 23-1 and 23-2. The chassis 20-2 includes a chassis management device 21-2 and a LAN switch 22-2 and further includes one power supply unit 23-3. In FIG. 2, because of the limitation of the space, the power supply units 23-1 and 23-2 are abbreviated as PSU.

The chassis 20-1 has five slots in which blade servers are to be mounted. In the example illustrated in FIG. 2, the server 30-1 is mounted in the first slot, the server 30-2 is mounted in the fourth slot, and the server 30-3 is mounted in the fifth slot. The server 30-1 has a server management device 31-1, the server 30-2 has a server management device 31-2, and the server 30-3 has a server management device 31-3. The second and third slots that are not used are hatched in FIG. 2.

In the chassis 20-1, the power supply unit 23-1 supplies electric power to the server 30-1 mounted in the first slot, and the power supply unit 23-2 supplies electric power to the servers 30-2 and 30-3 mounted in the fourth and fifth slots, respectively. If a server is mounted in the second slot, the power supply unit 23-1 supplies electric power to the server. If a server is mounted in the third slot, the power supply unit 23-2 supplies electric power to the server.

The chassis 20-2 also has five slots in which blade servers are to be mounted. In the example illustrated in FIG. 2, the first, second and fifth slots of the chassis 20-2 are not used. The server 30-4 is mounted in the third slot, and the server 30-5 is mounted in the fourth slot. The server 30-4 has a server management device 31-4, and the server 30-5 has a server management device 31-5. In the chassis 20-2, the power supply unit 23-3 supplies electric power to all the servers mounted in the slots.

Although only the chassis 20-1 is mounted on the rack 10-1 in the example illustrated in FIG. 2, the rack 10-1 further has a space for accommodating another chassis or rack-mount server. To each device mounted on the rack 10-1, the power supply unit 12-1 supplies electric power via a power distribution unit (PDU) as required. That is, the power supply unit 12-1 indirectly supplies electric power to the servers 30-1 to 30-3 in the chassis 20-1.

Similarly, although only the chassis 20-2 is mounted on the rack 10-2 in the example illustrated in FIG. 2, the rack 10-2 further has a space for accommodating another chassis or rack-mount server. To each device mounted on the rack 10-2, the power supply unit 12-2 supplies electric power via a power distribution unit as required. That is, the power supply unit 12-2 indirectly supplies electric power to the servers 30-4 to 30-5 in the chassis 20-2.

On the rack 10-3, the two rack-mount servers 30-6 and 30-7 are mounted. The server 30-6 has a server management device 31-6, and the server 30-7 has a server management device 31-7. The rack 10-3 also further has a space for accommodating another chassis or rack-mount server. To each device mounted on the rack 10-3, the power supply unit 12-3 supplies electric power via a power distribution unit as required.

The rack management devices 11-1 to 11-3, the LAN switches 22-1 to 22-2 and the rack-mount servers 30-6 to 30-7 are connected to the management server 1 via a network. The chassis management device 21-2 and the servers 30-4 to 30-5 in the chassis 20-2 are connected to the LAN switch 22-2.

Therefore, the management server 1 may communicate with the rack management device 11-1 to 11-3, the chassis management devices 21-1 to 21-2 and the server management devices 31-1 to 31-7 via the network.

The collecting unit 2 of the management server 1 collects a variety of information from the rack management devices 11-1 to 11-3, the chassis management devices 21-1 to 21-2 and the server management devices 31-1 to 31-7 through communication via the network. Details of the information collected by the collecting unit 2 will be described later along with details of the management DB 5.

Collection of information by the collecting unit 2 is performed according to an appropriate protocol. For example, the following are techniques that the collecting unit 2 may use to collect information (of course, the collecting unit 2 may collect a variety of information according to other protocols (or via other interfaces)).

Simple network management protocol (SNMP)
Intelligent platform management interface (IPMI)
Systems management architecture for server hardware (SMASH)

The failover control unit 4 of the management server 1 may communicate with the servers 30-1 to 30-7 via the network. Therefore, the failover control unit 4 may control failover among the servers 30-1 to 30-7 via the network.

Specifically, in the example illustrated in FIG. 2, the redundant system managed by the management server 1 includes the seven servers 30-1 to 30-7. In the following description, for the convenience of explanation, it is assumed that "the server 30-1 is operating as an active server". That is, the servers 30-2 to 30-7 are standby servers associated with the server 30-1 serving as an active server.

If a failure occurs in the server 30-1 serving as an active server, the failover control unit 4 selects an appropriate one from among the servers 30-2 to 30-7 based on the evaluation values calculated by the calculation unit 3. The failover control unit 4 then controls failover from the failed server 30-1 to the selected server via the network.

The failover control unit 4 may use the information collected by the collecting unit 2 in order to determine whether failover is needed or not. That is, the failover control unit 4 may determine whether or not a failure has occurred in the active server 30-1 based on the information collected from the active server 30-1 by the collecting unit 2.

The management server 1, the client 6 and the servers 30-1 to 30-7 illustrated in FIG. 2 are each a kind of computer (that is, information processing device) and may be configured like a computer 100 illustrated in FIG. 3, for example. FIG. 3 is a diagram illustrating a hardware configuration of a computer.

The computer 100 has a central processing unit (CPU), which is a kind of processor, a random access memory (RAM) 102 and a network interface 103. The network interface 103 is a wired LAN interface, a wireless LAN interface or a combination thereof, for example. Specifically, the network interface 103 may be an external network interface card (NIC) or an onboard network interface controller.

The computer 100 may further have an input device 104 and an output device 105. The input device 104 may be a keyboard or a pointing device. The pointing device may be a mouse or a touch screen. The output device 105 may be a display or a speaker. The display may be a touch screen.

The computer 100 further has a nonvolatile storage device 106. The nonvolatile storage device 106 may be a hard disk drive (HDD) or a solid-state drive (SSD).

The computer 100 may further have a computer-readable storage medium 109 and a drive device 107. The storage medium 109 may be an optical disk, such as a compact disc (CD) or a digital versatile disk (DVD), a magneto-optical disk, a magnetic disk, or a semiconductor memory card, such as a flash memory.

The components in the computer 100 are connected to each other by a bus 108. The computer 100 is connected to a network 110 via the network interface 103.

The computer 100 appropriately operates by the CPU 101 executing an appropriate program. For example, in the computer 100 that implements the management server 1 illustrated in FIG. 2, the CPU 101 executes a program that implements the process illustrated in FIG. 1.

The CPU 101 loads a program into the RAM 102 and executes the program by using the RAM 102 as a working area. The program executed by the CPU 101 may be previously installed in the nonvolatile storage device 106.

Alternatively, the program may be provided in the storage medium 109, read from the storage medium 109, copied into the nonvolatile storage device 106, and then loaded into the RAM 102. Alternatively, the program may be downloaded into the computer 100 from a program provider 111 (a computer other than the computer 100, for example) on the network 110 via the network 110 and the network interface 103.

The RAM 102, the nonvolatile storage device 106 and the storage medium 109 are all tangible storage media and are not transitory media, such as a signal carrier.

In the case where the management server 1 illustrated in FIG. 2 is implemented by the computer 100 illustrated in FIG. 3, the collecting unit 2 is implemented by the CPU 101 performing a process including communication via the network interface 103. Similarly, the failover control unit 4 is also implemented by the CPU 101 performing a process including communication via the network interface 103. The calculation unit 3 is implemented by the CPU 101. The management DB 5 is implemented by either or both of the RAM 102 and the nonvolatile storage device 106.

Next, a specific example of the process summarized in FIG. 1 will be described with reference to exemplary flowcharts and exemplary tables.

FIG. 4 is a flowchart illustrating a failover process, and FIG. 5 is a flowchart illustrating another failover process. According to the first to fifth embodiments, when a failure occurs in the active server, failover occurs according to the process illustrated in FIG. 4 or 5. The failover control unit 4 may recognize the occurrence of a failure in the active server based on the information collected by the collecting unit 2.

In step S201, the failover control unit 4 determines whether or not there is a standby server yet to be selected to be processed in steps S202 to S203 in the plurality of standby servers associated with the active server. If there is a standby server yet to be selected, the process in FIG. 4 proceeds to step S202. If all the standby servers associated with the active server have been already selected, the process in FIG. 4 proceeds to step S204.

For example, in the example illustrated in FIG. 2, the server 30-1 is the active server, and the servers 30-2 to 30-7 are the standby servers. The failover control unit 4 determines whether or not there is a server yet to be selected in the servers 30-2 to 30-7.

In step S202, the failover control unit 4 selects one standby server yet to be selected. In the subsequent step S203, the failover control unit 4 instructs the calculation unit 3 to calculate the evaluation value for the selected standby server.

As described in detail later with reference to FIG. 7, an identifier (ID) is previously allocated to each of the servers 30-1 to 30-7 in the redundant system managed by the management server 1. Therefore, in step S203, the failover control unit 4 may inform the calculation unit 3 of the server to be evaluated by passing the ID of the selected standby server to the calculation unit 3 as an argument.

In response to the instruction from the failover control unit 4, in step S203, the calculation unit 3 calculates the evaluation value for the standby server with the specified ID. Step S203 corresponds to step S106 in FIG. 1.

As described above with reference to FIG. 2, according to the first to fifth embodiments, the comprehensive evaluation unit 3c of the calculation unit 3 calculates the evaluation value based on at least the evaluation results from the temperature evaluation unit 3a and the voltage evaluation unit 3b. In the following description, for the convenience of explanation, the values calculated by the temperature evaluation unit 3a, the voltage evaluation unit 3b and the comprehensive evaluation unit 3c will be referred to as a "temperature evaluation value", a "voltage evaluation value" and a "comprehensive evaluation value", respectively.

In addition, the degradation evaluation unit 3d also performs evaluation in the second, fourth and fifth embodiments, and the time evaluation unit 3e also performs evaluation in the third to fifth embodiments. In the following description, for the convenience of explanation, the values calculated by the degradation evaluation unit 3d and the time evaluation unit 3e will be referred to as a "degradation evaluation value" and a "time evaluation value", respectively.

Details of the comprehensive evaluation processing in step S203 in FIG. 4 vary with the embodiment. Details of the comprehensive evaluation processing will be described later with reference to FIGS. 9, 13, 17 and 20. In the first to fifth embodiments, the comprehensive evaluation unit 3c records the calculated comprehensive evaluation value in the management DB 5. After the comprehensive evaluation value is recorded in the management DB 5, the process in FIG. 4 returns to step S201.

According to the assumption described above with regard to step S106 in FIG. 1, the lower the comprehensive evaluation value, the lower the probability of occurrence of a future failure is. To avoid a secondary failure, failover preferably occurs to the standby server having the lowest comprehensive evaluation value.

In view of this, after the comprehensive evaluation values for all the standby servers are calculated and recorded in the management DB 5, in step S204, the failover control unit 4 refers to the management DB 5 to recognize the standby server having the lowest comprehensive evaluation value. To search for the standby server having the lowest comprehensive evaluation value, the failover control unit 4 may perform a sort processing using the comprehensive evaluation value as a sort key.

Alternatively, in step S203, the comprehensive evaluation unit 3c may compare the newly calculated comprehensive evaluation value with the comprehensive evaluation values recorded in the management DB 5 and insert the newly calculated comprehensive evaluation value at an appropriate position. Then, at the time of performing step S204, the calculated comprehensive evaluation values are recorded and sorted in the management DB 5. Therefore, in step S204, the failover control unit 4 may refer to the sorted data to recognize the standby server having the lowest comprehensive evaluation value.

In any case, in step S204, the failover control unit 4 performs failover to the standby server having the lowest comprehensive evaluation value. For example, if the server 30-7 has the lowest comprehensive evaluation value among the servers 30-2 to 30-7, the failover control unit 4 instructs the server 30-7 to start operating as an active server via the network. After that, the failover process in FIG. 4 ends. Step S204 is an example of step S108 in FIG. 1.

As described above, the failover process may occur as illustrated in FIG. 5. Although the comprehensive evaluation value is calculated for each standby server after a failure occurs in the active server according to the failover process in FIG. 4, the comprehensive evaluation value may be previously calculated and recorded in the management DB 5.

For example, the calculation unit 3 may calculate the comprehensive evaluation value according to a predetermined schedule, such as to calculate the comprehensive evaluation value for each standby server every one hour, and store the calculated comprehensive evaluation values in the management DB 5.

Then, if a failure actually occurs in the active server, the failover control unit 4 may acquire the calculated comprehensive evaluation value for each standby server from the management DB 5. And the failover control unit 4 may select an appropriate one standby server based on the acquired comprehensive evaluation values for the plurality of standby servers.

Specifically, in step S301 in FIG. 5, the failover control unit 4 determines whether or not there is a standby server yet to be selected to be processed in steps S302 to S304 in the plurality of standby servers associated with the active server. If there is a standby server yet to be selected, the process in FIG. 5 proceeds to step S302. If all the standby servers associated with the active server have been already selected, the process in FIG. 5 proceeds to step S305. Step S301 is similar to step S201.

In step S302, the failover control unit 4 selects one standby server yet to be selected. In the subsequent step S303, the failover control unit 4 acquires the calculated comprehensive evaluation value for the selected standby server from the management DB 5. The failover control unit 4 temporarily stores the acquired comprehensive evaluation value in the RAM 102 in association with the ID of the selected standby server.

In the subsequent step S304, the failover control unit 4 sorts the acquired comprehensive evaluation values. After that, the process returns to step S301.

By repeating the processing from step S301 to S304, the comprehensive evaluation values are stored one after another in the RAM 102 as described above. Therefore, in the n-th execution of step S304 (n≥1), the acquired n comprehensive evaluation values are stored in the RAM 102 in association with the IDs of the respective standby servers. In step S304, the failover control unit 4 sorts the acquired n comprehensive evaluation values.

After the comprehensive evaluation values for all the standby servers are sequentially acquired as described above, in step S305, the failover control unit 4 performs failover to the standby server having the lowest comprehensive evaluation value. As a result of the sort processing of step S304, the comprehensive evaluation values of all the standby servers have already been sorted at the time of performing step S305. Therefore, the failover control unit 4 may recognize the standby server having the lowest comprehensive evaluation value (that is, the standby server having the lowest probability of a secondary failure).

As with step S204 in FIG. 4, step S305 is an example of step S108 in FIG. 1. After the failover control unit 4 instructs the standby server having the lowest comprehensive evaluation value to start operating as an active server, the process in FIG. 5 ends.

As described above, the specific method of calculating the comprehensive evaluation value varies with the embodiment. In the following description, mathematical formulas will sometimes be referred to in relation to the calculation of the comprehensive evaluation value. Examples of constants that appear in the mathematical formulas described later will be described here in advance with reference to FIG. 6.

FIG. 6 illustrates coefficients 201 and weights 202 in table formats for the sake of convenience. However, the coefficients 201 and the weights 202 may be defined as fixed constant in the program executed by the CPU 101 to implement the calculation unit 3, for example.

Alternatively, the coefficients 201 and the weights 202 may be user-definable constants. In that case, the coefficients 201 and the weights 202 specified by the user may be recorded in a configuration file (not illustrated) in an appropriate format. The configuration file is stored in the nonvolatile storage device 106 of the management server 1. Of course, the management DB 5 may include a table for storing the user-definable coefficients 201 and weights 202.

In the table of the coefficients 201 in FIG. 6, each row contains a name that is given to a coefficient for convenience, a symbol that represents the coefficient in the mathematical formulas described later, and an exemplary value of the coefficient.

A self-coefficient $C_{self}$ indicates the extent to which an abnormality occurring in the standby server to be evaluated itself has an influence on the occurrence of a future failure in the standby server. An adjacency coefficient $C_{adj}$, a chassis coefficient $C_{chassis}$ and a rack coefficient $C_{rack}$ indicate the extent to which an abnormality occurring in another computer surrounding the standby server to be evaluated has an influence on the occurrence of a future failure in the standby server to be evaluated. A same-power-supply coefficient $C_{power}$ indicates the extent to which a failure cause estimated from the abnormality occurring in another computer surrounding the standby server to be evaluated (specifically, an abnormality in the power supply unit) has an influence on the occurrence of a future failure in the standby server to be evaluated.

Abnormalities are classified into several levels. For example, when a minor abnormality occurs in a server, the server may be able to recover from the abnormality after a while. Besides, if the abnormality is minor, the server may be able to continue to serve desired functions under the abnormal condition. That is, even though an abnormal phenomenon has occurred, it may be said that no failure has occurred from the viewpoint of the functionality of the server.

For example, in the case where a normal voltage range is defined by two threshold Th1 and Th2 (Th1 <Th2), a voltage lower than the threshold Th1 is an abnormal voltage, and a voltage higher than the threshold Th2 is also an abnormal voltage. However, a failure (that is, a state where the server would not serve desired functions) would occur or would not occur depending on the extent to which the actual voltage deviates from the normal voltage range.

As described above, even if an abnormality is occurring in the standby server to be evaluated, a failure will not necessarily occur in future in the standby server to be evaluated. However, the probability of occurrence of a future failure in the server in which some abnormality is occurring is probably higher than the probability of occurrence of a future failure in a server in which no abnormality is occurring. In view of this, the influence of the abnormality occurring in the standby server to be evaluated is reflected in the comprehensive evaluation value. The self-coefficient $C_{self}$ is a parameter that indicates the degree of the influence.

Similarly, even if an abnormality is occurring in a standby server associated with the standby server to be evaluated, a failure will not necessarily occur in future in the standby server to be evaluated. However, the probability of occurrence of a future failure in the server to be evaluated is probably higher than when some abnormality is occurring in a server in the surroundings than when no failure is occurring in a server in the surroundings. In view of this, the influence of the abnormality occurring in a server surrounding the standby server to be evaluated is reflected in the comprehensive evaluation value. The adjacency coefficient $C_{adj}$, the chassis coefficient $C_{chassis}$, the rack coefficient $C_{rack}$ and the same-power-supply coefficient $C_{power}$ are parameters that indicate the degree of the influence.

The "server in the surroundings" is, in other words, the "one or more predetermined computers" described above with reference to FIG. 1 (that is, one or more other computers whose failure-predictive information is used to calculate the evaluation value of the standby server to be evaluated). For example, if the standby server to be evaluated is a blade server, another server in the same chassis as the standby server to be evaluated (in particular, a server adjacent to the standby server to be evaluated in the chassis) is an example of the server in the surroundings associated with the standby server to be evaluated. Furthermore, another server in the same rack as the standby server to be evaluated and another server that shares the power supply unit with the standby server to be evaluated are also examples of the server in the surroundings associated with the standby server to be evaluated.

In the second, fourth and fifth embodiments, the degradation evaluation unit $3d$ calculates the degradation evaluation value. A power-on coefficient $C_{on}$, a degradation-over-time coefficient $C_{off}$, a temperature-dependent-degradation coefficient $C_{dgrTmpr}$ and a voltage-dependent-degradation coefficient $C_{dgrOvervol}$ are used for calculation of the degradation evaluation value. As described in detail later, these coefficients indicate the degree to which the probability of occurrence of a future failure increases because of a variety of degradations over time.

In the third to fifth embodiments, the time evaluation unit $3e$ calculates the time evaluation value. A one-month coefficient $C_{one}$, a two-month coefficient $C_{two}$ and a three-month coefficient $C_{three}$ are used for calculation of the time evaluation value.

As described in detail later, the time evaluation unit $3e$ evaluates the probability of occurrence of a future failure in a particular time zone in a day based on a history of past occurrences of abnormalities in the particular time zone. A result of the evaluation is the time evaluation value. The one-month coefficient $C_{one}$, the two-month coefficient $C_{two}$ and the three-month coefficient $C_{three}$ indicate the extent to which the probability of occurrence of a future failure in the particular time zone is associated with the history of past occurrences of abnormalities.

A correction constant $\epsilon$ is a constant used by the comprehensive evaluation unit $3c$ to calculate the comprehensive evaluation value. The correction constant $\epsilon$ is a positive small value used to prevent division by 0.

In the table of the weights 202 in FIG. 6, each row contains a description of a weight, a symbol that represents the weight in the mathematical formulas described later, a level of abnormality associated to the weight and an exemplary value of the weight. As described above, abnormalities are classified into several levels. In the following description, for the convenience of explanation, it is assumed that abnormalities are classified into three levels.

Specifically, a level 1 means a minor abnormality, and a weight $W_1$ is a weight for a minor abnormality. A level 2 means a serious abnormality, and a weight $W_2$ is a weight for a serious abnormality. A level 3 means a critical abnormality, and a weight $W_3$ is a weight for a critical abnormality.

To simplify mathematical formulas, a level 0, which means a normal state, is further defined. A weight $W_0$ indicates the normal state, and the value of the weight $W_0$ is 0. As illustrated in FIG. 6, the higher the level of the abnormality, the greater the value of the weight is.

Next, various evaluation values will be described in detail with reference to the coefficients 201 and weights 202 illustrated in FIG. 6 and mathematical formulas. Specifically, the evaluation values expressed by the mathematical formulas described below are calculated by the calculation unit 3 operating according to flowcharts described later.

In the following description, for the convenience of explanation, let $s_i$ be the server to be evaluated. In addition, let $f_{tmpr}(s_i)$ be a temperature evaluation value of the server $s_i$ calculated by the temperature evaluation unit $3a$. In the first to fifth embodiments, specifically, the temperature evaluation value $f_{tmpr}(s_i)$ is calculated according to the formula (1).

$$f_{tmpr}(s_i) = C_{self} w_{tmpr}(s_i) + C_{adj}\left(\sum_{s_j \in adj(s_i)} w_{tmpr}(s_j)\right) + \\ C_{chassis}\left(\sum_{s_j \in chassis(s_i)} w_{tmpr}(s_j)\right) + C_{rack}\left(\sum_{s_j \in rack(s_i)} w_{tmpr}(s_j)\right) \quad (1)$$

In the formula (1), the coefficients $C_{self}$, $C_{adj}$, $C_{chassis}$ and $C_{rack}$ may be the values illustrated in FIG. 6, for example. These coefficients satisfy the relation of the formula (2). The relation of the formula (2) means that the evaluation value of the server $s_i$ is calculated by placing more importance on the failure-predictive information collected from the server $s_i$ than on the failure-predictive information collected from one or more other servers surrounding the server $s_i$.

$$0 < C_{rack} < C_{chassis} < C_{adj} < C_{self} \quad (2)$$

The weights $w_{tmpr}(s_i)$ and $w_{tmpr}(s_j)$ in the formula (1) are defined by the formula (3). Specific examples of the weights $W_0$ to $W_3$ in the formula (3) are illustrated in FIG. 6, and the weights $W_0$ to $W_3$ satisfy the relation of the formula (4).

$$w_{tmpr}(s_i) = \begin{cases} W_0 = 0 & \text{(temperature of server } si \text{ is normal)} \\ W_1 & \begin{array}{l}\text{(minor temperature abnormality} \\ \text{is occuring in server } s_i)\end{array} \\ W_2 & \begin{array}{l}\text{(serious temperature abnormaility} \\ \text{is occuring in server } s_i)\end{array} \\ W_3 & \begin{array}{l}\text{(critical temperature abnormality} \\ \text{is occuring in server } s_i)\end{array} \end{cases} \quad (4)$$

$$0 = W_0 < W_1 < W_2 < W_3$$

The sets adj ($s_i$) chassis ($s_i$) and rack ($s_i$) in the formula (1) are defined by the formulas (5) to (7).

$$\text{adj}(s_i) = \{s_i | \text{server } s_i \text{ and } s_j \text{ adjacent to each other in one chassis}\} \quad (5)$$

$$\text{chassis}(s_i) = \{s_i | i \neq j \land \text{server } s_i \text{ and } s_j \text{ are in the same chassis} \land s_j \notin \text{adj}(s_i)\} \quad (6)$$

$$\text{rack}(s_i) = \{s_i | i \neq j \land \text{server } s_i \text{ and } s_j \text{ are in the same rack} \land s_j \notin \text{adj}(s_i) \land s_j \notin \text{chassis}(s_i)\} \quad (7)$$

According to the definitions of the formulas (5) and (6), if the server $s_i$ is a rack-mount server, the set adj ($s_i$) is an empty set, and the set chassis ($s_i$) is also an empty set.

As is apparent from the formulas (1) to (7), the first term of the formula (1) expresses the influence of a temperature abnormality occurring in the server $s_i$ on the occurrence of a future failure in the server $s_i$.

If the server $s_i$ is a rack-mount server, the second term and the third term are 0.

If the server $s_i$ is a blade server, the second term expresses the influence of a temperature abnormality occurring in a server $s_j$ adjacent to the server $s_i$ in one chassis on the occurrence of a future failure in the server $s_i$. If the server $s_i$ is a blade server, the third term expresses the influence of a temperature abnormality occurring in a server $s_j$ that is in the same chassis as the server $s_i$ but is not adjacent to the server $s_i$ on the occurrence of a future failure in the server $s_i$.

The fourth term expresses the influence of a temperature abnormality occurring in a server $s_j$ in the same rack as the server $s_i$ (except for any server in the same chassis as the server $s_i$ in the case where the server $s_i$ is a blade server) on the occurrence of a future failure in the server $s_i$.

Let $f_{vol}(s_i)$ be a voltage evaluation value calculated by the voltage evaluation unit $3b$. In the first to fifth embodiments, specifically, the voltage evaluation value $f_{vol}(s_i)$ is calculated according to the formula (8).

$$f_{vol}(s_i) = C_{self} w_{vol}(s_i) + C_{power}\left(\sum_{s_j \in \text{power}(s_i)} w_{vol}(s_j)\right) \quad (8)$$

In the formula (8), the values of the coefficients $C_{self}$ and $C_{power}$ may be the values illustrated in FIG. 6, for example. These coefficients satisfy the relation of the formula (9). The relation of the formula (9) means that the evaluation value of the server $s_i$ is calculated by placing more importance on the failure-predictive information collected from the server $s_i$ than on the failure-predictive information collected from one or more other servers surrounding the server $s_i$.

$$0 < C_{power} < C_{self} \quad (9)$$

The weights $w_{vol}(s_i)$ and $w_{vol}(s_j)$ in the formula (8) are defined by the formula (10). The weights $W_0$ to $W_3$ in the formula (10) satisfy the relation of the formula (4) as described above.

$$w_{vol}(s_i) = \begin{cases} W_0 = 0 & \text{(temperature of server } si \text{ is normal)} \\ W_1 & \begin{array}{l}\text{(minor temperature abnormality} \\ \text{is occuring in server } s_i)\end{array} \\ W_2 & \begin{array}{l}\text{(serious temperature abnormaility} \\ \text{is occuring in server } s_i)\end{array} \\ W_3 & \begin{array}{l}\text{(critical temperature abnormality} \\ \text{is occuring in server } s_i)\end{array} \end{cases} \quad (10)$$

The set power ($s_i$) in the formula (8) is defined by the formula (11).

$$\text{power}(s_i) = \{s_j | i \neq j \land \text{servers } s_i \text{ and } s_j \text{ use the same power supply unit in the rack}\} \quad (11)$$

The rack-mount server may be directly supplied with electric power by the power supply unit in the rack, while the blade server may be indirectly supplied with electric power by the power supply unit in the rack (that is, via the power supply unit in the chassis). According to the definition of the formula (11), however, the direct electric power supply and the indirect electric power supply are not discriminated for the sake of simplicity.

As is apparent from the formulas (8) to (11), in the formula (8), the first term expresses the influence of a voltage abnormality occurring in the server $s_i$ on the occurrence of a future failure in the server $s_i$. The second term expresses the influence of an abnormality in the power supply unit estimated from a voltage abnormality in another server $s_j$ that uses the same power supply unit as the server $s_i$ on the occurrence of a future failure in the server $s_i$.

Let $f_{dgr}(s_i)$ be the degradation evaluation value calculated by the degradation evaluation unit $3d$. In the second, fourth and fifth embodiments, specifically, the degradation evaluation value $f_{dgr}(s_i)$ is calculated according to the formula (12).

$$f_{dgr}(s_i) = C_{on} t_{on}(s_i) + C_{off} t_{off}(s_i) + f_{dgrTmpr}(s_i) + f_{dgrOvervol}(s_i) \quad (12)$$

The values of the coefficients $C_{on}$ and $C_{off}$ in the formula (12) may be the values illustrated in FIG. 6, for example.

In the formula (12), the function $t_{on}(s_i)$ expresses the total length of time for which the server $s_i$ has been powered on. The function $t_{off}(s_i)$ expresses the total length of time for which the server $s_i$ has been powered off.

That is, the first term of the formula (12) means that the server $s_i$ degrades over time even if the server $s_i$ normally operates. The first term expresses the influence of such a degradation over time on the occurrence of a future failure in the server $s_i$.

The second term of the formula (12) means that the server $s_i$ degrades over time even if the server $s_i$ is not powered on (that is, even if the server $s_i$ does not perform any processing). The second term expresses the influence of such a degradation over time on the occurrence of a future failure in the server $s_i$.

The third term and the fourth term of the formula (12) are defined by the formulas (13) and (14), respectively.

$$f_{dgrTmpr}(s_i) = C_{dgrTmpr}\left(\sum_{h=1}^{L} W_h t_{tmpr}(s_i, h)\right) \quad (13)$$

$$f_{dgrOvervol}(s_i) = C_{dgrOvervol}\left(\sum_{h=1}^{L} W_h t_{overvol}(s_i, h)\right) \quad (14)$$

The constant L in the formulas (13) and (14) denotes the number of levels of abnormalities. In the example illustrated in FIG. 6, L=3. Of course, the value of the constant L may be 1, 2, 4 or more depending on the embodiment.

The function $t_{tmpr}(s_i, h)$ in the formula (13) expresses the total length of time for which a temperature abnormality at a level h has lasted in the server $s_i$. The function $t_{overvol}(s_i, h)$ in the formula (14) expresses the total length of time for which a overvoltage at a level h has lasted in the server $s_i$.

For example, suppose that a temperature abnormality at a level 1 has occurred twice in the server $s_i$, the first temperature abnormality continued for 2 hours, and the second temperature abnormality continued for 0.5 hours. In this case, the value of the function $t_{tmpr}(s_i, 1)$ is 2.5.

The degradation of the server $s_i$ is more significant in the case where a temperature abnormality occurs in the server $s_i$ than in the case where the server $s_i$ is in the normal state. The more significant the degradation, the higher the probability of occurrence of a future failure in the server $s_i$ is. The formula (13) expresses the influence of an additional degradation due to a temperature abnormality on the occurrence of a future failure in the server $s_i$.

Voltage abnormalities are classified into two types: undervoltage and overvoltage. The overvoltage has a greater influence on the degradation than the undervoltage. The formulas (12) and (14) are based on the assumption that the extra degradation added to the normal degradation over time due to the undervoltage is negligible.

In other words, the degradation of the server $s_i$ in the case where an undervoltage occurs in the server $s_i$ is substantially the same as the degradation of the server $s_i$ in the case where the server $s_i$ is in the normal state. Therefore, the degradation evaluation unit 3d may omit considering the extra degradation due to the undervoltage in calculating the degradation evaluation value $f_{dgr}(s_i)$.

On the other hand, the degradation of the server $s_i$ in the case where an overvoltage occurs in the server $s_i$ is more significant than the degradation of the server $s_i$ in the case where the server $s_i$ is in the normal state. And the more significant the degradation, the higher the probability of occurrence of a future failure in the server $s_i$ is. The formula (14) expresses the influence of the extra degradation due to the overvoltage on the occurrence of a future failure in the server $s_i$.

Of course, depending on the embodiment, the formula (12) may be modified in order to take into consideration the extra degradation due to the undervoltage. That is, the degradation evaluation unit 3d may calculate the degradation evaluation value according to the modified formula.

The values of the temperature-dependent-degradation coefficient $C_{dgrTmpr}$ and the voltage-dependent-degradation coefficient $C_{dgrOvervol}$ in the formulas (13) and (14) may be the values illustrated in FIG. 6, for example. The coefficients in the formulas (12) to (14) satisfy the relation of the formula (15).

$$(0<C_{off}<C_{on}) \wedge (0<C_{dgrTmpr}) \wedge (0<C_{dgrOvervol})=true \quad (15)$$

The second, fourth and fifth embodiments may be modified so that the degradation evaluation unit 3d calculates the degradation evaluation value according to a formula other than the formula (12).

For example, if an abnormality occurs in a server in the surroundings of the server $s_i$ to be evaluated, the abnormality may have an influence on the degradation of the server $s_i$. For example, if a server near the server $s_i$ has an abnormally high temperature, the heat from the server near the server $s_i$ may promote degradation of the server $s_i$.

In view of this, the degradation evaluation unit 3d may take into consideration such an indirect degradation of the server $s_i$ caused by an abnormality occurring in a server in the surroundings. Specifically, the degradation evaluation unit 3d may calculate the degradation evaluation value according to the formula (16), instead of the formula (12).

$$f_{dgr}(s_i)=C_{on}t_{on}(s_i)+C_{off}t_{off}(s_i)+f_{dgrTmpr}(s_i)+f_{dgrOvervol}(s_i)+f_{indir}(s_i) \quad (16)$$

The fifth term of the right side of the formula (16) expresses an indirect influence of a server in the surroundings and specifically may be defined by the formula (17). Depending on the embodiment, one of the first term and the second term of the right side of the formula (17) may be omitted. Details of the formula (17) may be expressed by the formulas (18) and (19).

$$f_{indir}(s_i) = C_{indirTmpr}f_{indirTmpr}(s_i) + C_{indirOverall}f_{indirOvervol}(s_i) \quad (17)$$

$$f_{indirTmpr}(s_i) = C_{adj}\left(\sum_{s_j \in adj(s_i)} \sum_{h=1}^{L} W_h t_{tmpr}(s_j, h)\right) + \quad (18)$$

$$C_{chassis}\left(\sum_{s_j \in chassis(s_i)} \sum_{h=1}^{L} W_h t_{tmpr}(s_j, h)\right) +$$

$$C_{rack}\left(\sum_{s_j \in rack(s_i)} \sum_{h=1}^{L} W_h t_{tmpr}(s_j, h)\right)$$

$$f_{indirOvervol}(s_i) = C_{power}\left(\sum_{s_j \in power(s_i)} \sum_{h=1}^{L} W_h t_{overvol}(s_j, h)\right) \quad (19)$$

The coefficient $C_{indirTmpr}$ in the formula (17) has an appropriate positive value smaller than the coefficient $C_{dgrTmpr}$ in the formula (13). The coefficient $C_{indirOvervol}$ in the formula (17) has an appropriate positive value smaller than the coefficient $C_{dgrOvervol}$ in the formula (14). The other various coefficients and functions in the formulas (17) through (19) have been already described.

In other modifications, the degradation evaluation unit 3d may calculate the degradation evaluation value according to the formula (20) or (21), instead of the formula (12).

$$f_{dgr}(s_i)=C_{on}t_{on}(s_i)+C_{off}t_{off}(s_i)+f_{dgrTmpr}(s_i)+f_{dgrOvervol}(s_i)+f_{model}(s_i) \quad (20)$$

$$f_{dgr}(s_i)=C_{on}t_{on}(s_i)+C_{off}t_{off}(s_i)+f_{dgrTmpr}(s_i)+f_{dgrOvervol}(s_i)+f_{indir}(s_i)+f_{model}(s_i) \quad (21)$$

The formulas (20) and (21) are based on the following consideration. If an abnormality tends to occur in another server of the same model as the server $s_i$ to be evaluated, the probability of occurrence of the abnormality in the server $s_i$ is estimated to be high. The reason why an abnormality tends to occur in a server of the model may be because the model is somewhat inappropriately designed or because the model is old. Even if the model is old, the design of the model does not necessarily have any problem. Nevertheless, the server of the model has probably been used for a long time, so that the degradation over time of the server of the old model is estimated to be relatively significant.

That is, regardless of whether the reason why an abnormality tends to occur in a server of the model is either of the two described above, it is estimated that the probability of occurrence of an abnormality in the server $s_i$ is high if the abnormality tends to occur in another server of the same model as the server $s_i$. And if an abnormality tends to occur, a failure also tends to occur. To take into consideration the tendency of occurrence of an abnormality in another server of the same model, the degradation evaluation unit $3d$ may calculate the degradation evaluation value according to the formula (20) or (21).

The evaluation function $f_{model}(s_i)$ in the formulas (20) and (21) expresses the tendency of occurrence of an abnormality in another server of the same model as the server $s_i$ and specifically is defined by the formula (22), for example.

$$f_{model}(s_i) = \frac{C_{model}}{|model(s_i)|} \times \sum_{s_j \in model(s_i)} \left( \sum_{h=1}^{L} W_h t_{tmpr}(s_j, h) + \sum_{h=1}^{L} W_h t_{vol}(s_j, h) \right) \quad (22)$$

Although the coefficient $C_{model}$ in the formula (22) is not illustrated in FIG. 6, the coefficient $C_{model}$ is an appropriate positive coefficient. The function $t_{vol}(s_i, h)$ in the formula (22) expresses the total length of time for which a voltage abnormality (that is, an undervoltage or an overvoltage) at a level $h$ has lasted in the server $s_i$.

The set model $(s_i)$ in the formula (22) is defined by the formula (23).

$$model(s_i) = \{s_j | i \neq j \wedge \text{server } s_i \text{ and } s_j \text{ are of the same model}\} \quad (23)$$

The number of elements of the set model $(s_i)$ may vary with the model, so that the formula (22) includes a division by the number of elements of the set model $(s_i)$ for normalization. If the set model $(s_i)$ is an empty set, the evaluation function $f_{model}(s_i)$ is defined to be 0.

As described above with reference to FIG. 5, the comprehensive evaluation value may be previously regularly calculated and recorded in the management DB 5 or the like, regardless of occurrence of a failure in the active server. In that case, another evaluation value (the temperature evaluation value, for example) used for calculation of the comprehensive evaluation value may also be recorded.

The temperature evaluation value and the voltage evaluation value reflect the conditions at the time of calculation thereof. Therefore, the temperature evaluation value and the voltage evaluation value are simply overwritten with newly calculated values each time the values are calculated. Similarly, the time evaluation value is also simply overwritten with a newly calculated value each time the value is calculated.

On the other hand, the degradation evaluation value may be updated by simple overwrite as with the other kinds of evaluation values but may be further updated as required. Specifically, in any of the cases described below, the degradation evaluation unit $3d$ may update the recorded degradation value $f_{dgr}(s_i)$ according to the formula (24).

A case where a component of the server $s_i$ is removed.
A case where a new component is attached to the server $s_i$.
A case where a component of the server $s_i$ is replaced with a new component.

$$f_{dgr}(s_i) = \left(1 - \frac{\text{replaced}(s_i) + \text{incdec}(s_i)}{\text{removable}(s_i) + C_{body}}\right) f_{dgr}(s_i) \quad (24)$$

In the formula (24), the degradation evaluation value $f_{dgr}(s_i)$ in the right side is the previous degradation evaluation value (that is, the recorded degradation evaluation value), and the degradation evaluation value $f_{dgr}(s_i)$ in the left side is the updated new degradation evaluation value. The body coefficient $C_{body}$ in the formula (24) is an appropriate positive value, although the body coefficient $C_{body}$ is omitted in FIG. 6. The body coefficient $C_{body}$ expresses the influence of a component that is included in the body of the server $s_i$ and would not be removed.

The function replaced $(s_i)$ in the formula (24) expresses the number of components of the server $s_i$ replaced this time. For example, if two expansion cards are replaced with two new expansion cards, the value of the function replaced $(s_i)$ is 2.

The function incdec $(s_i)$ in the formula (24) expresses the increment or decrement in number of components in the server $s_i$. For example, if one NIC is removed from the server $s_i$, the value of the function incdec $(s_i)$ is 1. If three new memory modules are attached to the servers $s_i$, the value of the function incdec $(s_i)$ is 3.

The function removable $(s_i)$ in the formula (24) expresses the maximum number of removable components that may be mounted on the server $s_i$. Examples of the removable component include a memory module, a CPU, an interface card, such as a NIC or a host bus adapter (HBA), other kinds of expansion cards, a power supply unit, a fan and an HDD.

As is apparent from the definitions of the functions replaced $(s_i)$, incdec $(s_i)$ and removable $(s_i)$, the relation of the formula (25) holds.

$$\text{removable}(s_i) \geq \text{replaced}(s_i) + \text{incdec}(s_i) \quad (25)$$

The value of the multiplier by which the previous degradation evaluation value in the right side of the formula (24) is multiplied is greater than 0 and smaller than 1. This is because the body coefficient $C_{body}$ is positive, and the relation of the formula (25) holds.

That is, the reason why the degradation evaluation value is updated by the degradation evaluation unit $3d$ according to the formula (24) is because it is predicted that replacement, addition or removal of a component will lead to a decrease of the probability of occurrence of a future failure in the server $s_i$. Grounds for this prediction are as follows.

Replacement of an old component with a new component may be regarded as replacement of a component in which an abnormality tends to occur with a component in which an abnormality less tends to occur. Therefore, if replacement of an old component occurs, the probability of occurrence of a future failure in the server $s_i$ due to degradation over time is predicted to decrease.

Simple removal of an old component from the server $s_i$ may be regarded as a decrease of the number of components in which an abnormality tends to occur. Therefore, if removal of an old component occurs, an abnormality due to degradation over time is less likely to occur in the server $s_i$ as a whole, and therefore, a failure is also less likely to occur.

Addition of a new component to the server $s_i$ may be regarded as an increase of the percentage of the components in which an abnormality is less likely to occur in the components of the server $s_i$. Therefore, if addition of a new component occurs, an abnormality due to degradation over time is less likely to occur in the server $s_i$ as a whole, and therefore, a failure is also less likely to occur.

Based on the considerations described above, the degradation evaluation unit $3d$ may update the degradation evaluation value according to the formula (24), for example. Of course, depending on the embodiment, the degradation evaluation unit $3d$ may update the degradation evaluation value according to an appropriate formula other than the formula (24) when replacement, addition or removal of a component occurs in the server $s_i$.

Let $f_{time}(s_i, p)$ be the time evaluation value calculated by the time evaluation unit $3e$. Then, in the third to fifth embodiments, specifically, the time evaluation value $f_{time}(s_i, p)$ is calculated according to the formula (26).

$$f_{time}(s_i, p) = C_{one}\left(\sum_{h=1}^{L} W_h freq_{monthly}(s_i, h, 1, p)\right) + \\ C_{two}\left(\sum_{h=1}^{L} W_h freq_{monthly}(s_i, h, 2, p)\right) + \\ C_{three}\left(\sum_{h=1}^{L} W_h freq_{monthly}(s_i, h, 3, p)\right) \quad (26)$$

The second augment p in the time evaluation $f_{time}(s_i, p)$ in the formula (26) expresses a time zone in a day. The time zone p may be specified to the time evaluation unit $3e$ by the calculation unit 3 or determined by the time evaluation unit $3e$ based on the current time. For example, the time zone p may be a time zone of one hour from 09:00 hours to 10:00 hours. The length of the time zone p may be arbitrarily set in each embodiment.

The time evaluation value $f_{time}(s_i, p)$ expresses the probability of occurrence of a failure in the server $s_i$ in the time zone p in a day. Under certain conditions, the voltage of the server $s_i$ may be unstable in a particular time zone p, or the temperature of the server $s_i$ may tend to increase in a particular time zone p. And a failure may tend to occur in the server $s_i$ in a particular time zone p.

The "certain conditions" described above are the conditions described below, for example.
The server $s_i$ is a standby server in a redundant system based on the cold standby scheme.
When the active server is normally operating, the standby server $s_i$ is used for providing another service irrelevant to the processing performed by the active server.
An enormous amount of access to the service provided by the standby server $s_i$ concentratedly occurs in a particular time zone p.

Under the conditions described above, for example, the tendency of occurrence of a failure may depend on time. The time evaluation value $f_{time}(s_i, p)$ expresses the time-dependent ease of occurrence of a failure based on a history of past failures.

The function $freq_{monthly}(s_i, h, m, p)$ in the formula (26) expresses the frequency of an abnormality at a level h that occurred at least once in the server $s_i$ in the time zone p in the last m months. Note that an abnormality that occurs on a day may last into the next day or longer. Such an abnormality may be counted as one for the sake of simplicity or as the number of days for which the abnormality lasts for more precise prediction.

For example, consider a case where an abnormality that occurred on Oct. 1, 2011 at 09:30 hours lasted until Oct. 3, 2011 at 11:00 hours. And it is assumed that the time zone p was one hour from 09:00 hours to 10:00 hours.

In this case, the frequency of the abnormality may be counted as three, because the period for which the abnormality lasted overlapped with the time zone p in Oct. 1, 2011, the time zone p in Oct. 2, 2011 and the time zone p in Oct. 3, 2011.

The values of the coefficient $C_{one}$, $C_{two}$ and $C_{three}$ in the formula (26) may be the values illustrated in FIG. 6, for example. These coefficients satisfy the relation of the formula (27). The relation of the formula (27) means that the probability of occurrence of a future failure is evaluated by placing more importance on a newer history than on an older history.

$$0 < C_{three} < C_{two} < C_{one} \quad (27)$$

The third to fifth embodiments may be modified so that the time evaluation unit $3e$ calculate the time evaluation value according to a formula other than the formula (26). For example, although the granularity of the formula (26) is a month, another granularity (a week or a day, for example) may be used to calculate the time evaluation value. Although the range of relevant abnormalities in the formula (26) is the last three months, the range may be arbitrarily set in each embodiment. For example, the time evaluation unit $3e$ may calculate the time evaluation value $f_{time}(s_i, p)$ according to the formula (28).

$$f_{time}(s_i, p) = \sum_{Oldest \le d \le Today}\left(g(Today - d)\left(\sum_{h=1}^{L} W_h freq_{dayly}(s_i, h, d, p)\right)\right) \quad (28)$$

The index variable d in the formula (28) denotes date. "Today" denotes the date on which the time evaluation unit $3e$ calculate the time evaluation value. The date "Oldest" in the formula (28) is the date that defines the range of the history considered in calculation of the time evaluation value and may be arbitrarily determined in each embodiment.

The function $freq_{dayly}$ (Si, h, d, p) in the formula (28) expresses the frequency of an abnormality at a level h that occurred in the server $s_i$ in at least a part of the time zone p of the date d. For example, in the time zone p of a date d, both a temperature abnormality at a level h and a voltage abnormality at the level h may occur. In that case, the value of the function $freq_{dayly}$ (Si, h, d, p) is 2.

The function $g(x)$ in the formula (28) may be any monotonically decreasing function that returns a value equal to or greater than 0 in response to a value x equal to or greater than 0.

The comprehensive evaluation unit $3c$ calculates the comprehensive evaluation value $f_{total}(s_i)$ according to the formula (29) in the first embodiment, and calculates the comprehensive evaluation value $f_{total}(s_i)$ according to the formula (30) in the second embodiment. And the comprehensive evaluation unit $3c$ calculates the comprehensive evaluation value $f_{total}(s_i)$ according to the formula (31) in the third embodiment, and calculates the comprehensive evaluation value $f_{total}(s_i)$ according to the formula (32) in the fourth to fifth embodiments.

$$f_{total}(s_i) = f_{tot}(s_i) \quad (29)$$

$$f_{total}(s_i) = f_{tot}(s_i) + f_{dgr}(s_i) \quad (30)$$

$$f_{total}(s_i) = f_{tot}(s_i) + f_{time}(s_i, period(Now)) \quad (31)$$

$$f_{total}(s_i) = f_{tot}(s_i) + f_{dgr}(s_i) + f_{time}(s_i, period(Now)) \quad (32)$$

The function $f_{tot}(s_i)$ in the formulas (29) to (32) is a weighted sum of the temperature evaluation value $f_{tmpr}(s_i)$ and the voltage evaluation value $f_{vol}(s_i)$. The weighting depends on the tendency of occurrence of a temperature abnormality in the server $s_i$ and the tendency of occurrence of a voltage abnormality in the server $s_i$.

In other words, the function $f_{tot}(s_i)$ depends on the following two values.

- A value that indicates the tendency of occurrence of a failure related to a temperature-related phenomenon (specifically, a temperature abnormality) in the server $s_i$.
- A value that indicates the tendency of occurrence of a failure related to a voltage-related phenomenon (specifically, an undervoltage or an overvoltage) in the server $s_i$.

The above two values are values obtained based on the failure-predictive information collected from the server $s_i$ and are based on a history of temperature abnormalities and voltage abnormalities that occurred in the server $s_i$ in the past. The weighting places more importance on the temperature evaluation value for a server in which a temperature abnormality tends to occur, and places more importance on the voltage evaluation value for a server in which a voltage abnormality tends to occur. Further details of the function $f_{tot}(s_i)$ will be described later along with the formulas (34) through (38).

The constant Now in the formulas (31) and (32) denotes the point in time at which the comprehensive evaluation unit 3c calculates the comprehensive evaluation value. The function period (Now) expresses an appropriate time zone including the point in time Now. The function period (Now) may be a period of one hour including the point in time Now.

The formulas (29) to (32) may be generalized into the formula (33). The three coefficients $C_{tot}$, $C_{dgr}$ and $C_{time}$ are arbitrary values equal to or greater than 0. For example, the formula (29) is the formula (33) in the case where $C_{tot}=1$, $C_{dgr}=0$ and $C_{time}=0$. Using appropriate coefficients $C_{tot}$, $C_{dgr}$ and $C_{time}$ depending on the embodiment, the comprehensive evaluation unit 3c may calculate the comprehensive evaluation according to the formula (33).

$$f_{total}(s_i) = C_{tot}f_{tot}(s_i) + C_{dgr}f_{dgr}(s_i) + C_{time}f_{time}(s_i, \text{period}(\text{Now})) \quad (33)$$

Now, the function $f_{tot}(s_i)$ in the formulas (29) to (33) will be described. In the first to fifth embodiments, specifically, the function $f_{tot}(s_i)$ is defined by the formula (34).

$$f_{tot}(s_i) = \frac{(\varepsilon + t_{tmpr}(s_i))f_{tmpr}(s_i) + (\varepsilon + t_{vol}(s_i))f_{vol}(s_i)}{2\varepsilon + t_{tmpr}(s_i) + t_{vol}(s_i)} \quad (34)$$

The value of the constant $\varepsilon$ in the formula (34) may be the value illustrated in FIG. 6, for example. The constant $\varepsilon$ is a positive extremely small value for preventing division by 0.

The function $t_{tmpr}(s_i)$ in the formula (34) is defined by the formula (35), and the function $t_{vol}(s_i)$ is defined by the formula (36). The function $t_{tmpr}(s_i, h)$ in the formula (35) has already been described above with regard to the formula (13). The function $t_{vol}(s_i, h)$ in the formula (35) has already been described above with regard to the formula (22).

$$t_{tmpr}(s_i) = \sum_{h=1}^{L} t_{tmpr}(s_i, h) \quad (35)$$

$$t_{vol}(s_i) = \sum_{h=1}^{L} t_{vol}(s_i, h) \quad (36)$$

That is, the function $t_{tmpr}(s_i)$ in the formula (35) expresses the total length of time for which each of one or more temperature abnormalities has lasted in the server $s_i$. Of course, if no temperature abnormality has occurred in the server $s_i$, the value of the function $t_{tmpr}(s_i)$ is 0.

The function $t_{vol}(s_i)$ in the formula (36) expresses the total length of time for which each of one or more voltage abnormalities has lasted in the server $s_i$. Of course, if no voltage abnormality has occurred in the server $s_i$, the value of the function $t_{vol}(s_i)$ is 0.

For the sake of simplicity, the formulas (35) and (36) do not take into consideration the difference in abnormality level. Depending on the embodiment, however, a weighted sum with a weight Wh depending on the abnormality level may be used instead of the simple sum like the formulas (35) and (36).

Here, consider a case where a temperature abnormality or a voltage abnormality has occurred at least once in the server $s_i$. In this case, if the constant $\varepsilon$ is regarded as 0, the formula (34) may be expressed in approximation as the formula (37).

$$f_{tot} \approx \frac{t_{tmpr}(s_i)}{t_{tmpr}(s_i) + t_{vol}(s_i)} f_{tmpr}(s_i) \ldots + \frac{t_{vol}(s_i)}{t_{tmpr}(s_i) + t_{vol}(s_i)} f_{vol}(s_i) \quad (37)$$

As may be seen from the approximate formula (37), the function $f_{tot}(s_i)$ is a function used to calculate a weighted sum of the temperature evaluation value $f_{tmpr}(s_i)$ and the voltage evaluation value $f_{vol}(s_i)$. The weight by which the temperature evaluation value $f_{tmpr}(s_i)$ is multiplied is the ratio of the total length of time for which temperature abnormalities have lasted in the server $s_i$ to the total length of time for which temperature abnormalities and voltage abnormalities have lasted in the server $s_i$. On the other hand, the weight by which the voltage evaluation value $f_{vol}(s_i)$ is multiplied is the ratio of the total length of time for which voltage abnormalities have lasted in the server $s_i$ to the total length of time for which temperature abnormalities and voltage abnormalities have lasted in the server $s_i$.

Which abnormality of the temperature abnormality and the voltage abnormality is more likely to occur may depend on the individual server. And the extent to which the tendency of occurrence of the temperature abnormality and the tendency of occurrence of the voltage abnormality differ may depend on the individual server. That is, the ratio between the tendency of occurrence of the temperature abnormality and the tendency of occurrence of the voltage abnormality is properties specific to each server.

The weighting of the formula (34) expressed in approximation as the formula (37) reflects the properties specific to the server $s_i$. If the temperature abnormality is more likely to occur in the server $s_i$ than the voltage abnormality, more importance is placed on the temperature abnormality for the server $s_i$. To the contrary, if the voltage abnormality is more likely to occur in the server $s_i$ than the temperature abnormality, more importance is placed on the voltage abnormality for the server $s_i$.

As shown by the formulas (29) to (33), comprehensive evaluation value $f_{total}(s_i)$ reflects the value of the function $f_{tot}(s_i)$. That is, in any of the first to fifth embodiments, the comprehensive evaluation unit 3c comprehensively evaluates each standby server by taking into consideration the properties specific to the standby server. As a result, the failover control unit 4 may perform failover to an optimum standby server.

If neither a temperature abnormality nor a voltage abnormality has occurred in the server $s_i$, the formula (38) may be derived from the formula (34). If no abnormality has actually occurred in the server $s_i$, the type of the abnormality that tends to occur in the server $s_i$ is unknown. Therefore, in that case, it is appropriate to assume that the tendency of occurrence of the temperature abnormality and the tendency of occurrence of the voltage abnormality are equal in the server $s_i$. The formula (38) expresses this assumption.

$$f_{tot}(s_i) = \frac{1}{2}(f_{tmpr}(s_i) + f_{vol}(s_i)) \quad (38)$$

Specific mathematical formulas have been described in order to provide a summary of the first to fifth embodiments. Of course, however, the various parts in the calculation unit 3 may calculate their respective evaluation values according to other formulas than the formulas described above.

In the following, specific examples of data and flowcharts for implementing the calculation of the comprehensive evaluation value according to the formulas described above will be described. FIG. 7 is a diagram illustrating a server table and a chassis table included in the management DB 5 in FIG. 2.

A server table 203 in FIG. 7 contains seven entries. The seven entries correspond to the seven servers 30-1 to 30-7 in FIG. 2 managed by the management server 1. Each entry includes twelve fields: a server ID, a chassis ID, a slot ID, a rack ID, an in-rack position, a serial number, the number of CPUs, a memory size, the number of NICs, the number of cards, an in-chassis power supply ID and an in-rack power supply ID.

The server ID is an ID that identifies a server. A different server ID is previously allocated to each of the plurality of servers managed by the management server 1.

The chassis ID and the slot ID are valid only in an entry corresponding to a blade server. In an entry corresponding to a blade server, the chassis ID is an ID that identifies the chassis on which the server is mounted, and the slot ID is an ID that identifies the slot in which the server is inserted.

The value of the slot ID is only required to be unique in one chassis. In the following description, however, for the sake of simplicity of explanation, it is assumed that the slot ID is a numerical value, and the value of the slot ID indicates the position in the chassis. For example, the slot indicated by a slot ID of 2 is adjacent to two slots indicated by slot IDs of 1 and 3. In an entry corresponding to a rack-mount server, the values of the chassis ID and the slot ID are invalid.

The rack ID and the in-rack position are valid only in an entry corresponding to a rack-mount server. In an entry corresponding to a rack-mount server, the rack ID is an ID that identifies the rack on which the server is mounted, and the in-rack position is an ID that identifies a position in the rack on which the server is mounted.

The value of the in-rack position is only required to be unique in one rack. In an entry corresponding to a blade server, the values of the rack ID and the in-rack position are invalid.

The serial number is a production number specific to the server. Although it is called "serial number" for the sake of convenience, the serial number may be any combination of symbols and numerals.

The number of CPUs is the number of CPUs mounted on the server. The memory size is a numerical value that indicates the capacity of a memory mounted on the server in units of megabytes (MB). The number of NICs is a sum of the number of NICs attached to the server and the number of onboard network interface controllers incorporated in the server. The number of cards is the number of expansion cards (graphics cards, for example) other than the NICs attached to the server.

The in-chassis power supply ID is valid only in an entry corresponding to a blade server. In the entry corresponding to a blade server, the in-chassis power supply ID is an ID that identifies the power supply unit in the chassis connected to the server. The value of the in-chassis power supply ID is only required to be unique in one chassis. In an entry corresponding to a rack-mount server, the value of the in-chassis power supply ID is invalid.

The in-rack power supply ID is valid only in an entry corresponding to a rack-mount server. In the entry corresponding to a rack-mount server, the in-rack power supply ID is an ID that identifies the power supply unit in the rack connected to the server. The value of the in-chassis power supply ID is only required to be unique in one rack. In an entry corresponding to a blade server, the value of the in-rack power supply ID is invalid.

In the following, each entry of the server table 203 in FIG. 7 will be described in comparison with FIG. 2.

The server ID of the blade server 30-1 is "1". The server 30-1 is mounted in the slot having a slot ID of "1" in the chassis 20-1 having a chassis ID of "1". The serial number of the server 30-1 is "A1", the server 30-1 has two CPUs 101, and the capacity of the RAM 102 of the server 30-1 is 2048 MB. The server 30-1 has four network interfaces 103, so that the number of NICs is 4. Furthermore, one expansion card is attached to the server 30-1. The server 30-1 is supplied with electric power from the power supply unit 23-1 having an in-chassis power supply ID of "1".

The server ID of the blade server 30-2 is "2". The server 30-2 is mounted in the slot having a slot ID of "4" in the chassis 20-1 having a chassis ID of "1". The serial number of the server 30-2 is "B1", the server 30-2 has two CPUs 101, and the capacity of the RAM 102 of the server 30-2 is 2048 MB. The server 30-2 has four network interfaces 103, so that the number of NICs is 4. Furthermore, one expansion card is attached to the server 30-2. The server 30-2 is supplied with electric power from the power supply unit 23-2 having an in-chassis power supply ID of "2".

The server ID of the blade server 30-3 is "3". The server 30-3 is mounted in the slot having a slot ID of "5" in the chassis 20-1 having a chassis ID of "1". The serial number of the server 30-3 is "C1", the server 30-3 has two CPUs 101, and the capacity of the RAM 102 of the server 30-3 is 2048 MB. The server 30-3 has four network interfaces 103, so that the number of NICs is 4. Furthermore, one expansion card is attached to the server 30-3. The server 30-3 is supplied with electric power from the power supply unit 23-2 having an in-chassis power supply ID of "2".

The server ID of the blade server 30-4 is "4". The server 30-4 is mounted in the slot having a slot ID of "3" in the chassis 20-2 having a chassis ID of "2". The serial number of the server 30-4 is "D1", the server 30-4 has four CPUs 101, and the capacity of the RAM 102 of the server 30-4 is 4096 MB. The server 30-4 has two network interfaces 103, so that the number of NICs is 2. Furthermore, two expansion cards are attached to the server 30-4. The server 30-4 is supplied with electric power from the power supply unit 23-3 having an in-chassis power supply ID of "3".

The server ID of the blade server 30-5 is "5". The server 30-5 is mounted in the slot having a slot ID of "4" in the chassis 20-2 having a chassis ID of "2". The serial number of the server 30-5 is "E1", the server 30-5 has four CPUs 101, and the capacity of the RAM 102 of the server 30-5 is 4096 MB. The server 30-5 has two network interfaces 103, so that the number of NICs is 2. Furthermore, two expansion cards are attached to the server 30-5. The server 30-5 is supplied with electric power from the power supply unit 23-3 having an in-chassis power supply ID of "3".

The server ID of the rack-mount server 30-6 is "6". The server 30-6 is mounted at the position identified by the value "1" in the rack 10-3 having a rack ID of "3". The serial number of the server 30-6 is "F1", the server 30-6 has two CPUs 101, and the capacity of the RAM 102 of the server 30-6 is 1024 MB. The server 30-6 has six network interfaces 103, so that the number of NICs is 6. Furthermore, two expansion cards are attached to the server 30-6. The server 30-6 is supplied with electric power from the power supply unit 12-3 having an in-rack power supply ID of "3".

The server ID of the rack-mount server 30-7 is "7". The server 30-7 is mounted at the position identified by the value "2" in the rack 10-3 having a rack ID of "3". The serial number of the server 30-7 is "G1", the server 30-7 has two CPUs 101, and the capacity of the RAM 102 of the server 30-7 is 1024 MB. The server 30-7 has six network interfaces 103, so that the number of NICs is 6. Furthermore, two expansion cards are attached to the server 30-7. The server 30-7 is supplied with electric power from the power supply unit 12-3 having an in-rack power supply ID of "3".

FIG. 7 also illustrates a chassis table 204. The chassis table 204 contains two entries. The two entries correspond to the chassis 20-1 to 20-2 in FIG. 2. Each entry includes four fields: a chassis ID, a rack ID, an in-rack position and an in-rack power supply ID.

The chassis ID is an ID that identifies a chassis, and the rack ID is an ID that identifies the rack on which the chassis is mounted. The in-rack position indicates the range that the chassis occupies in the rack. The height of the chassis of the blade server may be 6U or 10U, for example, so that the range that the chassis occupies in the rack may vary with the chassis. The range that the chassis occupies in the rack may be indicated by using a pair of IDs that identify the position in the rack. The symbol "U" denotes a rack unit. The in-rack power supply ID is an ID that identifies the power supply unit in the rack that is connected to the chassis and supplies electric power to the chassis.

In the following, the chassis table 204 in FIG. 7 will be described in comparison with FIG. 2.

The chassis ID of the chassis 20-1 is "1" as described above. The chassis 20-1 is mounted on the rack 10-1 having a rack ID of "1". The height of the chassis 20-1 is 6U, and the chassis 20-1 occupies a range defined by two values "1" and "6" in the rack 10-1. The chassis 20-1 is supplied with electric power from the power supply unit 12-1 having an in-rack power supply ID of "1".

The chassis ID of the chassis 20-2 is "2" as described above. The chassis 20-2 is mounted on the rack 10-2 having a rack ID of "2". The height of the chassis 20-2 is 10 U, and the chassis 20-2 occupies a range defined by two values "1" and "10" in the rack 10-2. The chassis 20-2 is supplied with electric power from the power supply unit 12-2 having an in-rack power supply ID of "2".

The server table 203 and the chassis table 204 may be previously prepared by a network administrator or the like via the client 6 or automatically generated by the collecting unit 2.

For example, the collecting unit 2 may collect information that associates the server ID, the serial number, the number of CPUs, the memory size, the number of NICs and the number of cards to each other from the server management devices 31-1 to 31-7. For a blade server, the collecting unit 2 may collect information that associates the server ID, the chassis ID, the slot ID and the in-chassis power supply ID to each other from the chassis management devices 21-1 to 21-2. For a rack-mount server, the collecting unit 2 may collect information that associates the server ID, the rack ID, the in-rack position and the in-rack power supply ID to each other from the rack management devices 11-1 to 11-3. The collecting unit 2 may generate the server table 203 from the information collected as described above and store the generated server table 203 in the management DB 5.

The collecting unit 2 may collect information that associates the chassis ID, the rack ID, the in-rack position and the in-rack power supply ID to each other from the rack management devices 11-1 to 11-3. The collecting unit 2 may generate the chassis table 204 from the information collected as described above and store the generated chassis table 204 in the management DB 5.

Next, the first embodiment will be described with reference to FIGS. 8 to 12B.

FIG. 8 is a diagram illustrating examples of an event management table contained in the management DB 5. Event management tables 205a and 205b in FIG. 8 are the same event management table at different points in time.

Information stored in the event management table is a specific example of the failure-predictive information described above with reference to FIG. 1. Entries of the event management table are added and updated by the collecting unit 2.

The event management table 205a contains twelve entries, and each entry includes six fields: an entry ID, a server ID, a start time, an end time, an event level and an event type. Each entry corresponds to one event in one server. The event management table 205b is the same as the event management table 205a except that the event management table 205b further includes entry IDs of "13", "14" and "15".

The entry ID is an ID that identifies an entry in the event management table. The server ID indicates which server is related to the entry.

The start time indicates the time at which the event occurs. The event that has once occurred lasts for a length of time. For example, an event named "temperature abnormality" may last for several hours. With regard to an entry that has already ended, the time at which the event ended is recorded as the end time. On the other hand, with regard to an entry that is currently occurring, an invalid value is set in the field of the end time.

In the examples illustrated in FIGS. 8 and 15, the event level is one of four levels: Information, Minor, Major and Critical. The event type may be "power on", "power off", "temperature abnormality", "undervoltage" or "overvoltage", for example. Although the event level and the event type are expressed by character strings as described above in the examples illustrated in FIGS. 8 and 15, the event level and the event type may be expressed by appropriate numerical values in the event management table.

The "power on" event and the "power off" event are not abnormal events. Therefore, for the entries related to the "power on" event or the "power off" event, the event level is "Information" level. That is, the "Information" level corresponds to the level 0 described above with regard to the weight 202 in FIG. 6.

On the other hand, the "temperature abnormality" event, the "undervoltage" event and the "overvoltage" event are abnormal events. Therefore, for the entries related to the "temperature abnormality" event, the "undervoltage" event or the "overvoltage" event, the event level is expressed by a value corresponding to the abnormality level. Specifically, the level 1, 2 and 3 described above with regard to the weight 202 in FIG. 6 correspond to the "Minor" level, the "Major" level and the "Critical" level, respectively.

In the following, each entry of the event management tables 205a and 205b will be specifically described. In the examples illustrated in FIGS. 8 and 15, sequence numbers are used as entry IDs. Therefore, in the following description, an entry having an entry ID of "n" may be referred to as an "n-th entry", for the sake of simplicity.

The event management table 205a illustrates a state immediately after the twelfth entry is added on Jan. 1, 2011 at 10:00 hours. The event management table 205b illustrates a state immediately after the fifteenth entry is added on Jan. 2, 2011 at 11:00 hours.

The first entry is an entry generated based on information collected by the collecting unit 2 from the server management device 31-1 of the server 30-1 having a server ID of "1" allocated thereto. The first entry indicates a "power on" event that occurs in the server 30-1 on Dec. 23, 2010 at 10:00 hours. That is, the first entry indicates that the main power supply switch of the server 30-1 is turned on and the server 30-1 boots up on Dec. 23, 2010 at 10:00 hours.

The server management device 31-1 that monitors the state of the server 30-1 notifies the collecting unit 2 that the main power supply switch of the server 30-1 is turned on. Based on the notification, the collecting unit 2 determines that the event type is the "power on" and generates the first entry.

The server 30-1 has not been shut down yet. In other words, the collecting unit 2 has not received a notification of the end of the "power on" event from the server management device 31-1. Therefore, the end time of the first entry is invalid.

The second entry is an entry generated based on information collected by the collecting unit 2 from the server management device 31-2 having a server ID of "2" allocated thereto. The second entry indicates a "power off" event that occurs in the server 30-2 on Dec. 23, 2010 at 10:00 hours.

Specifically, the server 30-2 may be configured like the computer 100 illustrated in FIG. 3. In that case, the computer 100 further includes the server management device 31-2 (illustrated in FIG. 2, although not illustrated in FIG. 3). Specifically, the server management device 31-2 may be a processor independent of the CPU 101, referred to also as a service processor, for example.

The electric power supplied to the computer 100 from the outside of the computer 100 may be supplied to the CPU 101 and the server management device 31-2 via two different paths in the computer 100. In that case, a situation may occur where the server management device 31-2 is powered on, although the main body of the computer 100 that functions as the server 30-2 is not powered on.

For example, once the server 30-2 is inserted into the fourth slot of the chassis 20-1, the power supply unit 23-2 may supply electric power to the server 30-2. However, the server 30-2 (specifically, the CPU 101) may also be designed not to boot up unless the main power supply switch of the server 30-2 is turned on. Alternatively, the server management device 31-2 may be automatically powered on when the power supply unit 23-2 becomes able to supply electric power to the server 30-2.

Then, the server management device 31-2 starts monitoring the state of the server 30-2 and recognizes the state where the main power supply of the server 30-2 has not been turned on yet. Based on the recognition described above, for example, the server management device 31-2 may notify the collecting unit 2 that the main power supply of the server 30-2 has not been turned on yet on Dec. 23, 2010 at 10:00 hours.

The notification includes the server ID of the server 30-2 whose state is to be monitored by the server management device 31-2.

Having received the notification, the collecting unit 2 determines, from the notification, that the event type is the "power off" and generates the second entry based on the notification. At the time of generation of the entry, the end time is invalid.

In the example illustrated in FIG. 8, the main power supply switch of the server 30-2 is turned on Dec. 28, 2010 at 10:00 hours. The server management device 31-2 then notifies the collecting unit 2 that the main power supply of the server 30-2 is turned on. Based on the notification, the collecting unit 2 records the date and time of Dec. 28, 2010 at 10:00 hours as the end time of the second entry. Based on the notification, the collecting unit 2 also generates the eighth entry described later.

The third entry is generated and updated in a process similar to that for the second entry. According to the third entry, the server 30-4 is simply attached to the slot in the chassis 20-2 on Dec. 23, 2010 at 10:00 hours. On Dec. 27, 2010 at 10:00 hours, however, the main power supply of the server 30-4 is turned on.

The fourth entry is generated and updated in a process similar to that for the second entry. According to the fourth entry, the server 30-5 is attached to the slot in the chassis 20-2 on Dec. 23, 2010 at 10:00 hours, but the main power supply is not turned on yet. Therefore, the "power off" event of the fourth entry has not ended yet, and the end time is invalid.

The fifth entry is generated and updated in a process similar to that for the second entry. According to the fifth entry, the server 30-6 is simply attached to the rack 10-3 on Dec. 23, 2010 at 10:00 hours. On Dec. 28, 2010 at 10:00 hours, however, the main power supply of the server 30-6 is turned on.

The sixth entry is generated and updated in a process similar to that for the second entry. According to the sixth entry, the server 30-7 is simply attached to the rack 10-3 on Dec. 23, 2010 at 10:00 hours. On Dec. 31, 2010 at 10:00 hours, however, the main power supply of the server 30-7 is turned on.

The seventh entry is generated by the collecting unit 2 based on the notification from the server management device 31-4, which has triggered the update of the end time of the third entry by the collecting unit 2. That is, turning on of the main power supply of the server 30-4 means the end of the "power off" event and the start of the "power on" event. Therefore, once the collecting unit 2 receives the notification from the server management device 31-4, the collecting unit 2 updates the third entry related to the "power off" event and generates the seventh entry related to the "power on" event. The server 30-4 has not been shut down yet after the main power supply switch thereof is turned on, so that the end time of the seventh entry is invalid.

Similarly, the eighth entry is generated by the collecting unit 2 based on the notification from the server management device 31-2, which has triggered the update of the end time of the second entry. The server 30-2 has not been shut down yet after the main power supply switch thereof is turned on, so that the end time of the eighth entry is invalid.

The ninth entry is generated and updated in a process similar to that for the second entry. According to the ninth entry, the server 30-3 is attached to the slot in the chassis 20-1 on Dec. 28, 2010 at 10:00 hours, but the main power supply is not turned on yet. Therefore, the "power off" event of the ninth entry has not ended yet, and the end time is invalid.

The tenth entry is generated by the collecting unit 2 based on the notification from the server management device 31-6, which has triggered the update of the end time of the fifth entry by the collecting unit 2. The server 30-6 has not been shut down yet after the main power supply switch thereof is turned on, so that the end time of the tenth entry is invalid.

The eleventh entry is generated by the collecting unit 2 based on the notification from the server management device 31-7, which has triggered the update of the end time of the sixth entry by the collecting unit 2. The server 30-7 has not been shut down yet after the main power supply switch thereof is turned on, so that the end time of the eleventh entry is invalid.

The twelfth entry corresponds to the "temperature abnormality" event at the "Major" level that occurs in the server 30-2 on Jan. 1, 2011 at 10:00 hours. Specifically, the twelfth entry is generated as follows.

The server management device 31-2 monitors the state of the server 30-2 and detects a temperature abnormality on Dec. 1, 2011 at 10:00 hours. For example, the CPU 101 of the server 30-2 may be provided with a temperature sensor, and the server management device 31-2 may monitor the output of the temperature sensor.

If the server management device 31-2 detects a temperature abnormality (a temperature higher than a predetermined threshold, for example) in the server 30-2, the server management device 31-2 notifies the collecting unit 2 of the detection of the temperature abnormality. The notification from the server management device 31-2 may include the value of the temperature measured by the temperature sensor or the value indicating the level of the temperature abnormality determined from the temperature by the server management device 31-2.

In any case, based on the notification from the server management device 31-2, the collecting unit 2 recognizes that the "temperature abnormality" event at the "Major" level has occurred in the server 30-2. Having recognized that fact, the collecting unit 2 generates the twelfth entry.

The temperature abnormality in the server 30-2 has not ended yet. That is, the collecting unit 2 has not received a notification that the temperature of the server 30-2 has recovered to normal. Therefore, the end time of the twelfth entry is invalid.

The event management table 205a contains the twelve entries described above. The event management table 205b illustrates a state where three entries are added after that.

The thirteenth entry corresponds to the "undervoltage" event at the "Minor" level that occurs in the server 30-6 on Jan. 1, 2011 at 11:00 hours and ends on Jan. 1, 2011 at 12:00 hours. Specifically, the thirteenth entry is generated and updated as follows.

The server management device 31-6 monitors the state of the server 30-6 and detects an undervoltage on Jan. 1, 2011 at 11:00 hours. The server management device 3*l*-6 notifies the collecting unit 2 of the detection of the undervoltage. The notification from the server management device 31-6 may include the value of the measured voltage or the value indicating the level of the undervoltage determined from the voltage by the server management device 31-6.

In any case, based on the notification from the server management device 31-6, the collecting unit 2 recognizes that the "undervoltage" event at the "Minor" level has occurred in the server 30-6. Having recognized that fact, the collecting unit 2 generates the thirteenth entry. At the time of generation of the thirteenth entry, the end time of the thirteenth entry is invalid.

The server management device 31-6 then continues to monitor the state of the server 30-6. The server management device 31-6 then detects that the voltage recovers to normal on Dec. 1, 2011 at 12:00 hours. The server management device 31-6 then notifies the collecting unit 2 that the voltage has recovered to normal. Based on the notification from the server management device 31-6, the collecting unit records the date and time of Jan. 1, 2011 at 12:00 hours as the end time of the thirteenth entry.

The fourteenth entry corresponds to the "undervoltage" event at the "Critical" level that occurs in the server 30-4 on Jan. 2, 2011 at 10:00 hours. Specifically, the fourteenth entry is generated as follows.

The server management device 31-4 monitors the state of the server 30-4 and detects an undervoltage on Jan. 2, 2011 at 10:00 hours. The server management device 31-4 then notifies the collecting unit 2 of the detection of the undervoltage. The notification from the server management device 31-4 may include the value of the measured voltage or the value indicating the level of the undervoltage determined from the voltage by the server management device 31-4.

In any case, based on the notification from the server management device 31-4, the collecting unit 2 recognizes that the "undervoltage" event at the "Critical" level has occurred in the server 30-4. Having recognized that fact, the collecting unit 2 generates the fourteenth entry. At the time of generation of the fourteenth entry, the end time of the fourteenth entry is invalid.

The fifteenth entry corresponds to the "undervoltage" event at the "Minor" level that occurs in the server 30-6 on Jan. 2, 2011 at 10:00 hours. Specifically, the fifteenth entry is generated as follows.

The server management device 31-6 monitors the state of the server 30-6 and detects an undervoltage on Jan. 2, 2011 at 11:00 hours. The server management device 31-6 then notifies the collecting unit 2 of the detection of the undervoltage. The notification from the server management device 31-6 may include the value of the measured voltage or the value indicating the level of the undervoltage determined from the voltage by the server management device 31-6.

In any case, based on the notification from the server management device 31-6, the collecting unit 2 recognizes that the "undervoltage" event at the "Minor" level has occurred in the server 30-6. Having recognized that fact, the collecting unit 2 generates the fifteenth entry. At the time of generation of the fifteenth entry, the end time of the fifteenth entry is invalid.

In the above description of FIG. 8, for the sake of convenience, a case where the collecting unit 2 receives notifications from the server management devices 31-1 to 31-7 (that is, a case corresponding to step S102 in FIG. 1) has been illustrated as an example. However, as illustrated in steps S103 to S104, the server management devices 31-1 to 31-7 may respond to a query from the collecting unit 2, and the collecting unit 2 may add an entry to the event management table depending on the reception of the response.

FIG. 9 is a flowchart illustrating a comprehensive evaluation process according to the first embodiment. The comprehensive evaluation process illustrated in FIG. 9 is performed by the calculation unit 3 in step S106 in FIG. 1. More specifically, if the failover process occurs as illustrated in FIG. 4, the calculation unit 3 performs the comprehensive evaluation process in FIG. 9 in step S203 in FIG. 4. If the failover process occurs as illustrated in FIG. 5, the calculation unit 3 performs the comprehensive evaluation process in FIG. 9 at an appropriate time independently of the process in FIG. 5.

The comprehensive evaluation process in FIG. 9 is performed for one server (which will be denoted as a server $s_i$, for the convenience of explanation). For example, the failover control unit 4 may specify the ID of the server $s_i$ to the calculation unit 3 and instruct the calculation unit to perform the comprehensive evaluation process. Alternatively, the calculation unit 3 may regularly perform the comprehensive evaluation process in FIG. 9 for each server $s_i$.

Regardless of when the comprehensive evaluation process in FIG. 9 is performed, according to the first embodiment, the management DB 5 contains a result table illustrated in FIG. 10. Result tables 206a and 206b illustrated in FIG. 10 are the same result table at different points in time.

Specific examples of data recorded in the result table will be described later. As illustrated in FIG. 10, each entry of the result table according to the first embodiment includes four fields: a server ID, a temperature evaluation value, a voltage evaluation value and a comprehensive evaluation value. Each entry of the result table corresponds to a standby server. As the comprehensive evaluation process in FIG. 9 progresses, the result table is updated.

In step S401 in FIG. 9, the calculation unit 3 specifies the ID of the server $s_i$ to the temperature evaluation unit 3a and instructs the temperature evaluation unit 3a to perform the temperature evaluation process illustrated in FIGS. 11A to 11C. The temperature evaluation unit 3a then calculates the temperature evaluation value $f_{tmpr}(s_i)$ expressed by the formula (1) according to the flowchart illustrated in FIGS. 11A to 11C. The temperature evaluation unit 3a then records the calculation result in the field of the temperature evaluation value of the entry corresponding to the server $s_i$ in the result table.

Figure 12A:
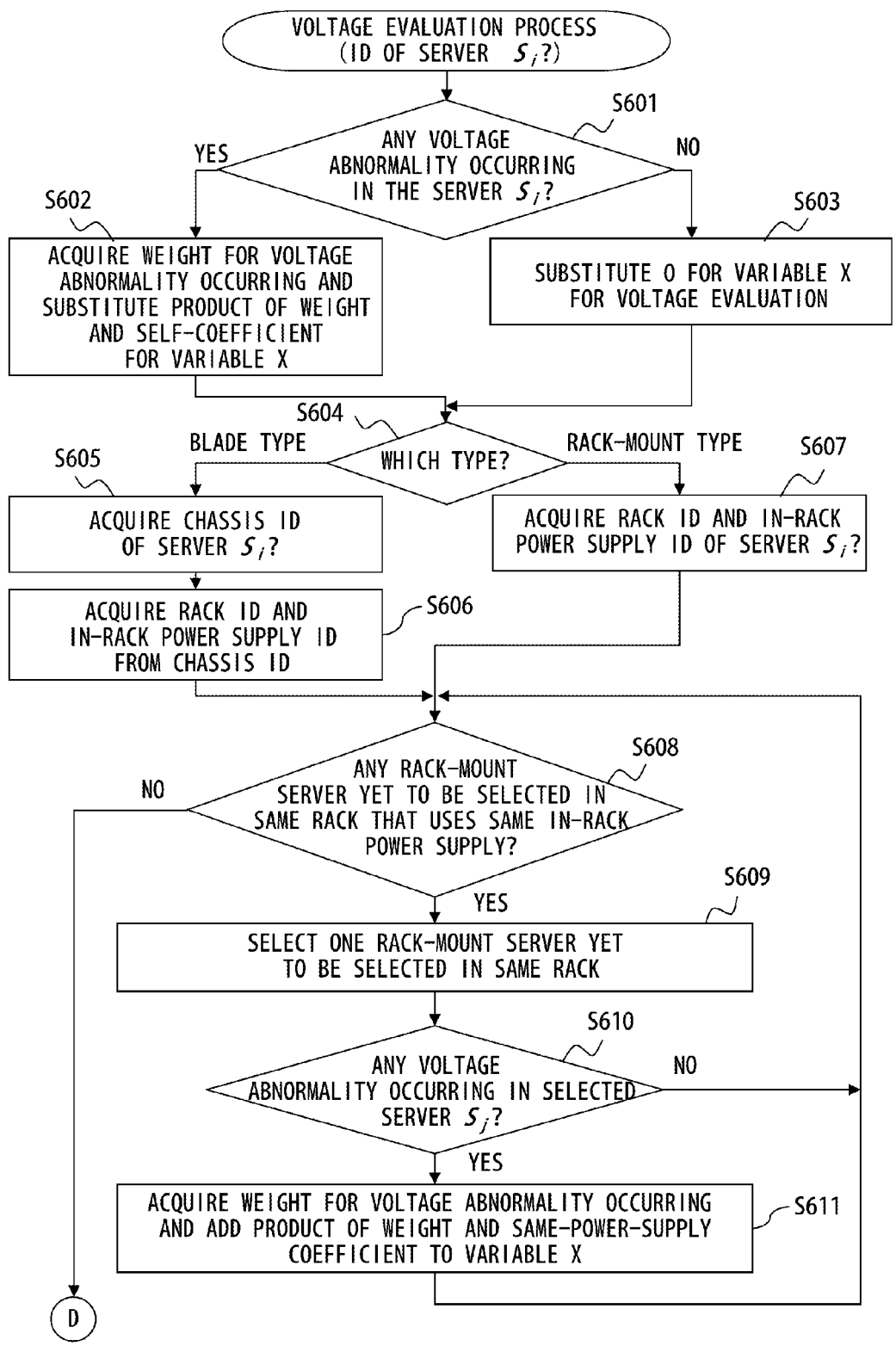

In step S402, the calculation unit 3a specifies the ID of the server $s_i$ to the voltage evaluation unit 3b and instructs the voltage evaluation unit 3b to perform the voltage evaluation process illustrated in FIGS. 12A to 12B. The voltage evaluation unit 3b then calculates the voltage evaluation value $f_{vol}(s_i)$ expressed by the formula (8) according to the flowchart illustrated in FIGS. 12A to 12B. The voltage evaluation unit 3b then records the calculation result in the field of the voltage evaluation value of the entry corresponding to the server $s_i$ in the result table.

In the subsequent steps S403 to S411, the comprehensive evaluation unit 3c calculates the comprehensive evaluation value $f_{total}(s_i)$ expressed by the formulas (29) and (34) using the temperature evaluation value and the voltage evaluation value recorded in the result table. Specifically, the calculation is performed as follows.

In step S403, the comprehensive evaluation unit 3c substitutes an initial value $\epsilon$ for a variable Xt that indicates the length of time for which a temperature abnormality has occurred in the server $s_i$. In addition, the comprehensive evaluation unit 3c substitutes the initial value $\epsilon$ for a variable Xv that indicates the length of time for which a voltage abnormality has occurred in the server $s_i$. A specific example of the initial value $\epsilon$ is illustrated in FIG. 6.

In step S404, the comprehensive evaluation unit 3c determines whether or not there is a temperature abnormality event in the server $s_i$ that has not been selected to be processed in steps S405 to S406. Specifically, the comprehensive evaluation unit 3c determines whether or not there is an entry that satisfies all of the following three conditions in the event management table.

The value in the "server ID" field is equal to the ID of the server $s_i$.
The "event type" field indicates a temperature abnormality.
The entry has not been selected to be processed in steps S405 to S406.

If there is an entry that satisfies all of the above three conditions, the process proceeds to step S405. To the contrary, if there is no entry that satisfies all of the above three conditions (that is, there is no entry related to a temperature abnormality event in the server $s_i$ or all the entries that satisfy all of the above three conditions have already been selected by the comprehensive evaluation unit 3c), the process proceeds to step S407.

In step S405, the comprehensive evaluation unit 3c selects one temperature abnormality event in the server $s_i$ that has not been selected yet. That is, the comprehensive evaluation unit 3c selects one entry that is related to a temperature abnormality event and has not been selected yet.

The comprehensive evaluation unit 3c then acquires the start time and the end time of the temperature abnormality event from the selected entry. If no valid value of the end time is recorded in the selected entry, the comprehensive evaluation unit 3c acquires the current time instead of the end time. This is because the invalid end time means that the temperature abnormality event is still occurring.

In step S406, the comprehensive evaluation unit 3c calculates the length of time for which the temperature abnormality event corresponding to the selected entry lasts. That is, the comprehensive evaluation unit 3c subtracts the acquired start time from the acquired end time or current time. The comprehensive evaluation unit 3c then adds the value obtained by the subtraction to the variable Xt. The process then returns to step S404.

As a result of repetitions of the loop from steps S404 to S406, at the time of execution of steps S407, a formula that $Xt = \epsilon + t_{tmpr}(s_i)$ holds (see the formulas (34) and (35)).

In step S407, the comprehensive evaluation unit 3c determines whether or not there is a voltage abnormality event in the server $s_i$ that has not been selected to be processed in steps S408 to S409. Specifically, the comprehensive evaluation unit 3c determines whether or not there is an entry that satisfies all of the following three conditions in the event management table.

The value in the "server ID" field is equal to the ID of the server $s_i$.
The "event type" field indicates an undervoltage or an overvoltage.
The entry has not been selected to be processed in steps S408 to S409.

If there is an entry that satisfies all of the above three conditions, the process proceeds to step S408. To the contrary, if there is no entry that satisfies all of the above three conditions (that is, there is no entry related to a voltage abnormality event in the server $s_i$ or all the entries that satisfy all of the above three conditions have already been selected by the comprehensive evaluation unit 3c), the process proceeds to step S410.

In step S408, the comprehensive evaluation unit 3c selects one voltage abnormality event in the server $s_i$ that has not been selected yet. That is, the comprehensive evaluation unit 3c selects one entry that is related to a voltage abnormality event and has not been selected yet. The comprehensive evaluation unit 3c then acquires the start time and the end time of the voltage abnormality event from the selected entry. If no valid value of the end time is recorded in the selected entry, the comprehensive evaluation unit 3c acquires the current time instead of the end time. This is because the invalid end time means that the voltage abnormality event is still occurring.

In step S409, the comprehensive evaluation unit 3c calculates the length of time for which the voltage abnormality event corresponding to the selected entry lasts. That is, the comprehensive evaluation unit 3c subtracts the acquired start time from the acquired end time or current time. The comprehensive evaluation unit 3c then adds the value obtained by the subtraction to the variable Xv. The process then returns to step S407.

As a result of repetitions of the loop from steps S407 to S409, at the time of execution of steps S410, a formula that $Xv=\epsilon+t_{vol}(s_i)$ holds (see the formulas (34) and (36)).

In step S410, the comprehensive evaluation unit 3c calculates the proportion of the influence of each of the temperature evaluation value $f_{tmpr}(s_i)$ and the voltage evaluation value $f_{vol}(s_i)$ from the variables Xt and Xv. That is, the comprehensive evaluation unit 3c calculates Xt/(Xt+Xv) and Xv/(Xt+Xv).

In step S411, the comprehensive evaluation unit 3c calculates the comprehensive evaluation value $f_{total}(s_i)$ using the following four values:

The temperature evaluation value $f_{tmpr}(s_i)$ recorded in the result table;
The voltage evaluation value $f_{vol}(s_i)$ recorded in the result table;
The calculated proportion Xt/(Xt+Xv); and
The calculated proportion Xv/(Xt+Xv).

Specifically, the comprehensive evaluation unit 3c reads the temperature evaluation value $f_{tmpr}$ (S±) and the voltage evaluation $f_{vol}(s_i)$ of the server $s_i$ from the result table. The comprehensive evaluation unit 3c then calculates the product of the temperature evaluation value $f_{tmpr}(s_i)$ multiplied by the proportion Xt/(Xt+Xv) and the product of the temperature evaluation value $f_{vol}(s_i)$ multiplied by the proportion Xv/(Xt+Xv) and calculates the sum of the two products.

The calculation result is the comprehensive evaluation value $f_{total}(s_i)$ expressed by the formula (34). The comprehensive evaluation unit 3c records the calculation result in the field of the comprehensive evaluation value of the entry corresponding to the server $s_i$ in the result table. This is the end of the comprehensive evaluation process in FIG. 9.

FIGS. 11A to 11C are flowcharts illustrating the temperature evaluation process. According to the first embodiment, in step S401 in FIG. 9, the temperature evaluation unit 3a performs the temperature evaluation process for the server $s_i$.

In step S501, the temperature evaluation unit 3a determines whether or not a temperature abnormality is currently occurring in the server $s_i$. If there is an entry that satisfies all of the following three conditions in the event management table, a temperature abnormality is currently occurring in the server $s_i$. To the contrary, if there is no entry that satisfies all of the following three conditions, no temperature abnormality is currently occurring in the server $s_i$.

The value in the "server ID" field is equal to the ID of the server $s_i$.
The "event type" field indicates a temperature abnormality.
An invalid value is recorded in the "end time" field.

The temperature evaluation unit 3a makes the determination of step S501 by searching the event management table for an entry that satisfies all of the above three conditions. If a temperature abnormality is currently occurring in the server $s_i$, the process proceeds to step S502. To the contrary, if no temperature abnormality is currently occurring in the server $s_i$, the process proceeds to step S503.

In step S502, the temperature evaluation unit 3a acquires the weight for the temperature abnormality currently occurring in the server $s_i$ (that is, the weight $w_{tmpr}(s_i)$ in the formula (1)). Specifically, the temperature evaluation unit 3a reads the value of the "event level" field of the entry found by the searching in step S501 and acquires a weight corresponding to the read value. For example, taking the weight 202 in FIG. 6 as an example, the temperature evaluation unit 3a acquires a weight of "2" if the event level is "Major".

Furthermore, the temperature evaluation unit 3a substitutes the product of the acquired weight and the self-coefficient $C_{self}$ for the variable X for temperature evaluation. The process then proceeds to step S504.

On the other hand, in step S503, the temperature evaluation unit 3a simply substitutes 0 for the variable X for temperature evaluation. The process then proceeds to step S504. As a result of step S502 or S503 described above, the value of the first term of the formula (1) is stored in the variable X.

In step S504, the temperature evaluation unit 3a refers to the server table 203 in FIG. 7 to determine whether the server $s_i$ is the blade type or the rack-mount type. If a valid value is set in the chassis ID field of the entry corresponding to the server $s_i$ in the server table 203, the server $s_i$ is the blade type. To the contrary, if a valid value is set in the rack ID field of the entry corresponding to the server $s_i$ in the server table 203, the server $s_i$ is the rack-mount type.

If the server $s_i$ is the blade type, the process proceeds to step S505. To the contrary, if the server $s_i$ is the rack-mount type, the process proceeds to step S515 in FIG. 11B.

Steps S505 to S509 correspond to the second term of the formula (1). Specifically, in step S505, the temperature evaluation unit 3a acquires the chassis ID and the slot ID of the server $s_i$ from the server table 203 using the server ID of the server $s_i$ as a search key.

In the subsequent step S506, the temperature evaluation unit 3a determines whether or not there is a server that is adjacent to the server $s_i$ and has not been selected yet. That is, the temperature evaluation unit 3a determines whether or not there is an entry that satisfies all of the following conditions in the server table 203.

The value in the "chassis ID" field is equal to the chassis ID acquired in step S505.
The difference between the value in the "slot ID" field and the slot ID acquired in step S505 is 1 or −1.
The server has not been selected in step S507 to be processed in steps S508 to S509.

If there is an entry that satisfies all of the above three conditions, the process proceeds to step S507. To the contrary, if there is no entry that satisfies all of the above three conditions, the process proceeds to step S510 in FIG. 11B.

In step S507, the temperature evaluation unit 3a selects one adjacent server that has not been selected yet. That is, the temperature evaluation unit 3a selects one adjacent server corresponding to the entry that satisfies all of the above three conditions in step S506.

For the sake of simplicity, in the description of steps S508 to S509 below, the adjacent server selected in step S507 will be referred to as a "server sj". The server $s_j$ selected in step S507 belongs to the set adj $(s_i)$ in the formula (5).

In step S508, the temperature evaluation unit 3a determines whether or not a temperature abnormality is currently occurring in the server $s_j$ selected in step S507. The temperature evaluation unit 3a may make the determination of step S508 as in step S501 by referring to the event management table.

If a temperature abnormality is currently occurring in the server $s_j$, the process proceeds to step S509. To the contrary, if no temperature abnormality is currently occurring in the server $s_j$, the process proceeds to step S506.

In step S509, the temperature evaluation unit 3a acquires the weight for the temperature abnormality currently occurring in the server $s_j$ (that is, the weight $w_{tmpr}(s_j)$ in the second term of the formula (1)). Specifically, the temperature evaluation unit 3a reads the value of the "event level" field of the entry found in the event management table as a result of searching for the determination in step S508. And the temperature evaluation unit 3a acquires a weight corresponding to the read value. The temperature evaluation unit 3a adds the product of the acquired weight and the adjacency coefficient $C_{adj}$ to the variable X. The process then proceeds to step S506.

Steps S510 to S513 in FIG. 11B correspond to the third term of the formula (1).

In step S510, the temperature evaluation unit 3a determines whether or not there is a server that has not been selected yet in the same chassis as the server $s_i$. That is, the temperature evaluation unit 3a determines whether or not there is an entry that satisfies all of the following four conditions in the server table 203.

The value in the "chassis ID" field is equal to the chassis ID acquired in step S505.
The value in the "server ID" field differs from the ID of the server $s_i$.
The server has not been selected in step S511 as is to be processed in steps S512 to S513.
The entry is not the entry selected in step S507.

If there is an entry that satisfies all of the above four conditions, the process proceeds to step S511. To the contrary, if there is no entry that satisfies all of the above four conditions, the process proceeds to step S514.

In step S511, the temperature evaluation unit 3a selects one server that has not been selected yet in the same chassis as the server $s_i$ (more specifically, a server that is not adjacent to the server $s_i$ and has not been selected yet, as is apparent from the above conditions). That is, the temperature evaluation unit 3a selects one server corresponding to the entry that satisfies all of the above four conditions in step S510.

For the sake of convenience, in the description of steps S512 to S513 below, the server selected in step S511 will be referred to as a "server sj". The server $s_j$ selected in step S511 belongs to the set chassis $(s_i)$ in the formula (6).

In step S512, the temperature evaluation unit 3a determines whether or not a temperature abnormality is currently occurring in the server $s_j$ selected in step S511. The temperature evaluation unit 3a may make the determination of step S512 as in step S501 by referring to the event management table.

If a temperature abnormality is currently occurring in the server $s_j$, the process proceeds to step S513. To the contrary, if no temperature abnormality is currently occurring in the server $s_j$, the process returns to step S510.

In step S513, the temperature evaluation unit 3a acquires the weight for the temperature abnormality currently occurring in the server $s_j$ (that is, the weight $w_{tmpr}(s_j)$ in the third term of the formula (1)). Specifically, the temperature evaluation unit 3a reads the value of the "event level" field of the entry found in the event management table as a result of searching for the determination in step S512. And the temperature evaluation unit 3a acquires a weight corresponding to the read value. The temperature evaluation unit 3a adds the product of the acquired weight and the chassis coefficient $C_{chassis}$ to the variable X. The process then returns to S510.

Steps S514 in FIG. 11B to S525 in FIG. 11C correspond to the fourth term of the formula (1). The fourth term of the formula (1) is a term related to a server that belongs to the set rack $(s_i)$ in the formula (7). As may be seen from the definition of the formula (7), each server belonging to the set rack $(s_i)$ may be a rack-mount server or a blade server. Of steps S514 to S525, steps S516 to S519 are steps related to a rack-mount server in the same rack as the server $s_i$, and steps S520 to S525 are steps related to a blade server in the same rack as the server $s_i$.

In step S514, the temperature evaluation unit 3a acquires the rack ID using the chassis ID acquired in step S505. Specifically, the temperature evaluation unit 3a searches the chassis table 204 for an entry whose value in the "chassis ID" field is the same as the chassis ID acquired in step S505. The temperature evaluation unit 3a then acquires the value in the "rack ID" field of the found entry.

Step S514 is a step for acquiring the ID of the rack on which the blade server $s_i$ is mounted. After the rack ID is acquired, the process proceeds to step S516.

On the other hand, if the server $s_i$ for which the temperature evaluation value is to be calculated is the rack-mount type, in step S515, the temperature evaluation unit 3a acquires the rack ID using the ID of the server $s_i$. Specifically, the temperature evaluation unit 3a searches the server table 203 for an entry whose value in the "server ID" field is the same as the ID of the server $s_i$. The temperature evaluation unit 3a then acquires the value in the "rack ID" field of the found entry.

Step S515 is a step for acquiring the ID of the rack on which the rack-mount server $s_i$ is mounted. After the rack ID is acquired, the process proceeds to step S516.

In step S516, the temperature evaluation unit 3a determines whether or not there is a rack-mount server that has not been selected yet in the same rack as the server $s_i$. That is, the temperature evaluation unit 3a determines whether or not there is an entry that satisfies all of the following five conditions in the server table 203.

The value in the "rack ID" field is equal to the rack ID acquired in step S514 or S515.
The value in the "server ID" field differs from the ID of the server $s_i$.
The entry is not the entry selected in step S507.
The entry is not the entry selected in step S511.
The server has not been selected in step S517 to be processed in steps S518 to S519.

If there is an entry that satisfies all of the above five conditions, the process proceeds to step S517. To the contrary, if there is no entry that satisfies all of the above five conditions, the process proceeds to step S520.

In step S517, the temperature evaluation unit 3a selects one rack-mount server that has not been selected yet in the same rack as the server $s_i$. That is, the temperature evaluation unit 3a selects one server corresponding to the entry that satisfies all of the above five conditions in step S516.

For the sake of convenience, in the description of steps S518 to S519 below, the server selected in step S517 will be referred to as a "server sj". The server $s_j$ selected in step S517 belongs to the set rack $(s_i)$ in the formula (7).

In step S518, the temperature evaluation unit 3a determines whether or not a temperature abnormality is currently occurring in the server $s_j$ selected in step S517. The temperature evaluation unit 3a may make the determination of step S518 as in step S501 by referring to the event management table.

If a temperature abnormality is currently occurring in the server $s_j$, the process proceeds to step S519. To the contrary, if no temperature abnormality is currently occurring in the server $s_j$, the process returns to step S516.

In step S519, the temperature evaluation unit 3a acquires the weight for the temperature abnormality currently occurring in the server $s_j$ (that is, the weight $w_{tmpr}(s_j)$ in the fourth term of the formula (1)). Specifically, the temperature evaluation unit 3a reads the value of the "event level" field of the entry found in the event management table as a result of searching for the determination in step S518. And the temperature evaluation unit 3a acquires a weight corresponding to the read value. The temperature evaluation unit 3a adds the product of the acquired weight and the rack coefficient $C_{rack}$ to the variable X. The process then returns to S516.

In step S520 in FIG. 11C, the temperature evaluation unit 3a determines whether or not there is another chassis that has not been selected yet in the same rack as the server $s_i$. That is, the temperature evaluation unit 3a determines whether or not there is an entry that satisfies all of the following three conditions in the chassis table 204.

The value in the "rack ID" field is equal to the rack ID acquired in step S514 or S515.

The value in the "chassis ID" field differs from the value in the "chassis ID" field of the entry corresponding to the server $s_i$ in the server table 203.

The server has not been selected in step S521 to be processed in steps S522 to S525.

If there is an entry that satisfies all of the above three conditions, the process proceeds to step S521. To the contrary, if there is no entry that satisfies all of the above three conditions, the process proceeds to step S526.

If the server $s_i$ is a rack-mount server, the entry that satisfies all of the above three conditions corresponds to a chassis that has not been selected yet mounted on the same rack as the server $s_i$ and. To the contrary, if the server $s_i$ is a blade server, the entry that satisfies all of the above three conditions corresponds to a chassis that has not been selected yet that is mounted on the same rack as the server $s_i$ and is different from the chassis on which the server $s_i$ is mounted.

In step S521, the temperature evaluation unit 3a selects another chassis that has not been selected yet in the same rack as the server $s_i$. That is, the temperature evaluation unit 3a selects one chassis corresponding to the entry that satisfies all of the above three conditions in step S520.

In step S522, the temperature evaluation unit 3a determines whether or not there is a server that has not been selected yet in the chassis selected in step S521. That is, the temperature evaluation unit 3a determines whether or not there is an entry that satisfies all of the following three conditions in the server table 203.

The value in the "rack ID" field is equal to the rack ID acquired in step S514 or S515.

The value in the "chassis ID" field is equal to the chassis ID of the chassis selected in step S521.

The server has not been selected in step S523 to be processed in steps S524 to S525.

If there is an entry that satisfies all of the above three conditions, the process proceeds to step S523. To the contrary, if there is no entry that satisfies all of the above three conditions, the process returns to step S520.

In step S523, the temperature evaluation unit 3a selects one server that has not been selected yet in the chassis selected in step S521. That is, the temperature evaluation unit 3a selects one server corresponding to the entry that satisfies all of the above three conditions in step S522.

For the sake of convenience, in the description of steps S524 to S525 below, the server selected in step S523 will be referred to as a "server $s_j$". The server $s_j$ selected in step S523 is a blade server that belongs to the set rack($s_i$) in the formula (7).

In step S524, the temperature evaluation unit 3a determines whether or not a temperature abnormality is currently occurring in the server $s_j$ selected in step S523. The temperature evaluation unit 3a may make the determination of step S524 as in step S501 by referring to the event management table.

If a temperature abnormality is currently occurring in the server $s_j$, the process proceeds to step S525. To the contrary, if no temperature abnormality is currently occurring in the server $s_j$, the process returns to step S522.

In step S525, the temperature evaluation unit 3a acquires the weight for the temperature abnormality currently occurring in the server $s_j$ (that is, the weight $w_{tmpr}(s_j)$ in the fourth term of the formula (1)). Specifically, the temperature evaluation unit 3a reads the value of the "event level" field of the entry found in the event management table as a result of searching for the determination in step S524. And the temperature evaluation unit 3a acquires a weight corresponding to the read value. The temperature evaluation unit 3a adds the product of the acquired weight and the rack coefficient $C_{rack}$ to the variable X. The process then returns to S522.

As is apparent from the above description, at the time of execution of step S526, the temperature evaluation value $f_{tmpr}(s_i)$ in the formula (1) is stored in the variable X. Therefore, in step S526, the temperature evaluation unit 3a records the value of the variable X as the temperature evaluation value $f_{tmpr}(s_i)$ of the server $s_i$. That is, the temperature evaluation unit 3a records the value of the variable X in the "temperature evaluation value" field of the entry corresponding to the server $s_i$ in the result table. This is the end of the temperature evaluation process illustrated in FIGS. 11A to 11C.

FIGS. 12A to 12B are flowcharts illustrating a voltage evaluation process. According to the first embodiment, in step S402 in FIG. 9, the voltage evaluation unit 3b performs the voltage evaluation process for the server $s_i$.

In step S601, the voltage evaluation unit 3b determines whether or not a voltage abnormality is currently occurring in the server $s_i$. If there is an entry that satisfies all of the following three conditions in the event management table, a voltage abnormality is currently occurring in the server $s_i$. To the contrary, if there is no entry that satisfies all of the following three conditions, no voltage abnormality is currently occurring in the server $s_i$.

The value in the "server ID" field is equal to the ID of the server $s_i$.

The "event type" field indicates a voltage abnormality (specifically, an undervoltage or an overvoltage).

An invalid value is recorded in the "end time" field.

The voltage evaluation unit 3b makes the determination of step S601 by searching the event management table for an entry that satisfies all of the above three conditions. If a voltage abnormality is currently occurring in the server $s_i$, the process proceeds to step S602. To the contrary, if no voltage abnormality is currently occurring in the server $s_i$, the process proceeds to step S603.

In step S602, the voltage evaluation unit 3b acquires the weight for the voltage abnormality currently occurring in the server $s_i$ (that is, the weight $w_{vol}(s_i)$ in the formula (8)). Specifically, the voltage evaluation unit 3b reads the value of the "event level" field of the entry found by the searching in step S601 and acquires a weight corresponding to the read value.

Furthermore, the voltage evaluation unit 3b substitutes the product of the acquired weight and the self-coefficient $C_{self}$ for the variable X for voltage evaluation. The process then proceeds to step S604.

On the other hand, in step S603, the voltage evaluation unit 3b simply substitutes 0 for the variable X for voltage evaluation. The process then proceeds to step S604. As a result of step S602 or S603 described above, the value of the first term of the formula (8) is stored in the variable X.

In step S604, the voltage evaluation unit 3b refers to the server table 203 in FIG. 7 to determine whether the server $s_i$ is the blade type or the rack-mount type. The determination in step S604 is similar to the determination in step S504 in FIG. 11A.

If the server $s_i$ is the blade server, the process proceeds to step S605. To the contrary, if the server $s_i$ is the rack-mount server, the process proceeds to step S607.

In Step S605, the voltage evaluation unit 3b acquires the chassis ID of the server $s_i$ from the server table 203 using the server ID of the server $s_i$ as a search key.

In the subsequent step S606, the voltage evaluation unit 3b acquires the rack ID and the in-rack power supply ID from the chassis ID acquired in step S605. Specifically, the voltage evaluation unit 3b searches the chassis table 204 in FIG. 7 for an entry whose value in the "chassis ID" field is the same as the chassis ID acquired in step S605. The voltage evaluation unit 3b then acquires the values in the "rack ID" field and the "in-rack power supply ID" field of the found entry.

If the server $s_i$ is a blade server, as a result of steps S605 to S606, it is determined which power supply unit in the rack supplies electric power to the server $s_i$. After the rack ID and the in-rack power supply ID are acquired, the process proceeds to step S608.

On the other hand, if the server $s_i$ for which the voltage evaluation value is to be calculated is a rack-mount server, in step S607, the voltage evaluation unit 3b acquires the rack ID and the in-rack power supply ID using the ID of the server $s_i$. Specifically, the voltage evaluation unit 3b searches the server table 203 for an entry whose value in the "server ID" field is the same as the ID of the server $s_i$. The voltage evaluation unit 3b then acquires the values in the "rack ID" field and the "in-rack power supply" field of the found entry.

If the server $s_i$ is a rack-mount server, as a result of step S607, it is determined which power supply unit in the rack supplies electric power to the server $s_i$. After the rack ID and the in-rack power supply ID are acquired, the process proceeds to step S608.

In step S608, the voltage evaluation unit 3b determines whether or not there is a rack-mount server that uses the same in-rack power supply as the server $s_i$ in the same rack as the server $s_i$ and has not been selected yet. That is, the voltage evaluation unit 3b determines whether or not there is an entry that satisfies all of the following four conditions in the server table 203.

The value in the "rack ID" field is equal to the rack ID acquired in step S606 or S607.
The value in the "in-rack power supply ID" field is equal to the in-rack power supply ID acquired in step S606 or S607.
The value in the "server ID" field differs from the ID of the server $s_i$.
The server has not been selected in step S609 to be processed in steps S610 to S611.

If there is an entry that satisfies all of the above four conditions, the process proceeds to step S609. To the contrary, if there is no entry that satisfies all of the above four conditions, the process proceeds to step S612 in FIG. 12B.

In step S609, the voltage evaluation unit 3b selects one server that has not been selected yet in the same rack as the server $s_i$. That is, the voltage evaluation unit 3b selects one server corresponding to the entry that satisfies all of the above four conditions in step S608.

For the sake of simplicity, in the description of steps S610 to S611 below, the server selected in step S609 will be referred to as a "server $s_j$". The server $s_j$ selected in step S609 is a rack-mount server that belongs to the set power $(s_i)$ in the formula (11).

In step S610, the voltage evaluation unit 3b determines whether or not a voltage abnormality is currently occurring in the server $s_j$ selected in step S609. The voltage evaluation unit 3b may make the determination of step S610 as in step S601 by referring to the event management table.

If a voltage abnormality is currently occurring in the server $s_j$, the process proceeds to step S611. To the contrary, if no voltage abnormality is currently occurring in the server $s_j$, the process returns to step S608.

In step S611, the voltage evaluation unit 3b acquires the weight for the voltage abnormality currently occurring in the server $s_j$ (that is, the weight $w_{vol}(s_j)$ in the second term of the formula (8)). Specifically, the voltage evaluation unit 3b reads the value of the "event level" field of the entry found in the event management table as a result of searching for the determination in step S610. And the voltage evaluation unit 3b acquires a weight corresponding to the read value. The voltage evaluation unit 3b adds the product of the acquired weight and the same-power-supply coefficient $C_{power}$ to the variable X. The process then proceeds to step S608.

In step S612 in FIG. 12B, the voltage evaluation unit 3b determines whether or not there is a chassis that has not been selected yet in the same rack as the server $s_i$. That is, the voltage evaluation unit 3b determines whether or not there is an entry that satisfies all of the following three conditions in the chassis table 204.

The value in the "rack ID" field is equal to the rack ID acquired in step S606 or S607.
The value in the "in-rack power supply ID" field is equal to the rack ID acquired in step S606 or S607.
The server has not been selected in step S613 to be processed in steps S614 to S617.

If there is an entry that satisfies all of the above three conditions, the process proceeds to step S613. To the contrary, if there is no entry that satisfies all of the above three conditions, the process proceeds to step S618.

If the server $s_i$ is a rack-mount server, the entry that satisfies all of the above three conditions corresponds to a chassis that has not been selected yet mounted on the same rack as the server $s_i$. To the contrary, if the server $s_i$ is a blade server, the entry that satisfies all of the above three conditions corresponds to a chassis that has not been selected yet mounted on the same rack as the server $s_i$ (which may be a chassis on which the server $s_i$ is mounted or may be another chassis).

In step S613, the voltage evaluation unit 3b selects one chassis that has not been selected yet in the same rack as the server $s_i$. That is, the voltage evaluation unit 3b selects one chassis corresponding to the entry that satisfies all of the above three conditions in step S612.

In step S614, the voltage evaluation unit 3b determines whether or not there is a server that has not been selected yet (other than the server $s_i$) in the chassis selected in step S613. That is, the voltage evaluation unit 3b determines whether or not there is an entry that satisfies all of the following four conditions in the server table 203.

The value in the "rack ID" field is equal to the rack ID acquired in step S606 or S607.
The value in the "chassis ID" field is equal to the chassis ID of the chassis selected in step S613.
The value in the "server ID" field differs from the ID of the server $s_i$.
The server has not been selected in step S615 to be processed in steps S616 to S617.

If there is an entry that satisfies all of the above four conditions, the process proceeds to step S615. To the contrary, if there is no entry that satisfies all of the above four conditions, the process returns to step S612.

In step S615, the voltage evaluation unit 3b selects one server that has not been selected yet in the chassis selected in step S613. That is, the voltage evaluation unit 3b selects one server corresponding to the entry that satisfies all of the above four conditions in step S614.

For the sake of convenience, in the description of steps S616 to S617 below, the server selected in step S615 will be referred to as a "server $s_j$". The server $s_i$ selected in step S615 is a blade server that belongs to the set power $(s_i)$ in the formula (11).

In step S616, the voltage evaluation unit 3*b* determines whether or not a voltage abnormality is currently occurring in the server $s_j$ selected in step S615. The voltage evaluation unit 3*b* may make the determination of step S616 as in step S601 by referring to the event management table.

If a voltage abnormality is currently occurring in the server $s_j$, the process proceeds to step S617. To the contrary, if no voltage abnormality is currently occurring in the server $s_j$, the process returns to step S614.

In step S617, the voltage evaluation unit 3*b* acquires the weight for the voltage abnormality currently occurring in the server $s_j$ (that is, the weight $w_{vol}(s_j)$ in the second term of the formula (8)). Specifically, the voltage evaluation unit 3*b* reads the value of the "event level" field of the entry found in the event management table as a result of searching for the determination in step S616. And the voltage evaluation unit 3*b* acquires a weight corresponding to the read value. The voltage evaluation unit 3*b* adds the product of the acquired weight and the same-power-supply coefficient $C_{power}$ to the variable X. The process then returns to S614.

As is apparent from the above description, at the time of execution of step S618, the voltage evaluation value $f_{vol}(s_i)$ in the formula (8) is stored in the variable X. Therefore, in step S618, the voltage evaluation unit 3*b* records the value of the variable X as the voltage evaluation value $f_{vol}(s_i)$ of the server $s_i$. That is, the voltage evaluation unit 3*b* records the value of the variable X in the "voltage evaluation value" field of the entry corresponding to the server $s_i$ in the result table. This is the end of the voltage evaluation process illustrated in FIGS. 12A to 12B.

Next, specific examples of the evaluation values calculated in the processes illustrated in the flowcharts of FIGS. 9, 11A to 11C and 12A to 12B will be described with reference to FIGS. 8 and 10.

The result table 206*a* in FIG. 10 illustrates a state immediately after the comprehensive evaluation process in FIG. 9 is performed for each of the standby servers 30-2 to 30-7 on Jan. 2, 2011 at 09:30 hours.

As illustrated in the event management table 205*b* in FIG. 8, a temperature abnormality is occurring in the standby server 30-2 on Jan. 2, 2011 at 09:30 hours. On Jan. 2, 2011 at 09:30 hours, however, the other standby servers 30-3, 30-4, 30-5, 30-6 and 30-7 are normally operating, and the active server 30-1 is also normally operating. The values of the coefficients 201 and the weights 202 are as illustrated in FIG. 6.

Then, the temperature evaluation value calculated for the server 30-2 in step S401 in FIG. 9 is 200 (=$C_{self}W_2$+0+0+0=100×2). The voltage evaluation value calculated for the server 30-2 in step S402 is 0.

In the server 30-2, although a temperature abnormality is occurring on Jan. 2, 2011 at 09:30 hours, any abnormality other than the temperature abnormality has not occurred until Jan. 2, 2011 at 09:30 hours. That is, in the server 30-2, only the temperature abnormality has occurred, and no voltage abnormality has occurred.

The correction constant $\epsilon$ is extremely small as illustrated in FIG. 6. Therefore, as expressed in approximation by the formula (37), the comprehensive evaluation value of the server 30-2 is approximately 200 (=1×200+0×0). In the fields of the entry having a server ID of "2" in the result table 206*a*, the three values, 200, 0 and 200, calculated as described above are recorded.

The temperature evaluation value calculated for the server 30-3 in step S401 is 12 (=0+$C_{adj}W_2$+0+0=6×2). The voltage evaluation value calculated for the server 30-3 in step S402 is 0.

In the server 30-3, no abnormality has occurred until Jan. 2, 2011 at 09:30 hours. Therefore, as expressed by the formula (38), the comprehensive evaluation value of the server 30-3 is 6 (=½×12+½×0). In the fields of the entry having a server ID of "3" in the result table 206*a*, the three values, 12, 0 and 6, calculated as described above are recorded.

For the servers 30-4 to 30-7, the temperature evaluation value calculated in step S401 is 0, and the voltage evaluation value calculated in step S402 is 0. Therefore, the comprehensive evaluation values of the servers 30-4 to 30-7 are all 0. Therefore, in the fields of the entries having server IDs of "3", "4", "5", "6" and "7" in the result table 206*a*, the three values, 0, 0 and 0, calculated as described above are recorded.

According to the result table 206*a* obtained as described above, the probability of occurrence of a future failure is the lowest in the servers 30-3 to 30-7, whose comprehensive evaluation values are 0. Therefore, if the active server 30-1 fails on Jan. 2, 2011 at 09:30 hours, the failover control unit 4 selects any of the servers 30-3 to 30-7 as a new active server.

The active server 30-1 may continue normally operating. For example, consider a case where the event management table in the management DB 5 remains in the state of the event management table 205*b* illustrated in FIG. 8 on Jan. 2, 2011 at 11:10 hours. In this case, the active server 30-1 is still normally operating on Jan. 2, 2011 at 11:10 hours.

The result table 206*b* illustrated in FIG. 10 shows a state immediately after the comprehensive evaluation process in FIG. 9 is performed for each of the standby servers 30-2 to 30-7 on Jan. 2, 2011 at 11:10 hours.

As illustrated in the event management table 205*b* in FIG. 8, on Jan. 2, 2011 at 11:10 hours, a temperature abnormality is occurring in the standby server 30-2, and a voltage abnormality is occurring in the standby servers 30-4 and 30-6. However, on Jan. 2, 2011 at 11:10 hours, the other standby servers 30-3, 30-5 and 30-7 are normally operating, and the active server 30-1 is also normally operating. The values of the coefficients 201 and the weights 202 are as illustrated in FIG. 6.

Then, the calculation results for the servers 30-2 and 30-3 are the same as the calculation results on Jan. 2, 2011 at 09:30 hours illustrated in the result table 206*a*. And the temperature evaluation values calculated for the servers 30-4 to 30-7 in step S401 in FIG. 9 are also the same as those in the result table 206*a*.

On the other hand, the voltage evaluation value calculated for the server 30-4 in step S402 in FIG. 9 is 600 (=$C_{self}W_3$+0=100×6). In the server 30-4, although a voltage abnormality is occurring on Jan. 2, 2011 at 11:10 hours, no abnormality other than the voltage abnormality has not occurred until Jan. 2, 2011 at 11:10 hours. That is, in the server 30-4, only the voltage abnormality has occurred, and no temperature abnormality has occurred.

The correction constant $\epsilon$ is extremely small as illustrated in FIG. 6. Therefore, as expressed in approximation by the formula (37), the comprehensive evaluation value of the server 30-4 is approximately 600 (=0×0+1×600). In the fields of the entry having a server ID of "4" in the result table 206*b*, the three values, 0, 600 and 600, calculated as described above are recorded.

The voltage evaluation value calculated for the server 30-5 in step S402 is 60 (=0+$C_{power}W_3$=10×6). And no abnormality has occurred until Jan. 2, 2011 at 11:10 hours. Therefore, as expressed by the formula (38), the comprehensive evaluation value of the server 30-5 is 30 (=½×0+½×60). In the fields of the entry having a server ID of "5" in the result table 206b, the three values, 0, 60 and 30, calculated as described above are recorded.

The voltage evaluation value calculated for the server 30-6 in step S402 is 100 (=$C_{self}W_1$+0=100×1). In the server 30-6, a voltage abnormality is occurring on Jan. 2, 2011 at 11:10 hours, and a voltage abnormality occurs in a period from Jan. 1, 2011 at 11:00 hours to Jan. 1, 2011 at 12:00 hours. However, no temperature abnormality has occurred in the server 30-6.

The correction constant $\epsilon$ is extremely small as illustrated in FIG. 6. Therefore, as expressed in approximation by the formula (37), the comprehensive evaluation value of the server 30-6 is approximately 100 (=0×0+1×100). In the fields of the entry having a server ID of "6" in the result table 206b, the three values, 0, 100 and 100, calculated as described above are recorded.

The voltage evaluation value calculated for the server 30-7 in step S402 is 10 (=0+$C_{power}W_1$=10×1). And no abnormality has occurred in the server 30-7 until Jan. 2, 2011 at 11:10 hours. Therefore, as expressed by the formula (38), the comprehensive evaluation value of the server 30-7 is 5 (=½×0+½×10). In the fields of the entry having a server ID of "7" in the result table 206b, the three values, 0, 10 and 5, calculated as described above are recorded.

According to the result table 206b obtained as described above, the probability of occurrence of a future failure is the lowest in the server 30-7, whose comprehensive evaluation value is 5. Therefore, if the active server 30-1 fails before the result table 206b is updated, and the failover process occurs in response to the failure as illustrated in FIG. 5, the failover control unit 4 selects the server 30-7 as a new active server.

Next, the second embodiment will be described with reference to FIGS. 13 to 16. According to the second embodiment, the comprehensive evaluation value $f_{total}(s_i)$ expressed by the formula (30) is calculated. Specifically, the calculation unit 3 according to the second embodiment operates according to the flowchart illustrated in FIG. 13.

Figure 13:
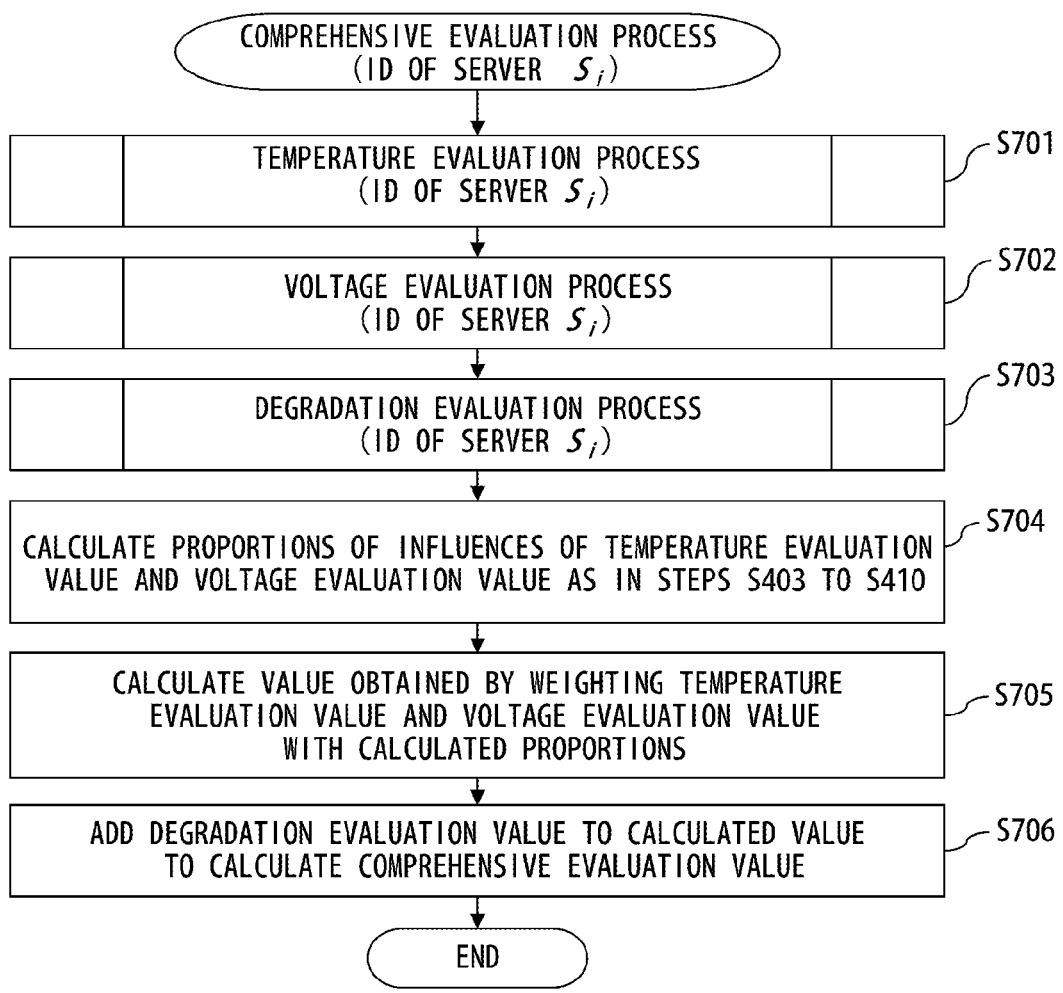
FIG. 13 is a flowchart illustrating a comprehensive evaluation process according to the second embodiment.

FIG. 13 is a flowchart illustrating a comprehensive evaluation process according to the second embodiment. The comprehensive evaluation process illustrated in FIG. 13 is performed by the calculation unit 3 in step S106 in FIG. 1. More specifically, if the failover process occurs as illustrated in FIG. 4, the calculation unit 3 performs the comprehensive evaluation process in FIG. 13 in step S203 in FIG. 4. If the failover process occurs as illustrated in FIG. 5, the calculation unit 3 performs the comprehensive evaluation process in FIG. 13 at an appropriate time independently of the process in FIG. 5.

The comprehensive evaluation process in FIG. 13 is performed for one server (which will be denoted as a server $s_i$, for the convenience of explanation). For example, the failover control unit 4 may specify the ID of the server $s_i$ to the calculation unit 3 and instruct the calculation unit to perform the comprehensive evaluation process. Alternatively, the calculation unit 3 may regularly perform the comprehensive evaluation process in FIG. 13 for each server $s_i$.

Regardless of when the comprehensive evaluation process in FIG. 13 is performed, according to the second embodiment, the management DB 5 contains a result table illustrated in FIG. 16. Although details of the result table in FIG. 16 will be described later, as illustrated in FIG. 16, each entry of the result table according to the second embodiment includes five fields: a server ID, a temperature evaluation value, a voltage evaluation value, a degradation evaluation value and a comprehensive evaluation value. Each entry of the result table corresponds to a standby server. As the comprehensive evaluation process in FIG. 13 progresses, the result table is updated.

Steps S701 to S702 in FIG. 13 are the same as steps S401 to S402 in FIG. 9, so that detailed descriptions thereof will be omitted.

Figure 14A:
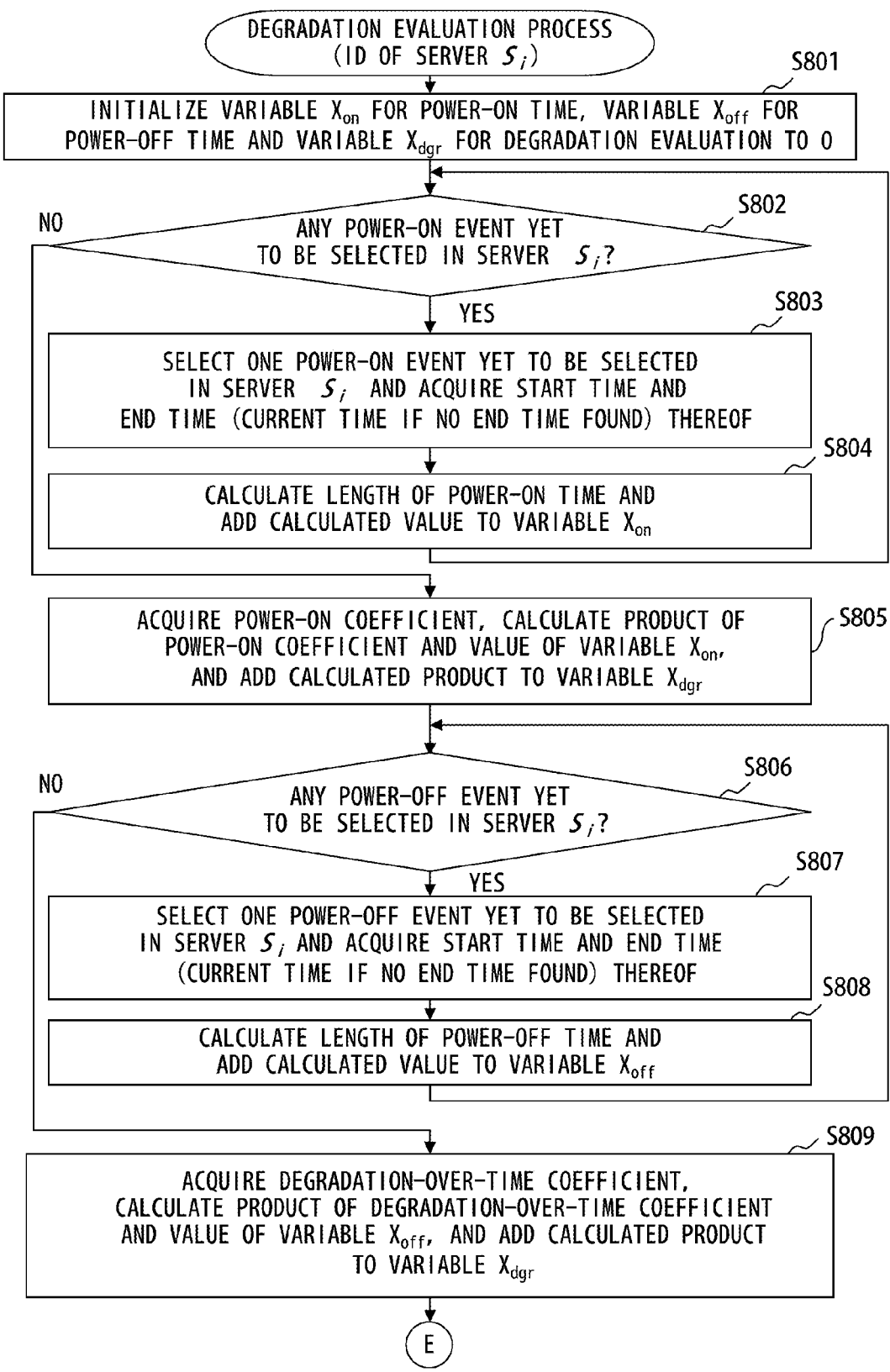
FIGS. 14A to 14B are flowcharts illustrating a degradation evaluation process.
Figure 14B:
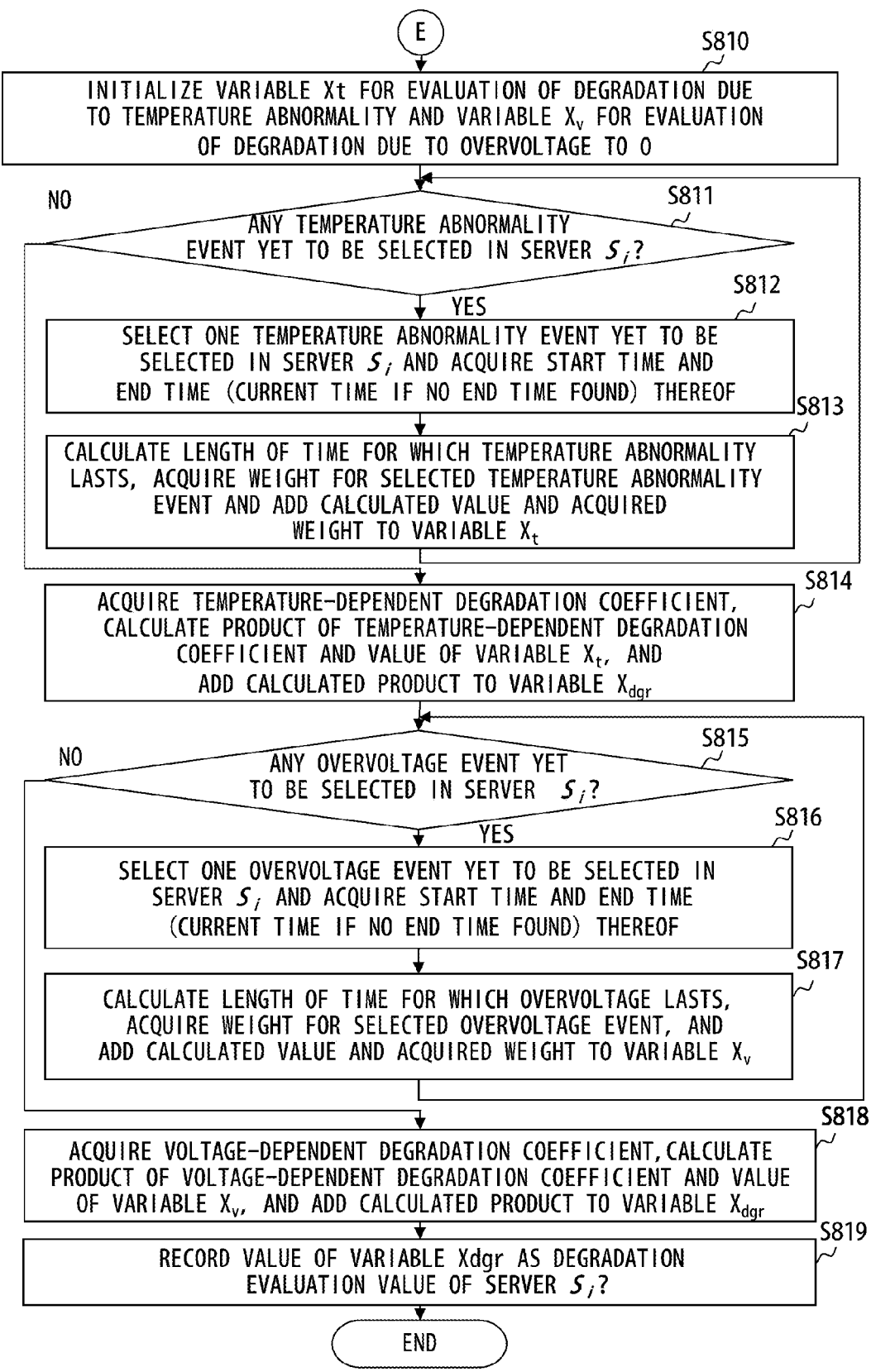

In the subsequent step S703, the calculation unit 3 specifies the ID of the server $s_i$ to the degradation evaluation unit 3d and instructs the degradation evaluation unit 3d to perform the degradation evaluation process illustrated in FIGS. 14A to 14B. The degradation evaluation unit 3d then calculates the degradation evaluation value $f_{dgr}(s_i)$ expressed by the formula (12) according to the flowchart illustrated in FIGS. 14A to 14B. The degradation evaluation unit 3d then records the calculation result in the field of the degradation evaluation value of the entry corresponding to the server $s_i$ in the result table.

In the subsequent step S704, the comprehensive evaluation unit 3c calculates the proportion of the influence of each of the temperature evaluation value $f_{tmpr}(s_i)$ and the voltage evaluation value $f_{vol}(s_i)$ as in steps S403 to S410 in FIG. 9.

In step S705, the comprehensive evaluation unit 3c calculates a value obtained by weighting the temperature evaluation value $f_{tmpr}(s_i)$ and the voltage evaluation value $f_{vol}(s_i)$ with the calculated proportions (that is, the value $f_{tot}(s_i)$ in the formula (34)). The method of calculating the weighted sum in step S705 is the same as in step S411 in FIG. 9.

Finally, in step S706, the comprehensive evaluation unit 3c calculates the comprehensive evaluation value $f_{total}(s_i)$ by adding the degradation evaluation value $f_{dgr}(s_i)$ recorded in the result table in step S703 to the value $f_{tot}(s_i)$ calculated in step S705. That is, the comprehensive evaluation unit 3c calculates the comprehensive evaluation value $f_{total}(s_i)$ according to the formula (30).

The comprehensive evaluation unit 3c then records the calculation result in the field of the comprehensive evaluation value of the entry corresponding to the server $s_i$ in the result table. This is the end of the comprehensive evaluation process in FIG. 13.

FIGS. 14A to 14B illustrate a flowchart of the degradation evaluation process. According to the second embodiment, the degradation evaluation unit 3d performs the degradation evaluation process in step S703 in FIG. 13.

In step S801, the degradation evaluation unit 3d initializes a variable Xon that indicates the length of power-on time, a variable Xoff that indicates the length of power-off time and a variable Xdgr for degradation evaluation to 0.

In step S802, the degradation evaluation unit 3d determines whether or not there is a power-on event in the server $s_i$ that has not been selected to be processed in steps S803 to S804. Specifically, the degradation evaluation unit 3d determines whether or not there is an entry that satisfies all of the following three conditions in the event management table.

The value in the "server ID" field is equal to the ID of the server $s_i$.

The "event type" field indicates a power-on.

The entry has not been selected to be processed in steps S803 to S804.

If there is an entry that satisfies all of the above three conditions, the process proceeds to step S803. To the contrary, if there is no entry that satisfies all of the above three conditions, the process proceeds to step S805.

In step S803, the degradation evaluation unit 3d selects one power-on event in the server $s_i$ that has not been selected yet. That is, the degradation evaluation unit 3d selects one entry that is related to a power-on event and has not been selected yet (that is, an entry that satisfies all of the above three conditions).

The degradation evaluation unit 3d then acquires the start time and the end time of the power-on event from the selected entry. If no valid value of the end time is recorded in the selected entry, it means that the server $s_i$ is currently in the power-on state, so that the degradation evaluation unit 3d acquires the current time instead of the end time.

In step S804, the degradation evaluation unit 3d calculates the length of power-on time for the selected entry. That is, the degradation evaluation unit 3d subtracts the acquired start time from the acquired end time or current time. The degradation evaluation unit 3d then adds the value obtained by the subtraction to the variable Xon. The process then returns to step S802.

As a result of repetitions of the loop from steps S802 to S804, at the time of execution of steps S805, a formula that Xon=$t_{on}(s_i)$ holds (see the formula (12)).

In step S805, the degradation evaluation unit 3d acquires the power-on coefficient $C_{on}$ in FIG. 6. The degradation evaluation unit 3d then calculates the product of the power-on coefficient $C_{on}$ and the variable Xon and adds the calculated product to the variable Xdgr. As a result, the value of the first term of the formula (12) is stored in the variable Xdgr.

In step S806, the degradation evaluation unit 3d determines whether or not there is a power-off event in the server $s_i$ that has not been selected to be processed in steps S807 to S808. Specifically, the degradation evaluation unit 3d determines whether or not there is an entry that satisfies all of the following three conditions in the event management table.

The value in the "server ID" field is equal to the ID of the server $s_i$.

The "event type" field indicates a power-off.

The entry has not been selected to be processed in steps S807 to S808.

If there is an entry that satisfies all of the above three conditions, the process proceeds to step S807. To the contrary, if there is no entry that satisfies all of the above three conditions, the process proceeds to step S809.

In step S807, the degradation evaluation unit 3d selects one power-off event in the server $s_i$ that has not been selected yet. That is, the degradation evaluation unit 3d selects one entry that is related to a power-off event and has not been selected yet (that is, an entry that satisfies all of the above three conditions).

The degradation evaluation unit 3d then acquires the start time and the end time of the power-off event from the selected entry. If no valid value of the end time is recorded in the selected entry, it means that the server $s_i$ is currently in the power-off state, so that the degradation evaluation unit 3d acquires the current time instead of the end time.

In step S808, the degradation evaluation unit 3d calculates the length of power-off time for the selected entry. That is, the degradation evaluation unit 3d subtracts the acquired start time from the acquired end time or current time. The degradation evaluation unit 3d then adds the value obtained by the subtraction to the variable Xoff. The process then returns to step S806.

As a result of repetitions of the loop from steps S806 to S808, at the time of execution of steps S809, a formula that Xoff=$t_{off}(s_i)$ holds (see the formula (12)).

In step S809, the degradation evaluation unit 3d acquires the degradation-over-time coefficient $C_{off}$ in FIG. 6. The degradation evaluation unit 3d then calculates the product of the degradation-over-time coefficient $C_{off}$ and the variable Xoff and adds the calculated product to the variable Xdgr. As a result, the sum of the first term and the second term of the formula (12) is stored in the variable Xdgr.

In step S810 in FIG. 14B, the degradation evaluation unit 3d initializes the variable Xt for evaluation of the degradation due to the temperature abnormality (that is, for indication of the value $f_{dgrTmpr}(s_i)$ in the formulas (12) and (13)) to 0. In addition, the degradation evaluation unit 3d initializes the variable Xv for evaluation of the degradation due to the overvoltage (that is, for indication of the value $f_{dgrOvervol}(s_i)$ in the formulas (12) and (14)) to 0.

In step S811, the degradation evaluation unit 3d determines whether or not there is a temperature abnormality event in the server $s_i$ that has not been selected to be processed in steps S812 to S813. Specifically, the degradation evaluation unit 3d determines whether or not there is an entry that satisfies all of the following three conditions in the event management table.

The value in the "server ID" field is equal to the ID of the server $s_i$.

The "event type" field indicates a temperature abnormality.

The entry has not been selected to be processed in steps S812 to S813.

If there is an entry that satisfies all of the above three conditions, the process proceeds to step S812. To the contrary, if there is no entry that satisfies all of the above three conditions, the process proceeds to step S814.

In step S812, the degradation evaluation unit 3d selects one temperature abnormality event in the server $s_i$ that has not been selected yet. That is, the degradation evaluation unit 3d selects one entry that is related to a temperature abnormality event and has not been selected yet (that is, an entry that satisfies all of the above three conditions).

The degradation evaluation unit 3d then acquires the start time and the end time of the temperature abnormality event from the selected entry. If no valid value of the end time is recorded in the selected entry, it means that the temperature abnormality event has not ended yet, so that the degradation evaluation unit 3d acquires the current time instead of the end time.

In step S813, the degradation evaluation unit 3d calculates the length of time for which the selected temperature abnormality event lasts. That is, the degradation evaluation unit 3d subtracts the acquired start time from the acquired end time or current time.

Furthermore, the degradation evaluation unit 3d acquires the weight for the selected temperature abnormality event. Specifically, the degradation evaluation unit 3d reads the value in the "event level" field of the selected entry and acquires a weight corresponding to the read value.

The degradation evaluation unit 3d then adds the product of the calculated length of time and the acquired weight to the variable Xt. The process then returns to step S811.

As a result of repetitions of the loop from steps S811 to S813, at the time of execution of steps S814, the multiplier by which the temperature-dependent degradation coefficient $C_{dgrTmpr}$ in FIG. 6 in the formula (13) is multiplied is stored in the variable Xt.

In step S814, the degradation evaluation unit 3d acquires the temperature-dependent degradation coefficient $C_{dgrTmpr}$. The degradation evaluation unit 3d then calculates the product of the temperature-dependent-degradation coefficient $C_{dgrTmpr}$ and the variable Xt and adds the calculated product to the variable Xdgr. As a result, the sum of the first to third terms of the formula (12) is stored in the variable Xdgr.

In step S815, the degradation evaluation unit 3d determines whether or not there is an overvoltage event in the server $s_i$ that has not been selected to be processed in steps S816 to S817. Specifically, the degradation evaluation unit 3d determines whether or not there is an entry that satisfies all of the following three conditions in the event management table.

The value in the "server ID" field is equal to the ID of the server $s_i$.

The "event type" field indicates an overvoltage.

The entry has not been selected to be processed in steps S816 to S817.

If there is an entry that satisfies all of the above three conditions, the process proceeds to step S816. To the contrary, if there is no entry that satisfies all of the above three conditions, the process proceeds to step S818.

In step S816, the degradation evaluation unit 3d selects one overvoltage event in the server $s_i$ that has not been selected yet. That is, the degradation evaluation unit 3d selects one entry that is related to an overvoltage event and has not been selected yet (that is, an entry that satisfies all of the above three conditions).

The degradation evaluation unit 3d then acquires the start time and the end time of the overvoltage event from the selected entry. If no valid value of the end time is recorded in the selected entry, it means that the selected overvoltage event has not ended yet in the server $s_i$, so that the degradation evaluation unit 3d acquires the current time instead of the end time.

In step S817, the degradation evaluation unit 3d calculates the length of time for which the selected overvoltage event lasts. That is, the degradation evaluation unit 3d subtracts the acquired start time from the acquired end time or current time.

Furthermore, the degradation evaluation unit 3d acquires the weight for the selected overvoltage event. Specifically, the degradation evaluation unit 3d reads the value in the "event level" field of the selected entry and acquires a weight corresponding to the read value.

The degradation evaluation unit 3d then adds the product of the calculated length of time and the acquired weight to the variable Xt. The process then returns to step S815.

As a result of repetitions of the loop from steps S815 to S817, the value stored in the variable Xv at the time of execution of steps S818 is the multiplier by which the voltage-dependent degradation coefficient $C_{dgrOvervol}$ in FIG. 6 in the formula (14) is multiplied.

In step S818, the degradation evaluation unit 3d acquires the voltage-dependent-degradation coefficient $C_{dgrOvervol}$. The degradation evaluation unit 3d then calculates the product of the voltage-dependent-degradation coefficient $C_{dgrOvervol}$ and the variable Xv and adds the calculated product to the variable Xdgr. As a result, the degradation evaluation value $f_{dgr}(s_i)$ in the formula (12) is stored in the variable Xdgr.

Finally, in step S819, the degradation evaluation unit 3d records the value of the variable Xdgr as the degradation evaluation value $f_{dgr}(s_i)$ of the server $s_i$. That is, the degradation evaluation unit 3d records the variable Xdgr in the "degradation evaluation value" field of the entry corresponding to the server $s_i$ in the result table. This is the end of the degradation evaluation process in FIGS. 14A to 14B.

FIG. 15 is a diagram illustrating an example of the event management table contained in the management DB. FIG. 15 illustrates an event management table 205c on Jan. 3, 2011 at 11:00 hours. In the event management table 205c, compared with the event management table 205b in FIG. 8, the end times of the twelfth, fourteenth and fifteenth entries are updated, and the sixteenth and seventeenth entries are added.

Specifically, on Jan. 2, 2011 at 12:00 hours, the server management device 31-6 detects that the voltage of the server 30-6 has recovered to normal. The server management device 31-6 then notifies the collecting unit 2 of the recovery of the server 30-6 from the undervoltage. In response to the notification, the collecting unit 2 updates the end time of the fifteenth entry to "Jan. 2, 2011 at 12:00 hours".

on Jan. 3, 2011 at 10:00 hours, the server management device 31-2 detects that the temperature of the server 30-2 has recovered to normal. The server management device 31-2 then notifies the collecting unit 2 of the recovery of the server 30-2 from the temperature abnormality. In response to the notification, the collecting unit 2 updates the end time of the twelfth entry to "Jan. 3, 2011 at 10:00 hours".

On Jan. 3, 2011 at 10:00 hours, the server management device 31-4 detects that the voltage of the server 30-4 has recovered to normal. The server management device 31-4 then notifies the collecting unit 2 of the recovery of the server 30-4 from the voltage abnormality. In response to the notification, the collecting unit 2 updates the end time of the fourteenth entry to "Jan. 3, 2011 at 10:00 hours".

After that, on Jan. 3, 2011 at 11:00 hours, the server management device 31-2 detects a temperature abnormality of the server 30-2 and notifies the collecting unit 2 of the detection result. Based on the notification from the server management device 31-2, the collecting unit 2 recognizes that a "temperature abnormality" event at the "Minor" level has occurred in the server 30-2. Having recognized that fact, the collecting unit 2 generates the sixteenth entry. In FIG. 15, the end time of the sixteenth entry is an invalid value.

On Jan. 3, 2011 at 11:00 hours, the server management device 31-4 detects an overvoltage of the server 30-4 and notifies the collecting unit 2 of the detection result. Based on the notification from the server management device 31-4, the collecting unit 2 recognizes that an "overvoltage" event at the "Major" level has occurred in the server 30-4. Having recognized that fact, the collecting unit 2 generates the seventeenth entry. In FIG. 15, the end time of the seventeenth entry is an invalid value.

Next, specific examples of the evaluation values calculated in the second embodiment will be described with reference to FIGS. 15 and 16. A result table 206c in FIG. 16 illustrates a state immediately after the comprehensive evaluation process in FIG. 13 is performed for each of the standby servers 30-2 to 30-7 on Jan. 3, 2011 at 10:30 hours.

As illustrated in the event management table 205c in FIG. 15, on Jan. 3, 2011 at 10:30 hours, all the servers 30-1 to 30-7 are normally operating. The values of the coefficients 201 and the weights 202 are as illustrated in FIG. 6.

Then, for the servers 30-2 to 30-7, the temperature evaluation value calculated in step S701 in FIG. 13 is 0. In addition, for the servers 30-2 to 30-7, the voltage evaluation value calculated in step S702 is 0. Therefore, for the servers 30-2 to 30-7, the weighted sum calculated in step S705 is 0.

As is apparent from comparison between FIGS. 10 and 16, the temperature evaluation value decreases if the temperature abnormality ends, and the voltage evaluation value decreases if the voltage abnormality ends.

The degradation evaluation value and the comprehensive evaluation value for the server 30-2 are calculated as described below.

In the event management table 502c in FIG. 15, the second and eighth entries related to the server 30-2 indicate the following.

The server 30-2 is in the power-off state for a period of 120 hours from Dec. 23, 2010 at 10:00 hours to Dec. 28, 2010 at 10:00 hours.

The server 30-2 is in the power-on state for a period of 144.5 hours from Dec. 28, 2010 at 10:00 hours to Jan. 3, 2011 at 10:30 hours.

Therefore, in the formula (12), $t_{on}(s_i)=144.5$, and $t_{off}(s_i)=120$. That is, the value of the variable Xon in step S805 in FIG. 14A is 144.5, and the value of the variable Xoff in step S809 is 120.

According to the twelfth entry of the event management table 205c, in the server 30-2, a temperature abnormality at the "Major" level continues for a period of 48 hours from Jan. 1, 2011 at 10:00 hours to Jan. 3, 2011 at 10:00 hours. Note that, on Jan. 3, 2011 at 10:30 hours, the sixteenth entry of the event management table 205c has not been generated yet.

Therefore, as may be seen from the following formula, the value of the function $f_{dgrTmpr}(s_i)$ in the formula (13) is approximately 0.27.

$$C_{dgrTmpr} \times W_2 \times 48 = 1/360 \times 2 \times 48 = 4/15 \approx 0.27$$

That is, in step S814 in FIG. 14B, the value of the variable Xt is 96 (=2×48), and the value of approximately 0.27 described above is added to the variable Xdgr.

According to the event management table 205c, no overvoltage has occurred in the server 30-2 until Jan. 3, 2011 at 10:30 hours. Therefore, the value of the function $f_{dgrOvervol}(s_i)$ in the formula (14) is 0. That is, in step S818 in FIG. 14B, the value of the variable Xv is 0, and 0 is added to the variable Xdgr.

Therefore, as may be seen form the following formula, the degradation evaluation value calculated for the server 30-2 according to the formula (12) is approximately 0.83.

$$1/360 \times 144.5 + 1/720 \times 120 + 4/15 + 0 \approx 0.83$$

As described above, the value calculated in step S705 in FIG. 13 is 0. Therefore, the comprehensive evaluation value for the server 30-2 calculated in step S706 is approximately 0.83 (=0+0.83).

The degradation evaluation value and the comprehensive evaluation value for the server 30-3 are calculated as described below.

According to the ninth entry of the event management table 205c, the server 30-3 is in the power-off state for a period of 144.5 hours from Dec. 28, 2010 at 10:00 hours to Jan. 3, 2011 at 10:30 hours. And there is no record of a power-on event related to the server 30-3. Therefore, in the formula (12), $t_{on}(s_i)=0$, and $t_{off}(s_i)=144.5$.

In addition, neither a temperature abnormality nor a voltage abnormality has occurred in the server 30-3. Therefore, as may be seen from the following formula, the degradation evaluation value calculated for the server 30-3 according to the formula (12) is approximately 0.20.

$$1/360 \times 0 + 1/720 \times 144.5 + 0 + 0 \approx 0.20$$

As described above, the value calculated in step S705 in FIG. 13 is 0. Therefore, the comprehensive evaluation value for the server 30-3 calculated in step S706 is approximately 0.20 (=0+0.20).

The degradation evaluation value and the comprehensive evaluation value for the server 30-4 are calculated as described below.

In the event management table 205c, the third and seventh entries related to the server 30-4 indicate the following.
  The server 30-4 is in the power-off state for a period of 96 hours from Dec. 23, 2010 at 10:00 hours to Dec. 27, 2010 at 10:00 hours.
  The server 30-4 is in the power-on state for a period of 168.5 hours from Dec. 27, 2010 at 10:00 hours to Jan. 3, 2011 at 10:30 hours.

Therefore, in the formula (12), $t_{on}(s_i)=168.5$, and $t_{off}(s_i)=96$.

According to the event management table 205c, until Jan. 3, 2011 at 10:30 hours, although an undervoltage has occurred in the server 30-4, neither a temperature abnormality nor an overvoltage has occurred in the server 30-4. Therefore, as may be seen from the following formula, the degradation evaluation value calculated for the server 30-4 according to the formula (12) is approximately 0.60.

$$1/360 \times 168.5 + 1/720 \times 96 + 0 + 0 \approx 0.60$$

As described above, the value calculated in step S705 in FIG. 13 is 0. Therefore, the comprehensive evaluation value for the server 30-4 calculated in step S706 is approximately 0.60 (=0+0.60).

The degradation evaluation value and the comprehensive evaluation value for the server 30-5 are calculated as described below.

According to the fourth entry of the event management table 205c, the server 30-5 is in the power-off state for a period of 264.5 hours from Dec. 23, 2010 at 10:00 hours to Jan. 3, 2011 at 10:30 hours. And there is no record of a power-on event related to the server 30-5. Therefore, in the formula (12), $t_{on}(s_i)=0$, and $t_{off}(s_i)=264.5$.

In addition, neither a temperature abnormality nor a voltage abnormality has occurred in the server 30-5. Therefore, as may be seen from the following formula, the degradation evaluation value calculated for the server 30-5 according to the formula (12) is approximately 0.37.

$$1/360 \times 0 + 1/720 \times 264.5 + 0 + 0 \approx 0.37$$

As described above, the value calculated in step S705 in FIG. 13 is 0. Therefore, the comprehensive evaluation value for the server 30-5 calculated in step S706 is approximately 0.37 (=0+0.37).

The degradation evaluation value and the comprehensive evaluation value for the server 30-6 are calculated as described below.

In the event management table 205c, the fifth and tenth entries related to the server 30-6 indicate the following.
  The server 30-6 is in the power-off state for a period of 120 hours from Dec. 23, 2010 at 10:00 hours to Dec. 28, 2010 at 10:00 hours.
  The server 30-6 is in the power-on state for a period of 144.5 hours from Dec. 28, 2010 at 10:00 hours to Jan. 3, 2011 at 10:30 hours.

Therefore, in the formula (12), $t_{on}(s_i)=144.5$, and $t_{off}(s_i)=120$.

According to the event management table 205c, until Jan. 3, 2011 at 10:30 hours, although an undervoltage has occurred twice in the server 30-6, neither a temperature abnormality nor an overvoltage has occurred in the server 30-6. Therefore, as may be seen from the following formula, the degradation evaluation value calculated for the server 30-6 according to the formula (12) is approximately 0.57.

$$1/360 \times 144.5 + 1/720 \times 120 + 0 + 0 \approx 0.57$$

As described above, the value calculated in step S705 in FIG. 13 is 0. Therefore, the comprehensive evaluation value for the server 30-6 calculated in step S706 is approximately 0.57 (=0+0.57).

The degradation evaluation value and the comprehensive evaluation value for the server 30-7 are calculated as described below.

In the event management table 205c, the sixth and eleventh entries related to the server 30-7 indicate the following.

The server 30-7 is in the power-off state for a period of 192 hours from Dec. 23, 2010 at 10:00 hours to Dec. 31, 2010 at 10:00 hours.

The server 30-7 is in the power-on state for a period of 72.5 hours from Dec. 31, 2010 at 10:00 hours to Jan. 3, 2011 at 10:30 hours.

Therefore, in the formula (12), $t_{on}(s_i)=72.5$, and $t_{off}(s_i)=192$.

According to the event management table 205c, until Jan. 3, 2011 at 10:30 hours, neither a temperature abnormality nor an overvoltage has occurred in the server 30-7. Therefore, as may be seen from the following formula, the degradation evaluation value calculated for the server 30-7 according to the formula (12) is approximately 0.47.

$$\tfrac{1}{360} \times 72.5 + \tfrac{1}{720} \times 192 + 0 + 0 \approx 0.47$$

As described above, the value calculated in step S705 in FIG. 13 is 0. Therefore, the comprehensive evaluation value for the server 30-7 calculated in step S706 is approximately 0.47 (=0+0.47).

The calculation unit 3 calculates various evaluation values for each of the servers 30-2 to 30-7 as described above, and stores the calculated evaluation values in the result table 206c illustrated in FIG. 16. According to the result table 206c, the probability of occurrence of a future failure is the lowest in the server 30-3, whose comprehensive evaluation value is approximately 0.20. Therefore, if the active server 30-1 fails, the failover control unit 4 selects the server 30-3 as a new active server.

Next, the third embodiment will be described with reference to FIGS. 17 to 20. According to the third embodiment, the comprehensive evaluation value $f_{total}(s_i)$ expressed by the formula (31) is calculated. Specifically, the calculation unit 3 according to the third embodiment operates according to the flowchart illustrated in FIG. 17.

FIG. 17 is a flowchart illustrating a comprehensive evaluation process according to the third embodiment. The comprehensive evaluation process illustrated in FIG. 17 is performed by the calculation unit 3 in step S106 in FIG. 1. More specifically, if the failover process occurs as illustrated in FIG. 4, the calculation unit 3 performs the comprehensive evaluation process in FIG. 17 in step S203 in FIG. 4. If the failover process occurs as illustrated in FIG. 5, the calculation unit 3 performs the comprehensive evaluation process in FIG. 17 at an appropriate time independently of the process in FIG. 5.

The comprehensive evaluation process in FIG. 17 is performed for one server (which will be denoted as a server $s_i$, for the convenience of explanation). For example, the failover control unit 4 may specify the ID of the server $s_i$ to the calculation unit 3 and instruct the calculation unit to perform the comprehensive evaluation process. Alternatively, the calculation unit 3 may regularly perform the comprehensive evaluation process in FIG. 17 for each server $s_i$.

Regardless of when the comprehensive evaluation process in FIG. 17 is performed, according to the third embodiment, the management DB 5 contains a result table illustrated in FIG. 19. Although details of the result table in FIG. 19 will be described later, as illustrated in FIG. 19, each entry of the result table according to the third embodiment includes five fields: a server ID, a temperature evaluation value, a voltage evaluation value, a time evaluation value and a comprehensive evaluation value. Each entry of the result table corresponds to a standby server. As the comprehensive evaluation process in FIG. 17 progresses, the result table is updated.

Steps S901 to S902 in FIG. 17 are the same as steps S401 to S402 in FIG. 9, so that detailed descriptions thereof will be omitted.

Figure 18:
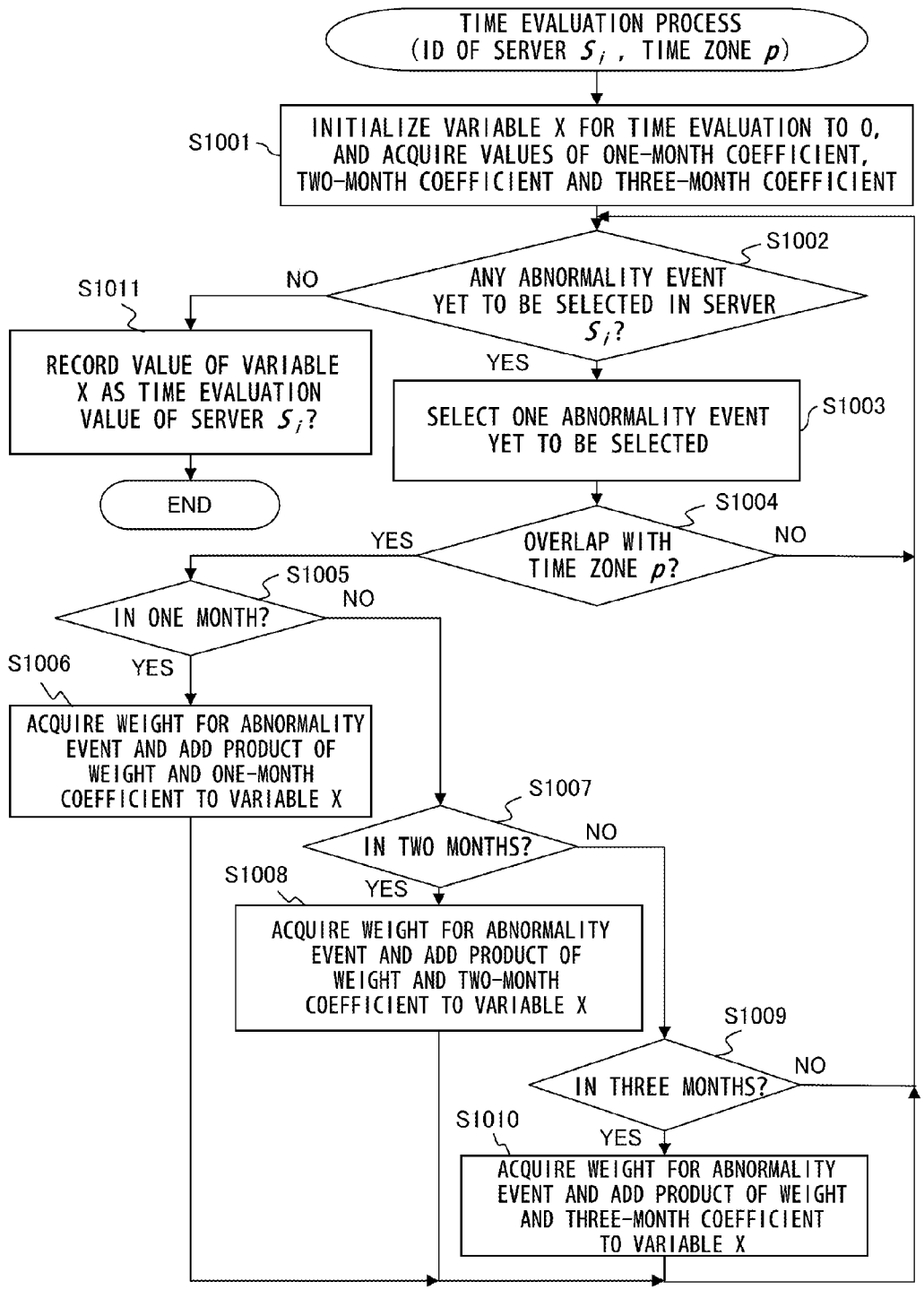
FIG. 18 is a flowchart illustrating a time evaluation process.

In the subsequent step S903, the calculation unit 3 specifies the following two values as augments to the time evaluation unit 3e and instructs the time evaluation unit 3e to perform the time evaluation process illustrated in FIG. 18.

The ID of the server $s_i$.

A period period(Now), which is determined by the current time (denoted as "Now" in the formula (31)).

The time evaluation unit 3e then calculates the time evaluation value $f_{time}(s_i, \text{period(Now)})$ according to the flowchart of FIG. 18. The time evaluation unit 3e records the calculation result in the field of the time evaluation value of the entry corresponding to the server $s_i$ in the result table.

As described with regard to the formula (31), the period period(Now) provided as an augment is an appropriate time zone including the point in time at which step S903 is performed. For example, if step S903 is performed at 11:00 hours, the period period(Now) may be a time zone starting from 11:00 hours (a time zone from 11:00 hours to 12:00 hours, for example) or a time zone including 11:00 hours in the middle thereof (a time zone from 10:30 hours to 11:30 hours, for example).

Details of the function period( ) are previously appropriately determined depending on the embodiment. Therefore, the calculation unit 3 may specifies an appropriate period period(Now) as an augment to the time evaluation unit 3e depending on the current time at which step S903 is performed.

In the subsequent step S904, the comprehensive evaluation unit 3c calculates the proportion of the influence of each of the temperature evaluation value $f_{tmpr}(s_i)$ and the voltage evaluation value $f_{vol}(s_i)$ as in steps S403 to S410 in FIG. 9.

In step S905, the comprehensive evaluation unit 3c calculates a value obtained by weighting the temperature evaluation value $f_{tmpr}(s_i)$ and the voltage evaluation value $f_{vol}(s_i)$ with the calculated proportions (that is, the value $f_{tot}(s_i)$ in the formula (34)). The method of calculating the weighted sum in step S905 is the same as in step S411 in FIG. 9.

Finally, in step S906, the comprehensive evaluation unit 3c calculates the comprehensive evaluation value $f_{total}(Si)$ by adding the time evaluation value $f_{time}(s_i, \text{period(Now)})$ recorded in the result table in step S903 to the value $f_{tot}(s_i)$ calculated in step S905. That is, the comprehensive evaluation unit 3c calculates the comprehensive evaluation value $f_{total}(s_i)$ according to the formula (31).

The comprehensive evaluation unit 3c then records the calculation result in the field of the comprehensive evaluation value of the entry corresponding to the server $s_i$ in the result table. This is the end of the comprehensive evaluation process in FIG. 17.

FIG. 18 illustrates a flowchart of the time evaluation process. According to the third embodiment, the time evaluation unit 3e performs the time evaluation process in step S903 in FIG. 17. In the description of FIG. 18, let "p" be the time zone specified as an augment to the time evaluation unit 3e.

In step S1001, the time evaluation unit 3e initializes the variable X for time evaluation to 0. In addition, the time evaluation unit 3e acquires the values of the one-month coefficient $C_{one}$, the two-month coefficient $C_{two}$ and the three-month coefficient $C_{three}$ in FIG. 6.

In step S1002, the time evaluation unit 3e determines whether or not there is an abnormality event in the server $s_i$ that has not been selected to be processed in steps S1003 to S1010. Specifically, the time evaluation unit 3e determines whether or not there is an entry that satisfies all of the following three conditions in the event management table.

The value in the "server ID" field is equal to the ID of the server $s_i$.

The "event type" field indicates an abnormality (specifically, a temperature abnormality, an undervoltage or an overvoltage).

The entry has not been selected to be processed in steps S1003 to S1010.

If there is an entry that satisfies all of the above three conditions, the process proceeds to step S1003. To the contrary, if there is no entry that satisfies all of the above three conditions, the process proceeds to step S1011.

In step S1003, the time evaluation unit 3e selects one abnormality event in the server $s_i$ that has not been selected yet. That is, the time evaluation unit 3e selects one entry that is related to an abnormality event and has not been selected yet (that is, an entry that satisfies all of the above three conditions).

In step S1004, the time evaluation unit 3e determines whether or not the period for which the selected abnormality event overlaps with the time zone p. The length of the time zone p is determined to be shorter than a day. Specifically, the time evaluation unit 3e make the determination as described below.

If there is no record of the end time in the selected entry (that is, the selected abnormality event is still occurring), the time evaluation unit 3e regards the current time as the end time. The time evaluation unit 3e then determines whether or not the period from the start time to the end time of the selected abnormality event at least partially overlaps with the time zone p.

For example, consider a case where the time zone p is a time zone from 11:00 hours to 12:00 hours. In this case, for example, an abnormality event whose start time is Jan. 4, 2011 at 09:00 hours and whose end time is Jan. 4, 2011 at 11:10 hours partially overlaps with the time zone p. An abnormality event whose start time is Jan. 4, 2011 at 13:00 hours and whose end time is Jan. 5, 2011 at 11:30 hours also partially overlaps with the time zone p. On the other hand, an abnormality event whose start time is Jan. 4, 2011 at 13:00 hours and whose end time is Jan. 4, 2011 at 14:00 hours does not overlap with the time zone p.

If the period from the start time to the end time of the selected abnormality event at least partially overlaps with the time zone p, the process proceeds to step S1005. To the contrary, if the period from the start time to the end time of the selected abnormality event does not overlap with the time zone p, the process returns to step S1002.

In step S1005, the time evaluation unit 3e determines whether or not the selected abnormality event is an abnormality event that has occurred in the last one month. The time evaluation unit 3e makes the determination of step S1005 based on the date recorded as the start time of the selected entry and the date at which the time evaluation process in FIG. 18 is performed.

If the selected abnormality event is an abnormality event that has occurred in the last one month, the process proceeds to step S1006. To the contrary, if the selected abnormality event is not an abnormality event that has occurred before the last one month, the process proceeds to step S1007.

In step S1006, the time evaluation unit 3e acquires the weight for the selected abnormality event. Specifically, the time evaluation unit 3e reads the value in the "event level" field of the selected entry and acquires a weight corresponding to the read value.

The time evaluation unit 3e then adds the product of the acquired weight and the one-month coefficient $C_{one}$ to the variable X. The process then returns to step S1002.

In step S1007, the time evaluation unit 3e determines whether or not the selected abnormality event is an abnormality event that has occurred in the last two months. If the selected abnormality event is an abnormality event that has occurred in the last two months, the process proceeds to step S1008.

To the contrary, if the selected abnormality event is not an abnormality event that has occurred in the last two months, the process proceeds to step S1009.

In step S1008, the time evaluation unit 3e acquires the weight for the selected abnormality event. The time evaluation unit 3e then adds the product of the acquired weight and the two-month coefficient $C_{two}$ to the variable X. The process then returns to step S1002.

In step S1009, the time evaluation unit 3e determines whether or not the selected abnormality event is an abnormality event that has occurred in the last three months. If the selected abnormality event is an abnormality event that has occurred in the last three months, the process proceeds to step S1010. To the contrary, if the selected abnormality event is not an abnormality event that has occurred in the last three months, the process returns to step S1002.

In step S1010, the time evaluation unit 3e acquires the weight for the selected abnormality event. The time evaluation unit 3e then adds the product of the acquired weight and the three-month coefficient $C_{three}$ to the variable X. The process then returns to step S1002.

As a result of repetitions of the loop from steps S1002 to S1010, at the time of execution of step S1011, all the abnormality events that have occurred in the server $s_i$ in the last three months have been selected. That is, at the time of execution of step S1011, the time evaluation value $f_{time}(s_i, p)$ in the formula (26) is stored in the variable X.

Therefore, in step S1011, the time evaluation unit 3e records the value of the variable X as the time evaluation value $f_{time}(s_i, p)$ of the server $s_i$. That is, the time evaluation unit 3e records the value of the variable X in the "time evaluation value" field of the entry corresponding to the server $s_i$ in the result table. This is the end of the time evaluation process in FIG. 18.

For the determinations in steps S1005, S1007 and S1009, the start time may be used as described above. Depending on the embodiment, however, the end time may be used instead of the start time (as for an entry for which the end time has not been recorded, the current time may be used).

Next, specific examples of the evaluation values calculated in the third embodiment will be described with reference to FIGS. 15 and 19. A result table 206d in FIG. 19 illustrates a state immediately after the comprehensive evaluation process in FIG. 17 is performed for each of the standby servers 30-2 to 30-7 on Jan. 3, 2011 at 11:10 hours. In the following description, it is assumed that the event management table in the management DB 5 remains the same as the event management table 205c in FIG. 15 on Jan. 3, 2011 at 11:10 hours.

As illustrated in the event management table 205c in FIG. 15, on Jan. 3, 2011 at 11:10 hours, a temperature abnormality is occurring in the server 30-2, and an overvoltage is occurring in the server 30-4. On the other hand, the other servers 30-1, 30-3, 30-5, 30-6 and 30-7 are normally operating.

Therefore, the temperature evaluation value calculated for the server 30-2 in step S901 in FIG. 17 is 100 ($=C_{self}W_1+0+0+0=100\times1$). The voltage evaluation value calculated for the server 30-2 in step S902 is 0.

In the server 30-2, only a temperature abnormality has occurred, and any voltage abnormality has not occurred. Therefore, as expressed in approximation by the formula (37), the value calculated for the server 30-2 in step S905 is approximately 100 (=1×100+0×0).

As described above it is Jan. 3, 2011 at 11:10 hours when the comprehensive evaluation process in FIG. 17 is performed. That is, the value of the augment "Now" indicating the current time in the formula (31) is "Jan. 3, 2011, 11:10 hours". In the following description, for the convenience of explanation, it is assumed that the time zone period(Now) in the formula (31) is a time zone of one hour from 11:10 hours to 12:10 hours.

According to the above assumptions and the event management table 205c in FIG. 15, in the calculation of the time evaluation value of the server 30-2, the temperature abnormalities indicated by the twelfth and sixteenth entries are taken into consideration. The reasons for this are as follows.

The start time of the temperature abnormality indicated by the twelfth entry is within the last one month. In addition, the period for which the temperature abnormality lasts overlaps with the time zone from 11:10 hours to 12:10 hours on Jan. 1, 2011 (and Jan. 2, 2011).

The start time of the temperature abnormality indicated by the sixteenth entry is within the last one month. In addition, the temperature abnormality has not ended yet and is still occurring on Jan. 3, 2011 at 11:10 hours. Therefore, the period for which the temperature abnormality lasts at least partially overlaps with the time zone from 11:10 hours to 12:10 hours on Jan. 3, 2011.

Specifically, in the time zone period(Now) in the last one month, the temperature abnormality at the "Major" level is counted as one, and the temperature abnormality at the "Minor" level is counted as one. Therefore, as may be seen from the following formula, the time evaluation value of the server 30-2 is 12.

$$C_{one}(W_2 \times 1 + W_1 \times 1) = 4 \times (2+1) = 12$$

As described above, the value calculated in step S905 in FIG. 17 is approximately 100. Therefore, the comprehensive evaluation value for the server 30-2 calculated in step S906 is approximately 112 (=100+12).

The temperature evaluation value calculated for the server 30-3 in step S901 in FIG. 17 is 6 (=0+$C_{adj}$W$_1$+0+0=6×1). The voltage evaluation value calculated for the server 30-3 in step S902 is 0.

In the server 30-3, neither a temperature abnormality nor a voltage abnormality has occurred. Therefore, as shown by the formula (38), the value calculated for the server 30-3 in step S905 is 3 (=½×6+½×0).

Since neither a temperature abnormality nor a voltage abnormality has occurred in the server 30-3, the time evaluation value of the server 30-3 is 0, of course. Therefore, the comprehensive evaluation value for the server 30-3 calculated in step S906 is 3 (=0+3).

The temperature evaluation value calculated for the server 30-4 in step S901 is 0.

As illustrated by the seventeenth entry of the event management table 205c in FIG. 15, an overvoltage is occurring in the server 30-4. Therefore, the voltage evaluation value calculated for the server 30-4 in step S902 is 200 (=$C_{self}$W$_2$+0=100×2).

In the server 30-4, only a voltage abnormality has occurred, and any temperature abnormality has not occurred.

Therefore, as expressed in approximation by the formula (37), the value calculated for the server 30-4 in step S905 is approximately 200 (=0×0+1×2).

In the calculation of the time evaluation value of the server 30-4, the voltage abnormalities indicated by the fourteenth and seventeenth entries of the event management table 205c in FIG. 15 are taken into consideration. The reasons for this are as follows.

The start time of the undervoltage indicated by the fourteenth entry is within the last one month. In addition, the period for which the undervoltage lasts overlaps with the time zone from 11:10 hours to 12:10 hours on Jan. 2, 2011.

The start time of the overvoltage indicated by the seventeenth entry is within the last one month. In addition, the overvoltage has not ended yet and is still occurring on Jan. 3, 2011 at 11:10 hours. Therefore, the period for which the overvoltage lasts at least partially overlaps with the time zone from 11:10 hours to 12:10 hours on Jan. 3, 2011.

Specifically, in the time zone period(Now) in the last one month, the undervoltage at the "Critical" level is counted as one, and the overvoltage at the "Major" level is counted as one. Therefore, as may be seen from the following formula, the time evaluation value of the server 30-4 is 32.

$$C_{one}(W_3 \times 1 + W_2 \times 1) = 4 \times (6+2) = 32$$

As described above, the value calculated in step S905 in FIG. 17 is approximately 200. Therefore, the comprehensive evaluation value for the server 30-4 calculated in step S906 is approximately 232 (=200+32).

The temperature evaluation value calculated for the server 30-5 in step S901 is 0. On the other hand, the voltage evaluation value calculated in step S902 is 20 (=0+$C_{power}$W$_2$=10×2).

In the server 30-5, neither a temperature abnormality nor a voltage abnormality has occurred. Therefore, as shown by the formula (38), the value calculated for the server 30-5 in step S905 is 10 (=½×0+½×20).

Since neither a temperature abnormality nor a voltage abnormality has occurred in the server 30-5, the time evaluation value of the server 30-5 is 0, of course. Therefore, the comprehensive evaluation value for the server 30-5 calculated in step S906 is 10 (=10+0).

The temperature evaluation value calculated for the server 30-6 in step S901 is 0. The voltage evaluation value calculated in step S902 is also 0. Therefore, the value calculated in step S905 is also 0.

In the calculation of the time evaluation value of the server 30-6, the voltage abnormalities indicated by the thirteenth and fifteenth entries of the event management table 205c in FIG. 15 are taken into consideration. The reasons for this are as follows.

The start time of the undervoltage indicated by the thirteenth entry is within the last one month. In addition, the period for which the undervoltage lasts at least partially overlaps with the time zone from 11:10 hours to 12:10 hours on Jan. 1, 2011.

The start time of the undervoltage indicated by the fifteenth entry is within the last one month. In addition, the period for which the undervoltage lasts at least partially overlaps with the time zone from 11:10 hours to 12:10 hours on Jan. 2, 2011.

Specifically, in the time zone period(Now) in the last one month, the undervoltage at the "Minor" level is counted as two. Therefore, as may be seen from the following formula, the time evaluation value of the server 30-6 is 8.

$$C_{one}(W_1 \times 2) = 4 \times (1 \times 2) = 8$$

As described above, the value calculated in step S905 in FIG. 17 is 0. Therefore, the comprehensive evaluation value for the server 30-6 calculated in step S906 is 8 (=0+8).

The temperature evaluation value calculated for the server 30-7 in step S901 is 0. The voltage evaluation value calculated in step S902 is also 0. Therefore, the value calculated in step S905 is also 0.

Since neither a temperature abnormality nor a voltage abnormality has occurred in the server 30-7, the time evaluation value of the server 30-7 is 0, of course. Therefore, the comprehensive evaluation value for the server 30-7 calculated in step S906 is 0 (=0+0).

The calculation unit 3 calculates various evaluation values for each of the servers 30-2 to 30-7 as described above, and stores the calculated evaluation values in the result table 206d illustrated in FIG. 19. According to the result table 206d, the probability of occurrence of a future failure is the lowest in the server 30-7, whose comprehensive evaluation value is 0. Therefore, if the active server 30-1 fails, the failover control unit 4 selects the server 30-7 as a new active server.

Next, the fourth embodiment will be described with reference to FIGS. 20 to 21. According to the fourth embodiment, the comprehensive evaluation value $f_{total}(s_i)$ expressed by the formula (32) is calculated. Specifically, the calculation unit 3 according to the fourth embodiment operates according to the flowchart illustrated in FIG. 20.

FIG. 20 is a flowchart illustrating a comprehensive evaluation process according to the fourth embodiment. The comprehensive evaluation process illustrated in FIG. 20 is performed by the calculation unit 3 in step S106 in FIG. 1. More specifically, if the failover process occurs as illustrated in FIG. 4, the calculation unit 3 performs the comprehensive evaluation process in FIG. 20 in step S203 in FIG. 4. If the failover process occurs as illustrated in FIG. 5, the calculation unit 3 performs the comprehensive evaluation process in FIG. 20 at an appropriate time independently of the process in FIG. 5.

The comprehensive evaluation process in FIG. 20 is performed for one server (which will be denoted as a server $s_i$, for the convenience of explanation). For example, the failover control unit 4 may specify the ID of the server $s_i$ to the calculation unit 3 and instruct the calculation unit to perform the comprehensive evaluation process. Alternatively, the calculation unit 3 may regularly perform the comprehensive evaluation process in FIG. 20 for each server $s_i$.

Regardless of when the comprehensive evaluation process in FIG. 20 is performed, according to the fourth embodiment, the management DB 5 contains a result table illustrated in FIG. 21. Although details of the result table in FIG. 21 will be described later, as illustrated in FIG. 21, each entry of the result table according to the fourth embodiment includes six fields: a server ID, a temperature evaluation value, a voltage evaluation value, a degradation evaluation value, a time evaluation value and a comprehensive evaluation value. Each entry of the result table corresponds to a standby server. As the comprehensive evaluation process in FIG. 20 progresses, the result table is updated.

Steps S1101 to S1103 in FIG. 20 are the same as steps S701 to S703 in FIG. 13, so that detailed descriptions thereof will be omitted. The subsequent steps S1104 to S1106 are the same as steps S903 to S905 in FIG. 17, so that detailed descriptions thereof will be omitted.

After step S1106, in step S1107, the comprehensive evaluation unit 3c adds the degradation evaluation value recorded in step S1103 and the time evaluation value recorded in step S1104 to the value calculated in step S1106. In this way, the comprehensive evaluation unit 3c calculates the comprehensive evaluation value $f_{total}(s_i)$ expressed by the formula (32).

The comprehensive evaluation unit 3c then records the calculation result in the field of the comprehensive evaluation value of the entry corresponding to the server $s_i$ in the result table. This is the end of the comprehensive evaluation process in FIG. 20.

Next, specific examples of the evaluation values calculated in the fourth embodiment will be described with reference to FIGS. 15 and 21. A result table 206e in FIG. 21 illustrates a state immediately after the comprehensive evaluation process in FIG. 20 is performed for each of the standby servers 30-2 to 30-7 on Jan. 3, 2011 at 11:30 hours. In the following description, it is assumed that the event management table in the management DB 5 remains the same as the event management table 205c in FIG. 15 on Jan. 3, 2011 at 11:30 hours.

The values in the columns "temperature evaluation value", "voltage evaluation value" and "time evaluation value" in the result table 206e are the same as those in the result table 206d in FIG. 19. The reason for this is as follows.

The result table 206d illustrates the result of the comprehensive evaluation process performed on Jan. 3, 2011 at 11:10 hours. On the other hand, the result table 206e illustrates the result of the comprehensive evaluation process performed on Jan. 3, 2011 at 11:30 hours.

However, there is no new abnormality that occurs in the period from 11:10 hours to 11:30 hours on Jan. 3, 2011. In addition, there is no abnormality that ends in the period from 11:10 hours to 11:30 hours on Jan. 3, 2011.

When instructing the time evaluation unit 3e to calculate the time evaluation value on Jan. 3, 2011 at 11:30 hours, the calculation unit 3 may specifies a period from 11:30 hours to 12:30 hours as an augment. Even when such a period is specified, in the case of the example of the event management table 205c in FIG. 15, the same time evaluation value as in the case where a period from 11:10 hours to 12:10 hours is specified as an augment is obtained.

Therefore, detailed descriptions of the values in the columns "temperature evaluation value", "voltage evaluation value" and "time evaluation value" in the result table 206e will be omitted.

The values in the column "degradation evaluation value" in the result table 206e slightly differ from the values in the result table 206c in FIG. 16. The reason for the difference is because the result table 206e illustrates the result of the comprehensive evaluation process in FIG. 20 performed on Jan. 3, 2011 at 11:30 hours, while the result table 206c illustrates the result of the comprehensive evaluation process in FIG. 13 performed on Jan. 3, 2011 at 10:30 hours.

Specifically, because of the factors described below, the degradation evaluation values of the servers 30-2 to 30-7 are greater in the table illustrated in FIG. 21 than in the table illustrated in FIG. 16.

With regard to the servers 30-2, 30-4, 30-6 and 30-7, the value of the length of power-on time $t_{on}(s_i)$ is one hour greater in the example illustrated in FIG. 21 than in the example illustrated in FIG. 16. Since the length of time $t_{on}(s_i)$ is greater, the degradation evaluation value is greater in the example illustrated in FIG. 21.

With regard to the servers 30-3 and 30-5, the value of the length of power-off time $t_{off}(s_i)$ is one hour greater in the example illustrated in FIG. 21 than in the example illustrated in FIG. 16. Since the length of time $t_{off}(s_i)$ is greater, the degradation evaluation value is greater in the example illustrated in FIG. 21.

With regard to the server 30-2, the temperature abnormality that occurs on Jan. 3, 2011 at 11:00 hours is also a factor that makes the degradation evaluation value in FIG. 21 greater than the degradation evaluation value in FIG. 16.

With regard to the server 30-4, the overvoltage that occurs on Jan. 3, 2011 at 11:00 hours is also a factor that makes the degradation evaluation value in FIG. 21 greater than the degradation evaluation value in FIG. 16.

Because of the factors described above, the degradation evaluation values differ between FIGS. 16 and 21. However, the degradation evaluation values are calculated in the same method. Therefore, the calculation of the degradation evaluation values for the servers 30-2 to 30-7 will be briefly described below.

As may be seen from the following two formulas, the degradation evaluation value for the server 30-2 is approximately 0.84.

$$f_{dgrTmpr}(s_i) = C_{dgrTmpr} \times (W_2 \times 48 + W_2 \times 0.5) = \frac{1}{360} \times (2 \times 48 + 1 \times 0.5) \approx 0.27$$

$$f_{dgr}(s_i) = \frac{1}{360} \times 145.5 + \frac{1}{720} \times 120 + f_{dgrTmpr}(s_i) + 0 \approx 0.84$$

As may be seen from the following formula, the degradation evaluation value for the server 30-3 is approximately 0.20.

$$\frac{1}{360} \times 0 + \frac{1}{720} \times 145.5 + 0 + 0 \approx 0.20$$

As may be seen from the following two formulas, the degradation evaluation value for the server 30-4 is approximately 0.61.

$$f_{dgrOvervol}(s_i) = C_{dgrOvervol} \times W_2 \times 0.5 = \frac{1}{360} \times 2 \times 0.5 \approx 0.00$$

$$f_{dgr}(s_i) = \frac{1}{360} \times 169.5 + \frac{1}{720} \times 96 + 0 + f_{dgrOvervol}(s_i) \approx 0.61$$

As may be seen from the following formula, the degradation evaluation value for the server 30-5 is approximately 0.37.

$$\frac{1}{360} \times 0 + \frac{1}{720} \times 265.5 + 0 + 0 \approx 0.37$$

As may be seen from the following formula, the degradation evaluation value for the server 30-6 is approximately 0.57.

$$\frac{1}{360} \times 145.5 + \frac{1}{720} \times 120 + 0 + 0 \approx 0.57$$

As may be seen from the following formula, the degradation evaluation value for the server 30-7 is approximately 0.47.

$$\frac{1}{360} \times 73.5 + \frac{1}{720} \times 192 + 0 + 0 \approx 0.47$$

The value calculated for each server in step S1106 in FIG. 20 (that is, the weighted sum of the temperature evaluation value and the voltage evaluation value) is the same as the value calculated in step S905 in FIG. 17. Therefore, the comprehensive evaluation value of each server is as follows.

The comprehensive evaluation value of the server 30-2 is approximately 112.84 (=100+0.84+12). The comprehensive evaluation value of the server 30-3 is approximately 3.20 (=3+0.20+0). The comprehensive evaluation value of the server 30-4 is approximately 232.61 (=200+0.61+32). The comprehensive evaluation value of the server 30-5 is approximately 10.37 (=10+0.37+0). The comprehensive evaluation value of the server 30-6 is approximately 8.57 (=0+0.57+8). The comprehensive evaluation value of the server 30-7 is approximately 0.47 (=0+0.47+0).

The calculation unit 3 calculates various evaluation values for each of the servers 30-2 to 30-7 as described above, and stores the calculated evaluation values in the result table 206e illustrated in FIG. 21. According to the result table 206e, the probability of occurrence of a future failure is the lowest in the server 30-7, whose comprehensive evaluation value is approximately 0.47. Therefore, if the active server 30-1 fails, the failover control unit 4 selects the server 30-7 as a new active server.

Next, the fifth embodiment will be described with reference to FIG. 22. In the fifth embodiment, as in the fourth embodiment, the comprehensive evaluation value $f_{total}(s_i)$ expressed by the formula (32) is calculated. The fifth embodiment differs from the fourth embodiment in user interface.

Specifically, according to the fifth embodiment, the failover control unit 4 illustrated in FIG. 2 notifies the client 6 of the evaluation result from the calculation unit 3, instead of automatically selecting a new active server. The client 6 displays the notified evaluation result via an appropriate GUI.

A user of the client 6 may see and recognize the displayed evaluation result. The user may then specify a switchover target standby server (that is, a new active server) to the failover control unit 4 via the client 6. According to the specification from the client 6, the failover control unit 4 controls switchover from the current active server 30-1 to the specified new server.

More specifically, according to the fifth embodiment, a GUI illustrated in FIG. 22 may be used. FIG. 22 illustrates an example of a result display screen 301 and a dialog box 302 to be shown on a display of the client 6.

The result display screen 301 is a screen on which the calculation result from the calculation unit 3 (specifically, data including the contents of the result table in management DB 5) is displayed in a table format. The result display screen 301 includes headings and rows associated with the respective standby servers 30-2 to 30-7. For example, the row associated with the server 30-2 having an ID of "2" allocated thereto indicates the following.

The server 30-2 is one of the standby servers for the active server 30-1 having an ID of "1" allocated thereto.

For the server 30-2, the temperature evaluation value is calculated to be 12, the voltage evaluation value is calculated to be 0, the degradation evaluation value is calculated to be 21, and the time evaluation value is calculated to be 0. Based on these values, the comprehensive evaluation value is calculated to be 33.

The smaller the comprehensive evaluation value, the higher priority as the target of switchover from the active server 30-1 the server is given. And of the six standby servers 30-2 to 30-7, the server 30-2 is given the lowest priority.

Similarly, in the rows for the other servers 30-3 to 30-7, the ID of the active server, the priority, the comprehensive evaluation value, the temperature evaluation value, the voltage evaluation value, the degradation evaluation value and the time evaluation value are displayed.

In the example of the result display screen 301, the server 30-5, whose comprehensive evaluation value is 11, has the highest priority, and the server 30-7, whose comprehensive evaluation value is 13, has the second highest priority. The server 30-4, whose comprehensive evaluation value is 18, has the third highest priority, and the server 30-3, whose comprehensive evaluation value is 23, has the fourth highest priority. And the server 30-6, whose comprehensive evaluation value is 25, has the fifth highest priority, and the server 30-2, whose comprehensive evaluation value is 33, has the lowest priority as described above.

The user may determine the probability of occurrence of a future failure for each of the servers 30-2 to 30-7 by seeing the result display screen 301 displayed on the display of the client 6. In the result display screen 301, not only the comprehensive evaluation value but also other evaluation values used for calculation of the comprehensive evaluation value are displayed as "details". Therefore, the user may also grasp the degree of the influence of each factor on a failure for each of the servers 30-2 to 30-7.

In addition, the user may specify a server that is the target of switchover from the active server 30-1 to the failover control unit 4 via the dialog box 302 displayed on the display of the client 6. In the example in FIG. 22, the dialog box 302 with a heading "server switchover" includes a pull-down list for the user to select a switchover target standby server, an "OK" button and a "cancel" button. As illustrated in FIG. 22, the dialog box 302 may further include other GUI elements, such as a "help" button.

The pull-down list contains the six servers 30-2 to 30-7 associated with the active server 30-1 as six choices in the descending order of the priority described above. For user's convenience, each choice in the pull-down list is displayed along with the server ID and the comprehensive evaluation value. The user may specify a switchover target server to the failover control unit 4 by selecting a desired server (the server 30-5 having an ID of "5", for example) from the pull-down list and clicking the "OK" button.

As described above, according to the fifth embodiment, switchover may be manually achieved as the user desires. Even if the switchover from the active server occurs in response to a user's operation, it is beneficial to present, to the user, information that allows prediction of the probability of occurrence of a future failure in each standby server, such as the result display screen 301. This is because the presented information enables the user to select a more appropriate standby server.

The present invention is not limited to the embodiments described above. Although some modifications have already been described in the above description, the embodiments may be further modified in various ways from the viewpoints described below. Any of the modifications described below may be arbitrarily combined with each other, as far as they are consistent with each other.

Although various flowcharts have been described as examples, the orders of steps may be modified as required as far as the modification does not produce any inconsistency. Steps that may be interchanged may be performed in parallel with each other.

For example, in the example illustrated in FIG. 20, the order of steps S1101 to S1104 may be arbitrarily changed. In addition, steps S1103 to S1104 may be performed after steps S1105 to S1106.

The calculation unit 3 may calculate the evaluation values not only for the standby servers but also for the active server. The result table in the management DB 5 may further store the evaluation values for the active server.

In the drawings, various data in the management DB 5 are illustrated in table forms, such as the event management table and the result table, for example. However, any data format is possible depending on the embodiment. For example, the management DB 5 may be an extensible markup language (XML) database or other format of database. Furthermore, instead of the management DB 5 holding a table, such as the result tables 206a to 206e, data equivalent to the result table 206a to 206e may be simply held by the calculation unit 3 as variables (array variables, for example) on the RAM 102.

Furthermore, in the case where the time evaluation value is used, and the failover control process occurs according to the flowchart of FIG. 5, a plurality of time evaluation values corresponding to a plurality of different time zones may be stored in the management DB 5 in association with each server.

For example, a day may be divided into 24 periods each having a length of one hour. And the time evaluation unit 3e may calculate the time evaluation value of each server for each of the 24 periods and store the calculation result in the management DB 5 once in a day at a predetermined time of day. The comprehensive evaluation unit 3c may calculate the comprehensive evaluation value for each of the 24 period in association with the time evaluation value calculated for the period and store the calculation result in the management DB 5.

In the case where the degradation evaluation value is used, the management DB 5 may store information that associates the following three values with each other.

The server ID of a server in which replacement, addition or removal of a component has occurred.

The date and time at which the replacement, addition or removal occurred.

The multipliers in the right side of the formula (24) calculated according to the number of components replaced, added or removed.

When evaluating a length of time ($t_{on}(s_i)$, for example) in calculation of the degradation evaluation value, the degradation evaluation unit 3d may multiply the length of a period before the data of replacement, addition or removal of a component by the stored multiplier in the formula (24).

A GUI similar to the GUI according to the fifth embodiment may be used in any of the first to third embodiments. Regardless of which of the formulas (29) to (33) the calculation unit 3 uses to calculate the comprehensive evaluation value, the failover control unit 4 may automatically perform the failover process or may perform the switchover process according to an instruction from the user via the client 6.

The specific values of the coefficients 201 and the weights 202 illustrated in FIG. 6 may be appropriately modified depending on the embodiment. In addition, the values of the coefficients 201 and the weights 202 may be user-definable values.

The redundant system may include a plurality of active servers. A plurality of standby servers provided for a first active server may be different from a plurality of standby servers provided for a second active server, or some or all of the plurality of standby servers provided for the first active server may be shared with the second active server.

For example, each of a plurality of servers in a server pool may be associated with the first active server as a standby server for the first active server and associated with the second active server as a standby server for the second active server. The management server 1 retains information on the association between the active servers and the standby servers in the management DB 5, for example.

In any case, the calculation unit 3 calculates the evaluation values for each of the plurality of standby servers for each active server. Therefore, in whichever active server a failure occurs, the failover control unit 4 may select a standby server having a small comprehensive evaluation value (that is, a server that is expected to be less likely to fail and therefore to be suitable as a new active server).

FIG. 2 illustrates only the active server 30-1 and the standby servers 30-2 to 30-7 associated with the server 30-1 in one redundant system.

However, depending on the embodiment, for example, one or more other systems (referred to as "independent servers" for the convenience of explanation, hereinafter) may be further installed in the rack 10-1. Of course, one or more independent servers may be installed in the rack 10-2, or one or more independent servers may be installed in the rack 10-3.

From the functional (that is, logical) point of view, the independent server is not related to the redundant system including the servers 30-1 to 30-7. However, the independent server may be physically related to the servers 30-1 to 30-7.

If there is one or more independent servers in the racks 10-1 to 10-3, the collecting unit 2 also collects the failure-predictive information from the independent servers. The calculation unit 3 also uses the failure-predictive information collected from the independent servers to calculate the evaluation values for each of the standby servers 30-2 to 30-7.

In other words, servers that logically belong to a plurality of different systems may physically coexist in the same rack. The management server 1 may manage all the servers that belong to the plurality of systems.

For example, consider a case where an independent blade server is mounted in the third slot of the chassis 20-1, and a temperature abnormality is occurring in the independent server. In this case, the independent server in which the temperature abnormality is occurring is adjacent to the server 30-2 in the chassis 20-1. In addition, the server 30-3 is in the same chassis 20-1, although the server 30-3 is not adjacent to the independent server.

Therefore, the servers 30-2 and 30-3 are affected by the temperature abnormality occurring in the independent server. The temperature evaluation values of the servers 30-2 and 30-3 are more accurately calculated by the collecting unit 2 collecting the failure-predictive information from the independent server.

Alternatively, consider a case where an independent rack-mount is mounted in the rack 10-2, and a voltage abnormality is occurring in the independent server. In this case, the independent server in which the voltage abnormality is occurring share the power supply unit 12-2 with the servers 30-4 and 30-5. The voltage evaluation values of the servers 30-4 and 30-5 are more accurately calculated by the collecting unit 2 collecting the failure-predictive information from the independent server.

In the above description, various formulas, such as the formulas (1) to (38), have been illustrated. However, the calculation unit 3 may calculate the evaluation values according to other formulas. For example, the set adj ($s_i$) of the servers adjacent to the server $s_i$ may be defined by the formula (5) as described above, but may be differently defined. Furthermore, the set power($s_i$) of the servers that have an influence on the voltage evaluation value of the server $s_i$ may be defined by the formula (11) as described above, but may be differently defined.

Specifically, for example, it may be defined that the servers $s_i$ and $s_j$ are adjacent to each other if any of the following conditions is satisfied.

The servers $s_i$ and $s_j$ are both blade servers and mounted in slots adjacent to each other in one chassis.

The server $s_i$ is a blade server, and the server $s_j$ is a rack-mount server mounted at a position immediately above (or below) the in-rack position in the chassis at which the server $s_i$ is mounted.

The server $s_i$ is a rack-mount server, and the server $s_j$ is a blade server mounted in the chassis mounted at a position immediately above (or below) the in-rack position of the server $s_i$.

The servers $s_i$ and $s_j$ are both blade servers, and the chassis in which the server $s_j$ is mounted is mounted at a position immediately above (or below) the in-rack position of the chassis in which the server $s_i$ is mounted.

The servers $s_i$ and $s_j$ are both rack-mount servers, and the server $s_j$ is mounted at a position immediately above (or below) the in-rack position of the server $s_i$.

Of course, depending on the embodiment, a further definition may be adopted. Furthermore, the five cases described above may be discriminated, and five adjacency coefficients having different values may be used.

For example, provided that in-rack positions are denoted by sequence numbers, such as 1, 2, 3 and so on, the vertical adjacency relationship in the rack may be determined from the height of the rack-mount server or the chassis and the number that indicates the in-rack position.

For example, consider a case where a chassis having a height of 6 U occupies the third to eighth positions in a rack. In this case, the device immediately above the chassis is the device that occupies the second position (the rack-mount server having a height of 1 U). And the device immediately below the chassis is the device that occupies the ninth position. The device that occupies the ninth position may be another chassis having a height of 6 U that occupies the ninth to fourteenth positions or a rack-mount server having a height of 1 U that occupies only the ninth position.

Furthermore, using the set adj($s_i$) defined by the formula (5) or the modification described above, a plurality of levels of adjacency relationships may be defined, such as a "level-1 adjacency relationship", a "level-2 adjacency relationship" and a "level-3 adjacency relationship". For example, the definitions described below may be used.

If $s_j \in \text{adj}(s_i)$, the servers $s_i$ and $s_j$ are adjacent to each other at a level 1.

If $\exists s_k\, (s_k \in \text{adj}(s) \wedge s_k \in \text{adj}(s_j))$, the servers $s_i$ and $s_j$ are adjacent to each other at a level 2.

If $\exists s_k, s_h\, (s_k \in \text{adj}(s_i) \wedge s_k \in \text{adj}(s_k) \in s_h \wedge \in \text{adj}(s_j))$, the servers $s_i$ and $s_j$ are adjacent to each other at a level 3.

In the calculation of the temperature evaluation value, an adjacency coefficient for the adjacency relationship at the level 1, an adjacency coefficient for the adjacency relationship at the level 2 and an adjacency coefficient for the adjacency relationship at the level 3 may be used. That is, in the calculation of the temperature evaluation value of the server $s_i$, various influences described below may be taken into consideration.

The influence of another server adjacent to the server $s_i$ at the level 1.

The influence of another server adjacent to the server $s_i$ at the level 2.

The influence of another server adjacent to the server $s_i$ at the level 3.

The influence of another server that is not adjacent to the server $s_i$ at any of the levels 1 to 3 but is in the same chassis as the server $s_i$.

The influence of another server that is not adjacent to the server $s_i$ at any of the levels 1 to 3 and is not in the same chassis as the server $s_i$ but is in the same rack as the server $s_i$.

As illustrated above, the other server $s_j$ that is related to the calculation of the temperature evaluation value of the server $s_i$ varies with the embodiment. In contrast to the modification described above, for example, a modification, such as omitting the fourth term, or the third term and the fourth term, of the right side of the formula (1), is also possible. Specifically, such modifications are as follows.

The formula (1) is defined based on three levels of proximity between the servers $s_i$ and $s_j$ defined by the formulas (5) to (7). However, only one level of proximity between the servers $s_i$ and $s_j$ may be defined. For example, that one level may be defined by the formula (3) or the set adj ($s_i$) in the above modification. Of course, two levels of proximity between the servers $s_i$ and $s_j$ may be defined, or four or more levels of proximity between the servers $s_i$ and $s_j$ may be defined.

Depending on the number of levels of proximity defined, the formula (1) may be appropriately modified. For example, depending on the embodiment, the fourth term of the right side of the formula (1) may be omitted, or both the third term and the fourth term may be omitted.

According to the definition of the set power ($s_i$) by the formula (11), the two cases described below are not discriminated. And in the formula (8), one kind of same-power-supply coefficient $C_{power}$ is used for both the two cases described below.

A case where the servers $s_i$ and $s_j$ are directly supplied with electric power by the same power supply unit.

A case where the servers $s_i$ and $s_j$ are indirectly supplied with electric power by the same power supply unit.

However, for example, the five cases described below may be discriminated from each other, and five same-power-supply coefficients having different values may be used.

The servers $s_i$ and $s_j$ are both blade servers and are directly supplied with electric power by the same in-chassis power supply unit.

The servers $s_i$ and $s_j$ are both blade servers and mounted on the same chassis but are supplied with electric power by two different in-chassis power supply units.

One of the servers $s_i$ and $s_j$ is a blade server, and the other is a rack-mount server that receives electric power from an in-rack power supply unit that supplies electric power to the chassis on which the blade server is mounted.

The servers $s_i$ and $s_j$ are both rack-mount servers and are directly supplied with electric power by the same in-rack power supply unit.

The servers $s_i$ and $s_j$ are mounted on two different racks, and the in-rack power supply units mounted on the two racks receive electric power from the same wall socket in the same room.

Of course, depending on the embodiment, further definitions may be adopted. For the degradation evaluation value and the time evaluation value, definitions different from the formulas (12) to (28) may be adopted.

In any case, the temperature evaluation unit $3a$ calculates the temperature evaluation value according to an appropriate procedure depending on the physical positional relationship between servers. The voltage evaluation unit $3b$ calculates the voltage evaluation value according to an appropriate procedure depending on the definition concerning sharing of the power supply.

The degradation evaluation unit $3d$ calculates the degradation evaluation value according to an appropriate procedure depending on what factor has an influence on the degradation over time. The time evaluation unit $3e$ calculates the time evaluation value according to an appropriate procedure depending on the degree to which the tendency of occurrence of a failure depends on time or time zone.

Therefore, the comprehensive evaluation unit $3c$ may calculate an appropriate comprehensive evaluation value using a plurality of evaluation values calculated by the other evaluation units according to an appropriate definition depending on the embodiment. Since the comprehensive evaluation value for each of a plurality of standby servers is used, the appropriateness (or priority) as the failover target server in the case where the current active server fails may be compared among the plurality of standby servers.

Therefore, in any of the various embodiments described above, a server that is less likely to fail is selected as a new active server, so that a secondary failure may be advantageously prevented. If the secondary failure does not occur, the availability of the redundant system as a whole is improved.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer readable storage medium that stores a program that makes a management computer perform a process comprising:

collecting failure-predictive information including information on a plurality of kinds of phenomena related to occurrence of a failure from each of a plurality of computers including an active first computer in a redundant system that are managed by said management computer; and calculating, for each individual second computer of one or more second computers of a plurality of second computers associated with said first computer in said redundant system, an evaluation value that indicates the probability of occurrence of a future failure in the individual second computer using said failure-predictive information collected from the individual second computer and said failure-predictive information collected from one or more predetermined computers other than the individual second computer of said plurality of computers.

2. The storage medium according to claim 1, wherein said plurality of kinds of phenomena includes a temperature-related phenomenon and a voltage-related phenomenon, and said evaluation value depends on a plurality of values each of which indicates the tendency of occurrence of failures each of which is associated with a corresponding one of said plurality of kinds of phenomena in the individual second computer according to said failure-predictive information collected from the individual second computer.

3. The storage medium according to claim 2, wherein a first value of said plurality of values that is associated with said temperature-related phenomenon is based on the length of time for which each of one or more temperature-related abnormalities has lasted in said individual second computer for which said evaluation value is to be calculated, and a second value of said plurality of values that is associated with said voltage-related phenomenon is based on the length of time for which each of one or more voltage-related abnormalities has lasted in said individual second computer for which said evaluation value is to be calculated.

4. The storage medium according to claim 2, wherein said evaluation value further depends on one or both of a first partial evaluation value that indicates the probability of occurrence of a future failure due to a degradation over time in said individual second computer for which said evaluation value is to be calculated, and a second partial evaluation value that indicates the probability of occurrence of a future failure in a particular time zone in said individual second computer for which said evaluation value is to be calculated.

5. The storage medium according to claim 4, wherein said first partial evaluation value is based on at least one of
- the length of time for which said individual second computer for which said evaluation value is to be calculated has been powered on,
- the length of time for which said individual second computer for which said evaluation value is to be calculated has been powered off,
- the total of the length of time for which said individual second computer for which said evaluation value is to be calculated has been powered on and the length of time for which said individual second computer for which said evaluation value is to be calculated has been powered off,
- the length of time for which each of one or more temperature-related or voltage-related abnormalities has lasted in said individual second computer for which said evaluation value is to be calculated,
- the length of time for which each of the one or more temperature-related or voltage-related abnormalities has lasted in said one or more predetermined computers for which said failure-predictive information collected therefrom is used to calculate said evaluation value for said individual second computer for which said evaluation value is to be calculated, and
- the length of time for which each of the one or more abnormalities has lasted in one or more of said plurality of computers that are of the same model as said individual second computer for which said evaluation value is to be calculated.

6. The storage medium according to claim 4, wherein said second partial evaluation value is based on a history that indicates whether or not an abnormality occurred in said particular time zone in a day in the past in said individual second computer for which said evaluation value is to be calculated.

7. The storage medium according to claim 1, wherein said one or more predetermined computers for which said failure-predictive information collected therefrom is used to calculate said evaluation value for the individual second computer are one or more computers that
- share a power supply unit in a chassis or a power supply unit in a rack with said individual second computer,
- is mounted at a position adjacent to said individual second computer,
- is mounted in the same chassis as said individual second computer, or
- is mounted in the same rack as said individual second computer.

8. The storage medium according to claim 7, wherein said evaluation value for said individual second computer is calculated by placing more importance on said failure-predictive information collected from said individual second computer than on said failure-predictive information collected from said one or more predetermined computers.

9. The storage medium according to claim 1, wherein said process further comprising selecting, as a second computer that is to replace said first computer, one second computer for which said evaluation value calculated therefrom indicates a probability equal to or lower than a probability indicated by a predetermined criterion, and
said criterion is determined by a predetermined threshold for said evaluation value or concerns a relative order of said evaluation values among said plurality of second computers.

10. An information processing apparatus comprising:
a receiver that receives failure-predictive information including information on a plurality of kinds of phenomena related to occurrence of a failure from each of a plurality of computers including an active first computer in a redundant system that are managed by said information processing apparatus;
a storage unit that stores said failure-predictive information received by said receiver; and
a processor that calculates, for each individual second computer of one or more second computers of a plurality of second computers associated with said first computer in said redundant system, an evaluation value that indicates the probability of occurrence of a future failure in the individual second computer using said failure-predictive information received by said receiver from the individual second computer and stored in said storage unit and said failure-predictive information received by said receiver from one or more predetermined computers other than the individual second computer of said plurality of computers and stored in said storage unit.

11. A method performed by a management computer, the method comprising:
collecting, by a management computer, failure-predictive information including information on a plurality of kinds of phenomena related to occurrence of a failure from each of a plurality of computers including an active first computer in a redundant system that are managed by said management computer, and
calculating, by the management computer, for each individual second computer of one or more second computers of a plurality of second computers associated with said first computer in said redundant system, an evaluation value that indicates the probability of occurrence of a future failure in the individual second computer using said failure-predictive information collected from the individual second computer and said failure-predictive information collected from one or more predetermined computers other than the individual second computer of said plurality of computers.

* * * * *